United States Patent [19]

Ohta et al.

[11] Patent Number: 4,831,461
[45] Date of Patent: May 16, 1989

[54] SHEET FEED MECHANISM AND METHOD OF CONTROLLING THE SAME IN LIGHT BEAM SCANNING APPARATUS

[75] Inventors: Yasunori Ohta; Shumpeita Torii; Tsutomu Kimura; Takenori Tomita; Toru Itakura; Takashi Shoji; Masaaki Konno; Hisao Seto, all of Kasei, Japan

[73] Assignee: Fuji Photo Film Co., Ltd., Kanagawa, Japan

[21] Appl. No.: 187,205

[22] Filed: Apr. 27, 1988

Related U.S. Application Data

[63] Continuation-in-part of Ser. No. 920,337, Oct. 17, 1986, Pat. No. 4,780,767.

[30] Foreign Application Priority Data

| Oct. 17, 1985 | [JP] | Japan | 60-232479 |
| Oct. 19, 1985 | [JP] | Japan | 60-234182 |
| Dec. 6, 1985 | [JP] | Japan | 60-275703 |
| Jan. 17, 1986 | [JP] | Japan | 61-7486 |
| Jan. 30, 1986 | [JP] | Japan | 61-18593 |
| Jan. 31, 1986 | [JP] | Japan | 61-19497 |
| Feb. 19, 1986 | [JP] | Japan | 61-34241 |
| May 15, 1986 | [JP] | Japan | 61-86496 |
| Jul. 10, 1986 | [JP] | Japan | 61-163218 |
| Jul. 30, 1986 | [JP] | Japan | 61-179182 |
| Aug. 18, 1986 | [JP] | Japan | 61-193533 |
| Aug. 18, 1986 | [JP] | Japan | 61-193534 |
| Sep. 9, 1986 | [JP] | Japan | 61-212914 |
| Sep. 9, 1986 | [JP] | Japan | 61-212915 |

[51] Int. Cl.[4] .......... H04N 1/21; G03G 15/00; B65H 5/34
[52] U.S. Cl. .................. 358/296; 355/309; 271/270
[58] Field of Search .............. 358/296, 298, 300; 355/3 SH, 14 SH, 50; 271/270

[56] References Cited

U.S. PATENT DOCUMENTS

| 4,227,803 | 10/1980 | Massengeil | 355/50 |
| 4,317,139 | 2/1982 | Nelson | 358/300 |
| 4,519,700 | 5/1985 | Barker | 271/270 |

*Primary Examiner*—E. A. Goldberg
*Assistant Examiner*—Scott Rogers
*Attorney, Agent, or Firm*—Sughrue, Mion, Zinn, Macpeak & Seas

[57] ABSTRACT

A sheet feed mechanism in a light scanning apparatus includes two pairs of rollers for gripping and feeding a sheet-like medium such as a stimulable phosphor sheet or a photographic film in a subscanning direction. The two pairs of rollers are spaced a distance smaller than the length of the sheet-like medium in the subscanning direction. While the sheet-like medium is being fed by the sheet feed mechanism in the subscanning direction, the sheet-like medium is scanned by a light beam deflected in a main scanning direction substantially normal to the subscanning direction, for thereby two-dimensionally scanning the sheet-like medium.

8 Claims, 44 Drawing Sheets

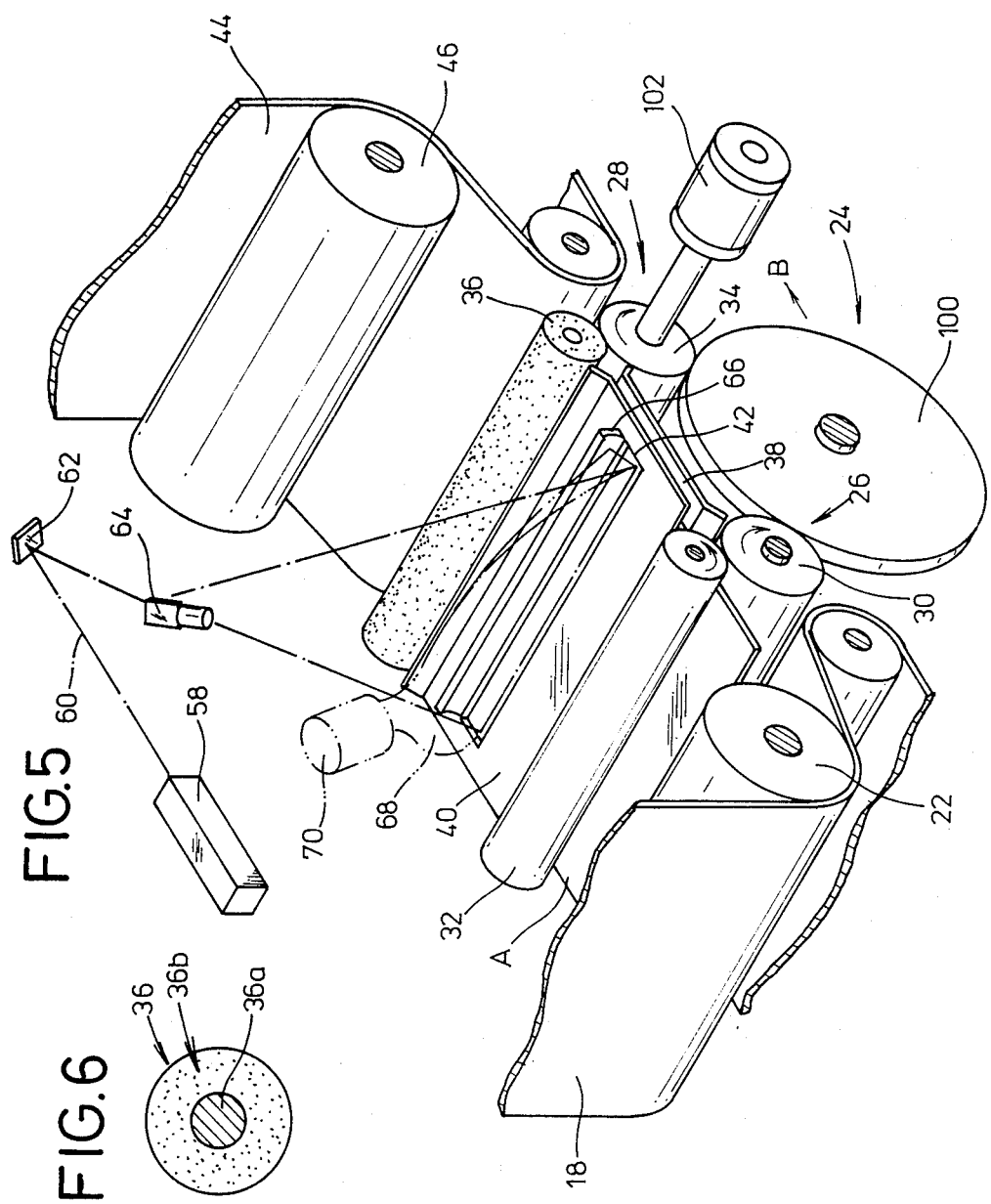

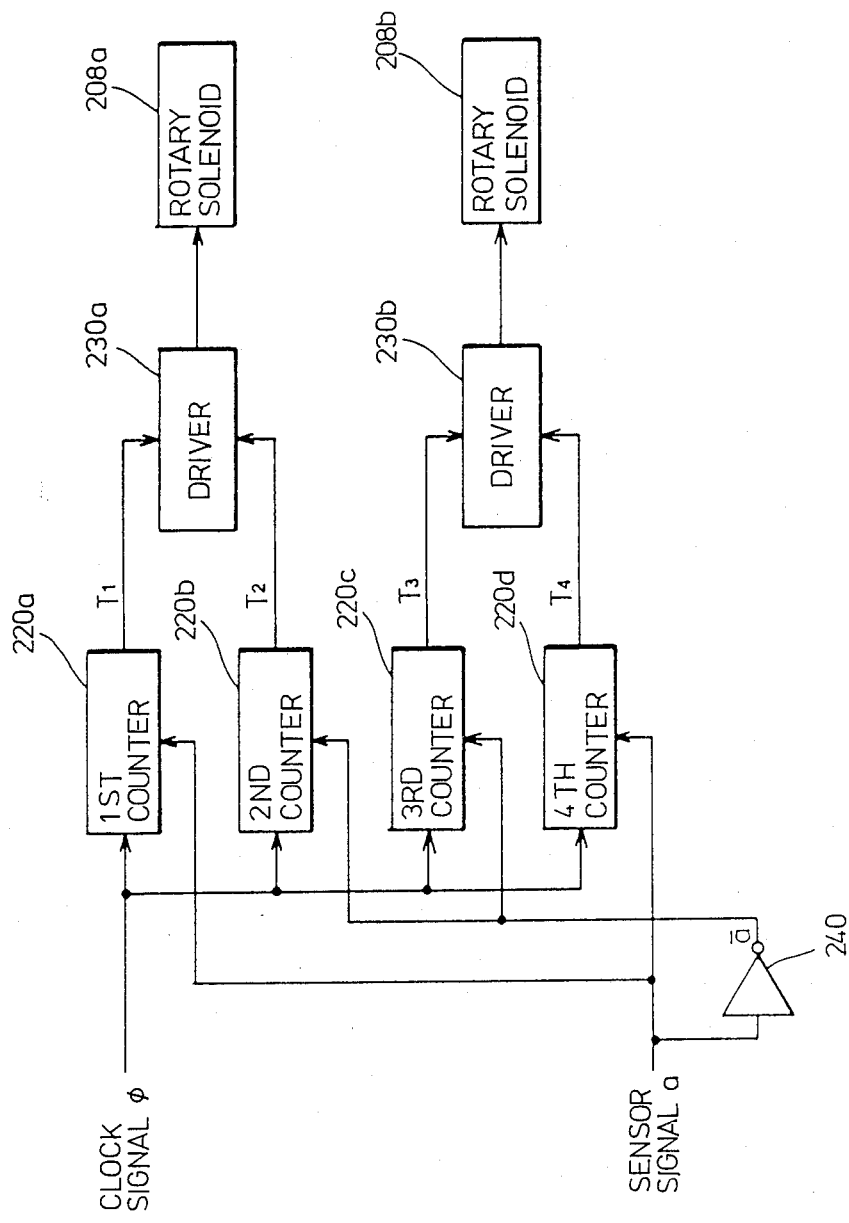

FIG. 26
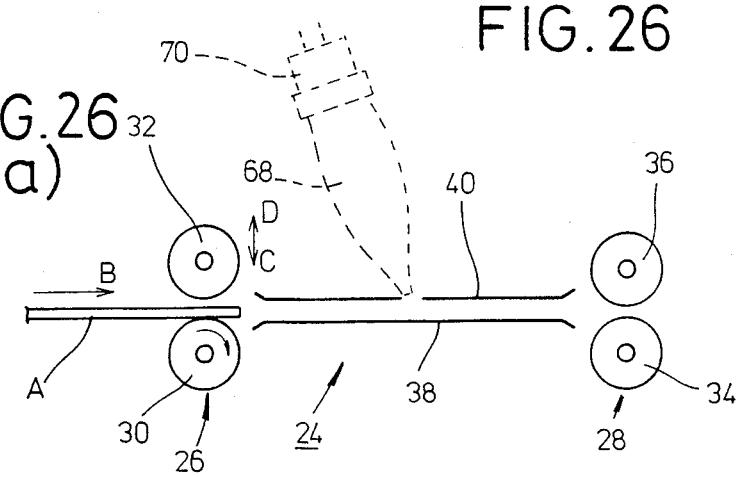
FIG. 26(a)
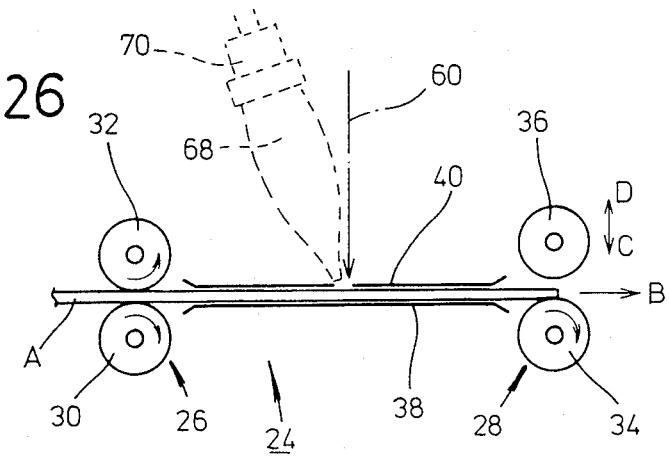
FIG. 26(b)
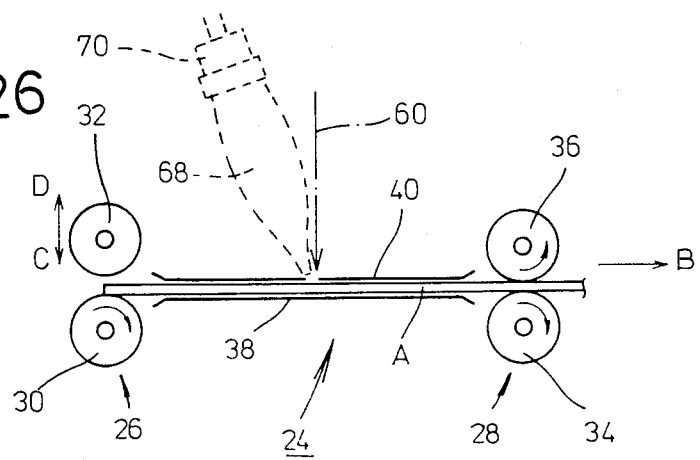
FIG. 26(c)

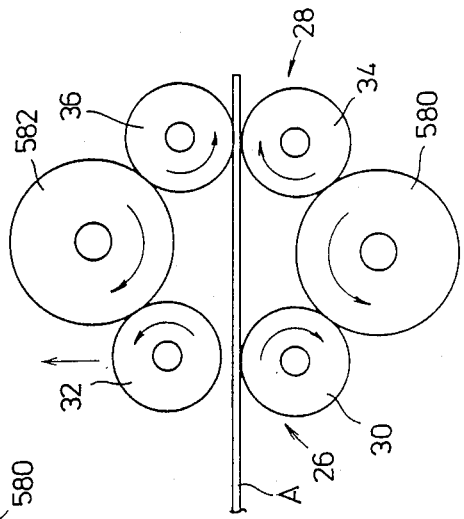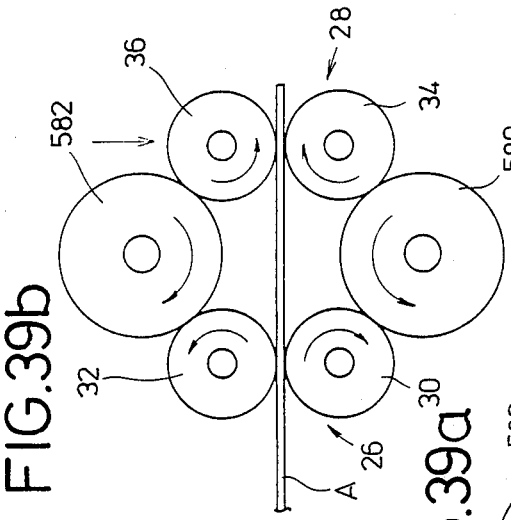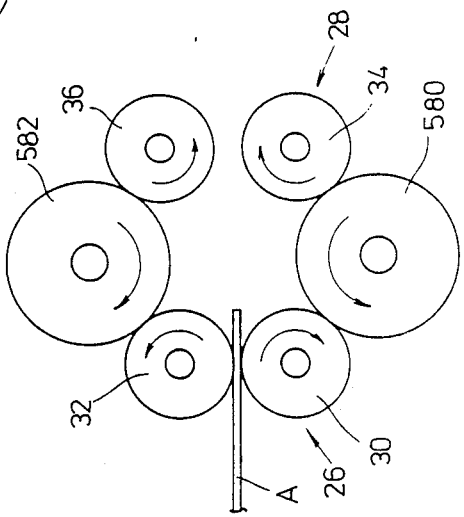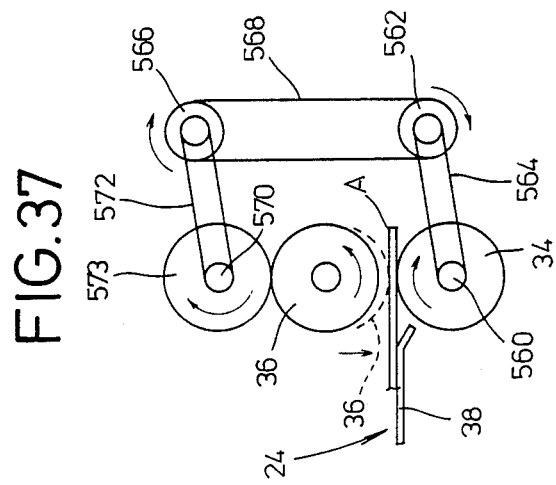

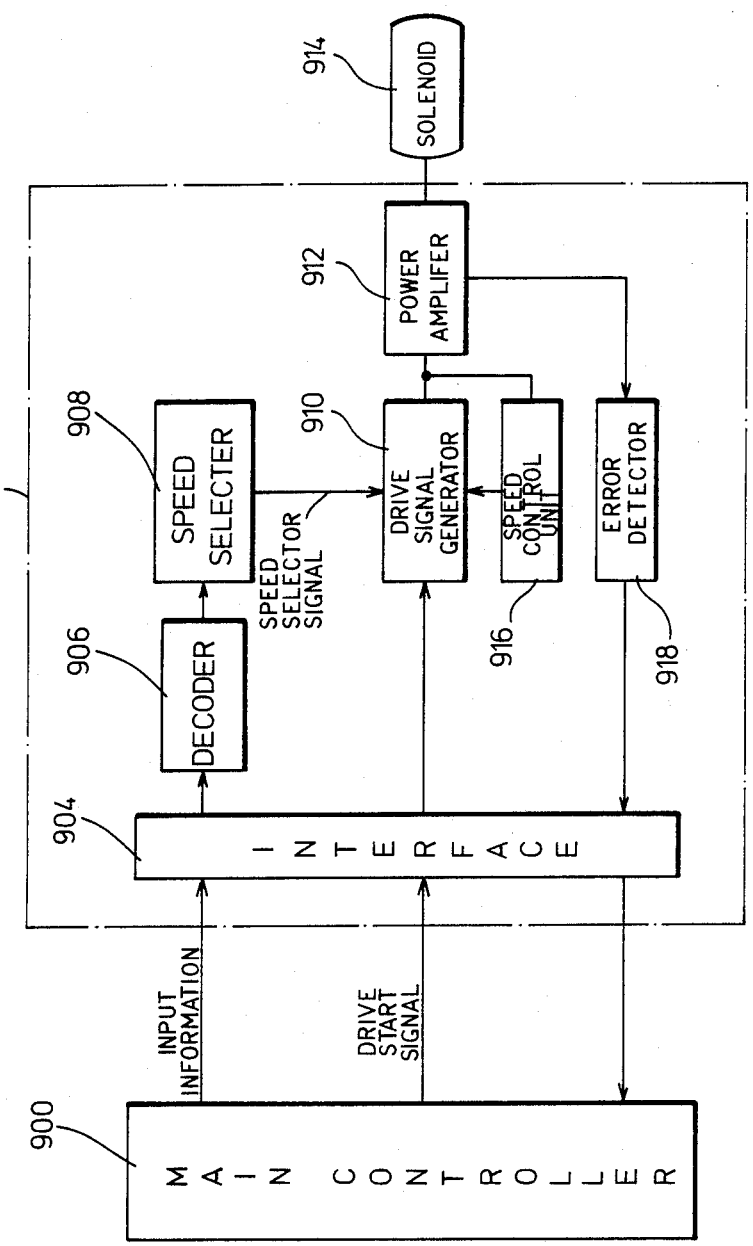

SHEET FEED MECHANISM AND METHOD OF CONTROLLING THE SAME IN LIGHT BEAM SCANNING APPARATUS

This is a continuation in part of application Ser. No. 06/920,337 filed 10/17/86 now U.S. Pat. No. 4,780,767 issued 10/25/88.

BACKGROUND OF THE INVENTION

The present invention relates to a sheet feed mechanism and a method of controlling the same in a light beam scanning apparatus, and more particularly to a sheet feed mechanism and a method of controlling the same for two-dimensionally scanning a sheet with a light beam, e.g., for applying stimulating light to a stimulable phosphor sheet with a radiation image recorded thereon to read the recorded image from the sheet, or for applying a light beam to a photographic photosensitive material in the form of a sheet film to record an image thereon.

There has recently been developed and widely used a radiation image recording and reproducing system for producing the radiation-transmitted image of an object using a stimulable phosphor material capable of emitting light upon exposure to stimulating rays. When a stimulable phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation.

In the radiation image recording and reproducing system employing such a stimulable phosphor, the radiation image information of an object such as a human body is stored in a sheet having a layer of stimulable phosphor (hereinafter referred to as a "stimulable phosphor sheet" or simply a "sheet"), and then the stimulable phosphor sheet is scanned with stimulating rays to cause the stimulable phosphor sheet to emit light representative of the radiation image. The emitted light is then photoelectrically detected to produce an image signal that is electrically processed for generating image information which is recorded on a recording medium such as a photographic photosensitive material or displayed as a visible image on a CRT or the like.

The radiation image recording and reproducing system includes an image readout device for reading a radiation image from a stimulable phosphor sheet. More specifically, the stimulable phosphor sheet is two-dimensionally scanned by a laser beam, and light emitted from the sheet upon exposure to the laser beam is detected on a time-series basis by a light detector such as a photomultiplier which produces an image signal representative of the image information. The stimulable phosphor sheet is two-dimensionally scanned by the laser beam by deflecting the laser beam one-dimensionally over the sheet in a main scanning direction and simultaneously feeding the sheet mechanically with a feed mechanism such as an endless belt conveyor in a subscanning direction normal to the main scanning direction.

The image information thus obtained from the stimulable phosphor sheet is then fed to an image recording device. The image recording device applies a laser beam modulated by the image information to a recording medium such as a photographic photosensitive material to record the image thereon. The image recorded on the photographic photosensitive material is thereafter developed, and the photographic photosensitive material is stored in a suitable location for use in medical diagnosis as required.

The stimulable phosphor sheet fed by the belt conveyor in the image readout device must be positioned stably on the belt conveyor. If the stimulable phosphor sheet were displaced on the belt conveyor during the scanning thereof, the light beam applied to the sheet would be displaced out of a desired position. As a result, if the stimulable phosphor sheet displaced on the belt conveyor were continuously scanned by the laser beam, image information obtained from the sheet would be inaccurate. Stated otherwise, no accurate radiation image information could be produced from the stimulable phosphor sheet suffering from a positional error. When the imaged object is a patient, a diagnostic error would tend to result from such inaccurate image information.

One conventional solution has been to use a suction box for holding a stimulable phosphor sheet being scanned stably on the belt conveyor without unwanted displacement. The suction box is positioned in a central space in the endless belt conveyor, and has a plurality of suction holes. When the stimulable phosphor sheet is delivered onto the belt conveyor, a vacuum generator coupled to the suction box is actuated to develope a vacuum in the suction box to attract the sheet under suction through the suction holes, thereby positioning the sheet stably on the belt conveyor. Therefore, the stimulable phosphor sheet is conveyed with the belt conveyor as it is moved in the subscanning direction.

The suction box however makes the feed mechanism complex and large, and requires the vacuum generator to enable the suction box to attract the sheet and also a control system for controlling the vacuum generator. The sheet positioning and feeding means of this construction is considerably costly, and so is the radiation image recording and reproducing system.

Another problem is that a feed path must be provided for feeding the stimulable phosphor sheet onto the belt conveyor in a direction parallel thereto in order to attract the sheet effectively on the belt conveyor. The radiation image recording and reproducing system with such a feed path is necessarily large in size. Where the system is installed in a hospital, for example, the size of the system makes it difficult to effectively utilize the space of a room in which it is located.

In the image recording device, the photographic photosensitive material is scanned in a main scanning direction by the laser beam which is modulated by the image information and cyclically deflected. At same time, the photographic photosensitive material is gripped between a large-diameter drum coupled to a rotative drive source and a pair of rollers on the drum and is fed thereby in a subscanning direction substantially normal to the main scanning direction.

The rotative drive source, such as a motor, for rotating the drum may be subjected to a load variation which leads to a failure of desired subscanning of the photographic photosensitive material.

Heretofore, any variations in the load on the motor during the subscanning process have been minimized by support bases disposed in front of and behind the drum in the subscanning direction. Each of the support bases must be of a length at least equal to or greater than the length of the photographic photosensitive material in the subscanning direction. Therefore, the image recording device is considerably large in size.

The drum has a width larger than the width of the photographic photosensitive material so as to be capable of stably feeding the material. Since the motor is disposed on one side of the drum in the direction of the width thereof, the image recording device is also of a large extent in the main scanning direction. For scanning the photographic photosensitive material highly accurately, it is necessary to control the motor highly precisely in order to convey the photographic photosensitive material at a constant speed in an accurate direction. Inasmuch as a motor capable of being controlled highly precisely is expensive, the cost of the image reading device is high.

The roller pair on the drum is required to feed the photographic photosensitive material stably. The roller pair however presents an obstacle to the scanning of the photographic photosensitive material at its opposite ends in the subscanning direction, failing to meet the demand to surround the produced image with a black frame or edge.

SUMMARY OF THE INVENTION

In view of the drawbacks of the conventional sheet feed mechanisms, it is an object of the present invention to provide a sheet feed mechanism and a method of controlling the same in a light beam scanning apparatus, wherein two pairs of rollers for gripping and feeding a sheet-like medium being scanned, such as a stimulable phosphor sheet or a photographic photosensitive material, are disposed at a spacing smaller than the length of the sheet-like medium in the direction in which it is fed along, the roller pairs being synchronously rotatable, so that the sheet-like medium can be fed along accurately and smoothly in a subscanning direction by a simple and small feed structure for reading an image on or recording an image on the sheet-like medium.

According to the present invention, the above object can be achieved by a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism comprising two pairs of rollers for gripping and feeding the sheet-like medium, the two pairs of rollers being disposed at a spacing smaller than the length of the sheet-like medium in the direction in which the sheet-like medium is fed, the two pairs of rollers being synchronously rotatable for scanning the sheet-like medium in the subscanning direction, the light beam which is deflected being applicable to the sheet-like medium between the pairs of rollers for scanning the sheet-like medium in the main scanning direction.

According to the present invention, there is also provided a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism comprising two pairs of rollers for gripping and feeding the sheet-like medium, the two pairs of rollers being disposed at a spacing smaller than the length of the sheet-like medium in the direction in which the sheet-like medium is fed, an actuator for displacing one of the rollers of one of the pairs toward the other roller, and control means for controlling the actuator to displace said one roller at a prescribed speed.

According to the present invention, there is also provided a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism comprising two pairs of rollers for gripping and feeding the sheet-like medium, the two pairs of rollers being disposed at a spacing smaller than the length of the sheet-like medium in the direction in which the sheet-like medium is fed, a pair of resilient members engaging opposite ends, respectively, of a rotatable shaft of one of the rollers of at least one of the pairs, and an actuator for displacing said one roller toward the other roller through the resilient members.

According to the present invention, there is also provided a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism comprising a pair of rollers for gripping and feeding the sheet-like medium the rollers being spaced from each other by a clearance smaller than the thickness of the sheet-like medium, displacing means for displacing one of the rollers to increase the clearance, the rollers comprising a first roller and a second roller fitted in a guide hole for defining the clearance between the first and second rollers, a rotative drive source operatively coupled to the first roller for rotating the same, pressing means for pressing the second roller toward the first roller, the arrangement being such that the second roller can be displaced along the guide hole by the displacing means against the pressing force of the pressing means for thereby increasing the clearance between first and second rollers.

According to the present invention, there is also provided a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism comprising a pair of rollers for gripping and feeding sheet-like mediums of different sizes, a guide member for aligning the sheet-like mediums on one side thereof, and means for biasing the rollers to impose a greater pressure on said one side than on an opposite side of the sheet-like mediums.

According to the present invention, there is provided a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism comprising two pairs of rollers for gripping and feeding the sheet-like medium, the pairs of rollers being positioned upstream and downstream, respectively, of a scanning position in which the sheet-like medium is scanned, with respect to the direction of feed of the sheet-like medium, the pairs of rollers being disposed at a spacing larger than the length of the sheet-like medium in the subscanning direction, at least the downstream pair of rollers comprising a first roller and a second roller, a rotative drive source operatively coupled to the first roller for rotating the same, and an actuator engaging the second roller for displacing the same, the actuator having a damper mechanism, whereby the second roller can be displaced by the actuator toward the first roller to grip the sheet-like medium between the first and second rollers.

According to the present invention, there is also provided a sheet feed mechanism in a light scanning apparatus including two roller pairs each composed of a driver roller and a nip roller for gripping and feeding a sheet-like medium in a subscanning direction, the two pairs being disposed at a spacing smaller than the length of the sheet-like medium in the subscanning direction, and means for scanning the sheet-like medium between the two roller pairs in a main scanning direction with a light beam which is deflected substantially perpendicularly to the subscanning direction, for thereby two-dimensionally scanning the sheet-like medium, the nip roller of at least one roller pair disposed downstream in the subscanning direction being movable into and out of rolling contact with the driver roller of said one roller pair, the nip roller being rotated in advance of movement thereof into rolling contact with the driver roller.

According to the present invention, there is provided a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism comprising two pairs of rollers for gripping and feeding the sheet-like medium, the pairs of rollers being positioned upstream and downstream, respectively, of a scanning position in which the sheet-like medium is scanned, with respect to the direction of feed of the sheet-like medium, the pairs of rollers being disposed at a spacing smaller than the length of the sheet-like medium in the subscanning direction, and a guide plate positioned between the two pairs of rollers and movable between a first position in which the guide plate projects into abutment against the sheet-like medium fed by the upstream roller pair to stop the sheet-like medium in the first position and a second position in which the guide plate lies in the subscanning direction to support the sheet-like medium for guiding the same in the subscanning direction.

According to the present invention, there is also provided a sheet feed mechanism in a light scanning apparatus including two pairs of rollers for gripping and feeding a sheet-like medium in a subscanning direction, the two pairs being disposed at a spacing smaller than the length of the sheet-like medium in the subscanning direction, means for scanning the sheet-like medium between the two roller pairs in a main scanning direction with a light beam which is deflected substantially perpendicularly to the subscanning direction, for thereby two-dimensionally scanning the sheet-like medium, and means for releasing the sheet-like medium from gripping engagement with the pair of rollers which is disposed upstream in the subscanning direction when the leading end of the sheet-like medium is gripped by the pair of rollers which is disposed downstream in the subscanning direction.

According to the present invention, there is also provided a method of controlling a sheet feed mechanism for gripping and feeding a sheet-like medium with two pairs of rollers in a subscanning direction while the sheet-like medium is being scanned with a light beam which is deflected in a main scanning direction substantially normal to the subscanning direction, the two pairs of rollers being disposed at a spacing smaller than the length of the sheet-like medium in the subscanning direction, the two pairs being disposed upstream and downstream in the subscanning direction, the method comprising the steps of detecting the sheet-like medium, gripping and feeding the sheet-like medium with the upstream pair of rollers, then gripping and feeding the sheet-like medium with the downstream pair of rollers upon elapse of a prescribed period of time, and simultaneously releasing the sheet-like medium from gripping engagement with the upstream pair of rollers.

According to the present invention, there is also provided a method of controlling a sheet feed mechanism in a light scanning apparatus for scanning a sheet-like medium in a main scanning direction with a light beam which is deflected one-dimensionally and scanning the sheet-like medium in a subscanning direction by feeding the sheet-like medium in a direction substantially normal to the main scanning direction, for thereby two-dimensionally scanning the sheet-like medium, the sheet feed mechanism including two pairs of rollers for gripping and feeding the sheet-like medium, the two pairs of rollers being disposed at a spacing smaller than the length of the sheet-like medium in the subscanning direction, the method comprising the steps of gradually displacing one of the rollers of one of the pairs toward the other roller when the sheet-like medium is to be gripped and fed, and after said one roller has engaged the sheet-like medium, increasing a drive signal applied to means for displacing said one roller to quickly increase the force with which said one roller is pressed against the sheet-like medium for thereby gripping and feeding the sheet-like medium.

According to the present invention, there is further provided a sheet feed mechanism for feeding a sheet-like medium in a subscanning direction transverse to a main scanning direction in which the sheet-like medium is scanned by a light beam applied thereto while being deflected one-dimensionally for thereby two-dimensionally scanning the sheet-like medium, the sheet feed mechanism comprising two pairs of rollers for gripping and feeding the sheet-like medium, the pairs of rollers being spaced from each other by a distance shorter than the sheet-like medium for allowing the light beam deflected one-dimensionally to be applied to the sheet-like medium to scan the sheet-like medium in the main scanning direction, a drive source for synchronously driving the pairs of rollers, and a metal belt trained around the two pairs of rollers and/or the drive source and the pairs of rollers for synchronously driving the pairs of rollers to feed the sheet-like medium in the subscanning direction.

According to the present invention, there is also provided a method of controlling a sheet feed system having a first roller pair and a second roller pair which are spaced from each other for gripping a sheet-like medium, one of the first and second roller pairs being drivable to feed the sheet-like medium gripped therebetween in a prescribed direction, the method comprising the steps of detecting movement of the sheet-like medium gripped and fed by the first roller pair toward the second roller pair to control the speed at which rollers of the second roller pair approach a position to grip the sheet-like medium dependent on the speed at which the sheet-like medium is fed, and/or detecting movement of a trailing end of the sheet-like medium toward the first roller pair to control the speed at which rollers of the first roller pair are separated from a position to grip the sheet-like medium dependent on the speed at which the sheet-like medium is fed.

The above and other objects, features and advantages of the present invention will become more apparent from the following description when taken in conjunction with the accompanying drawings in which preferred embodiments of the present invention are shown by wa of illustrative example.

BRIEF DESCRIPTION OF THE DRAWINGS

FIG. 5 is a perspective view of a sheet feed mechanism according to still another embodiment of the present invention;

FIG. 6 is a transverse cross-sectional view of a nip roller in the sheet feed mechanism shown in FIG. 5;

FIG. 12 is a block diagram of a control system for energizing rotary solenoids in the sheet feed mechanism of FIG. 11;

FIGS. 26(a) through 26(d) are schematic views showing the manner in which rollers of the sheet feed mechanism of FIG. 24 operate;

FIG. 37 is a side elevational view of a sheet feed mechanism according to still another embodiment of the present invention;

FIGS. 39(a) through 39(c) are side elevational views showing the manner in which the sheet feed mechanism of FIG. 38 operates;

FIG. 46 is a block diagram of a nip roller controller to be incorporated in an apparatus for carrying out the method of the present invention.

DETAILED DESCRIPTION OF THE PREFERRED EMBODIMENTS

Figure 1:
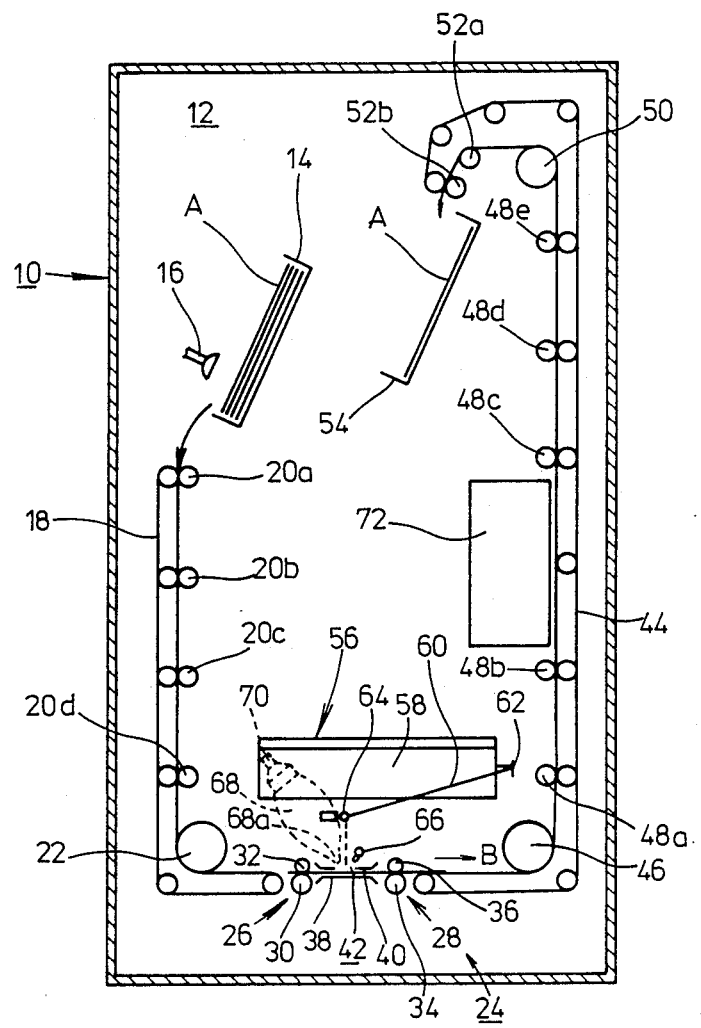
FIG. 1 is a schematic vertical cross-sectional view of a light beam scanning apparatus incorporating a sheet feed mechanism according to the present invention.

Like or corresponding parts are denoted by like or corresponding reference characters throughout this detailed description.

FIG. 1 shows an image readout device, generally designated by the reference numeral 10, incorporating therein a sheet feed mechanism according to the present invention. The image readout device 10 has a chamber 12 housing a supply magazine 14 containing a stack of stimulable phosphor sheets A each recording a radiation image thereon. A sheet delivery mechanism including a suction cup 16 is also housed in the chamber 12 adjacent to the supply magazine 14. A first endless conveyor belt 18 for feeding the stimulable phosphor sheets A, one at a time, is disposed below the suction cup 16. The first conveyor belt 18 extends vertically downwardly and is bent into a horizontal direction at an inner corner of the image readout device 10. A plurality of rollers 20a through 20d are arranged at vertical intervals along one run of the conveyor belt 18. A large-diameter roller 22 is held against the bent portion of the first conveyor belt 18. The first conveyor belt 18 has a terminal end which is slightly spaced from a sheet feed mechanism 24 for feeding the sheet in a subscanning direction.

Figure 2:
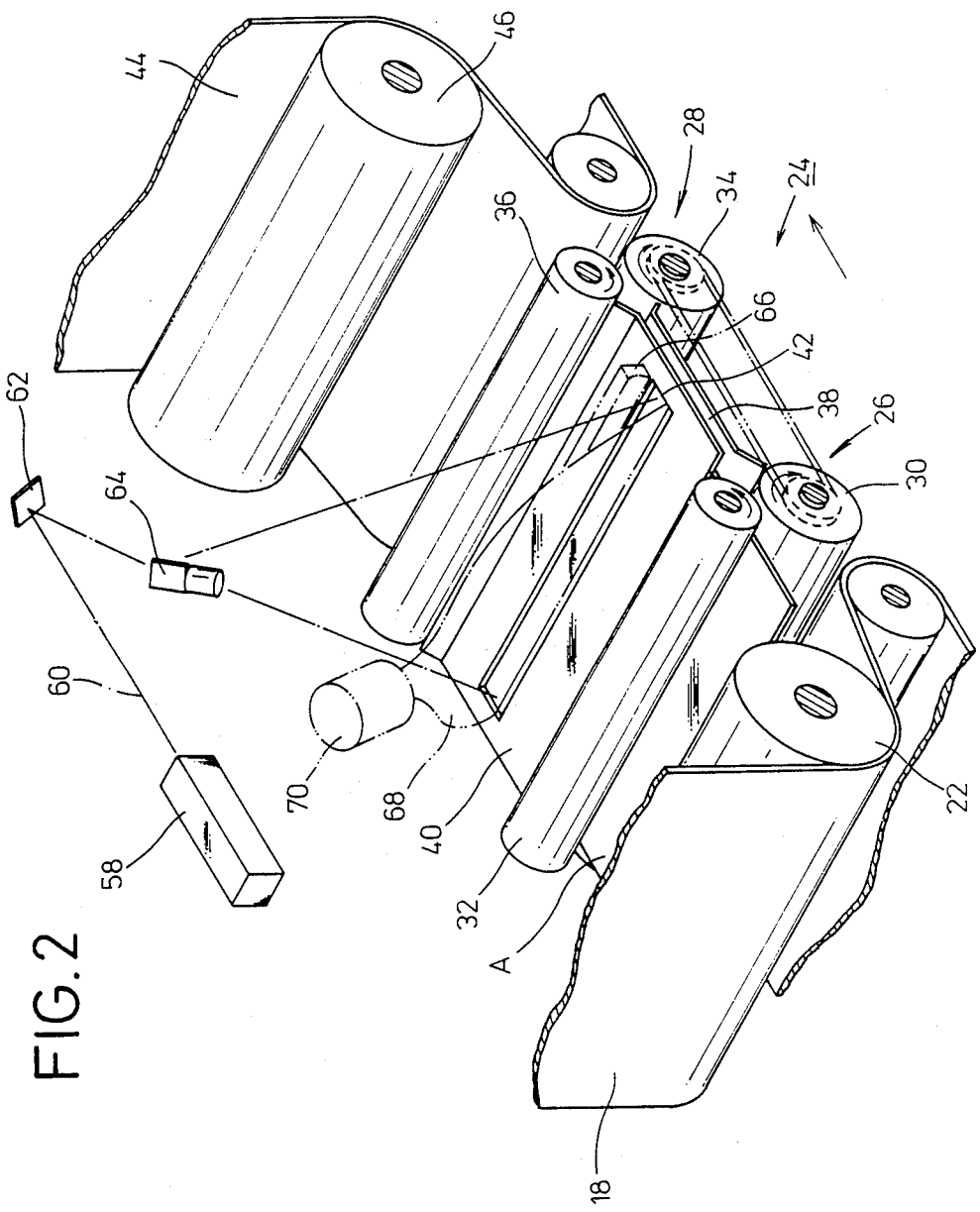
FIG. 2 is a perspective view of the sheet feed mechanism shown in FIG. 1.

As shown in FIGS. 1 and 2, the sheet feed mechanism 24 comprises first and second roller pairs 26, 28 disposed at a spacing smaller than the length of the stimulable phosphor sheet A in the direction in which it is fed. The first roller pair 26 comprises a roller 30 which is driven to rotate about its own axis and a roller 32 which is rotated by rolling contact with the roller 30. Similarly, the second roller pair 28 comprises a roller 34 which is driven to rotate about its own axis and a roller 36 which is rotated by rolling contact with the roller 34, the roller 34 being of a diameter equal to that of the roller 30. The rollers 30, 34 are rotated by a common rotative drive source through a belt, a chain, or the like (indicated by the broken lines in FIG. 2), so that the rollers 30, 34 can be rotated in synchronism with each other.

A guide member 38 is disposed between the first and second roller pairs 26, 28 for supporting the lower surface of the stimulable phosphor sheet A. Above the guide member 38, there is disposed another guide member 40 having a slit-like opening 42 defined therein and extending in a direction normal to the direction of travel of the stimulable phosphor sheet A through the sheet feed mechanism 24.

An image readout unit 56 is disposed upwardly of the sheet feed mechanism 24. The image readout unit 56 includes a laser beam source 58 for emitting a laser beam 60, a mirror 62 and a galvanometer mirror 64 for directing and deflecting the laser beam 60 to scan the stimulable phosphor sheet A through the opening 42 in the guide member 40.

The image readout unit 56 also includes a light guide 68 having an entrance end 68a positioned in confronting relation to a scanning line on the sheet A and located within the opening 42. A photomultiplier 70 is mounted on the upper end (exit end) of the light guide 68. A light-collecting reflecting mirror 66 is disposed in opposite relation to the entrance end 68a across the scanning line for efficiently guiding light emitted from the stimulable phosphor sheet A toward the entrance end 68a.

As shown in FIG. 1, a second endless conveyor belt 44 is positioned in the vicinity of the second roller pair 28. The second conveyor belt 44 includes a horizontal portion extending over a certain distance and a vertical portion extending upwardly from the end of the horizontal portion and having an upper end portion directed horizontally and then slightly downwardly. A large-diameter roller 46 is held against the lower bent portion of the second conveyor belt 44. A plurality of rollers 48a through 48e are disposed at spaced intervals along one run of the vertical portion of the second conveyor belt 44. A large-diameter roller 50 and rollers 52a, 52b are held against the upper bent portion of the second conveyor belt 44 for feeding the stimulable phosphor sheet A vertically downwardly along the downward upper end portion of the second conveyor belt 44. A receiver magazine 54 is disposed adjacent to the roller 52b for storing the stimulable phosphor sheets A from the second conveyor belt 44.

An erase unit 72 is housed in the chamber 12 between the rollers 48b, 48c confronting the second conveyor belt 44. The erase unit 72 accommodates a plurality of erasure light sources (not shown) therein.

Operation of the image readout device 10 with the sheet feed mechanism 24 incorporated therein will be described below.

First, the supply magazine 14 is loaded into the image readout device 10. The supply magazine 14 contains a stack of stimulable phosphor sheets A each recording a radiation image of an object such as a human body, for example. The stimulable phosphor sheets A are picked up, one by one, from the supply magazine 14 by the sheet delivery mechanism including the suction cup 16. The stimulable phosphor sheet A is then delivered to the sheet feed mechanism 24 through the first conveyor belt 18 below the suction cup 16 and the rollers 20a through 20d and 22 which coact with the first conveyor belt 18.

The stimulable phosphor sheet A which has reached the sheet feed mechanism 24 is gripped by the first roller pair 26, i.e., between the rollers 30, 32, and fed thereby in the direction of the arrow B (FIG. 2). At this time, the image readout unit 56 is energized to emit the laser beam 60 from the laser beam source 58. The laser beam 60 from the laser beam source 58 is reflected by the mirror 62 and then deflected by the galvanometer mirror 64 which is oscillating back and forth for thereby scanning the stimulable phosphor sheet A in the main scanning direction. Light emitted in all directions from the stimulable phosphor sheet A upon exposure to the laser beam 60 is directly applied to or reflected by the reflecting mirror 66 into the light guide 68. The light that has entered the light guide 68 is converted by the photomultiplier 70 to an electric signal, which is then supplied to an image recording device, for example.

In this manner, the stimulable phosphor sheet A is two-dimensionally scanned by the laser beam 60. The stimulable phosphor sheet A is also gripped by the second roller pair 28 and transported thereby in the direction of the arrow B to pass through the image readout unit 56 so that all image signals can be read from the sheet A. Then, the stimulable phosphor sheet A is conveyed by the second conveyor belt 44 and the rollers 46, 48a, 48b to the erase unit 72. The non-illustrated erasure light source in the erase unit 72 is energized to apply erasing light to the stimulable phosphor sheet A to erase any remaining radiation image therefrom.

Thereafter, the stimulable phosphor sheet A is fed upwardly by the second conveyor belt 44 and the rollers 48c through 48e into an upper portion of the image readout device 10, in which the sheet A is guided by the rollers 50, 52a, 52b to pass along the downward path into the receiver magazine 54.

As described above, the distance between the roller pairs 26, 28 of the sheet feed mechanism 24 is smaller than the length of the stimulable phosphor sheet A in the direction in which it is fed, and the roller pairs 26, 28 are rotated in synchronism with each other. Therefore, when the stimulable phosphor sheet A goes through the sheet feed mechanism 24, the sheet A is first gripped by the first roller pair 26 and fed thereby in the direction of the arrow B. Thereafter, while the trailing end of the sheet A is being gripped and pushed out by the first roller pair 26, the leading end of the sheet A is moved toward the second roller pair 28, so that the sheet A can be fed smoothly from the first roller pair 26 to the second roller pair 28. Since the stimulable phosphor sheet A is fed along by being always gripped by at least one of the first and second roller pairs 26, 28, the sheet A is prevented from being displaced out of the direction of feed thereof.

As a consequence, the stimulable phosphor sheet A is fed accurately and smoothly without displacement after the leading end of the sheet A reaches the first roller pair 26 until the trailing end of the sheet A disengages from the second roller pair 28. The radiation image recorded on the stimulable phosphor sheet A can therefore be read highly accurately. The guide members 38, 40 between the roller pairs 26, 28 are effective in guiding the stimulable phosphor sheet A until the leading end thereof reaches the second roller pair 28. The laser beam 60 deflected by the galvanometer mirror 64 is applied to the stimulable phosphor sheet A through the slit-like opening 42 defined in the guide member 40. Therefore, when a stimulable phosphor sheet A is fed to the image readout unit 56 right after the radiation image of an object has been recorded on the sheet A, remaining light emitted from the sheet A upon exposure to the radiation is prevented by the guide member 40 from reaching the light guide 68.

When the stimulable phosphor sheet A is exposed to the laser beam 60, the sheet A emits light commensurate with the radiation image recorded on the sheet A. It has been confirmed that such light is not emitted out instantaneously, but remains to be emitted from the sheet A for a certain period of time (see Japanese Patent Application No. 58(1983)-153691).

Such remaining light emitted from the sheet A is also prevented by the guide member 40 from reaching the light guide 68. Inasmuch as light emitted from the sheet A upon exposure to the radiation and light emitted from the sheet A upon exposure to the laser beam 60 are prevented by the guide member 40 from entering the light guide 68, radiation image information obtained from the stimulable phosphor sheet A is clear and accurate. The stimulable phosphor sheet A is fed through the sheet feed mechanism 24 by being gripped by the roller pairs 26, 28. This arrangement allows the image readout device 10 to be as small in size as possible because those portions of the covneyor belts 18, 44 which are positioned near the roller pairs 26, 28, respectively, are not required to extend horizontally.

A radiation image recording and reproducing system includes an image recording device for permanently recording radiation image information from a stimulable phosphor sheet on a recording material such as a photographic photosensitive material. The image is recorded on the photographic photosensitive material by applying a laser beam modulated by the radiation image information to the photographic photosensitive material. The sheet feed mechanism of the present invention can also be incorporated in such a image recording device for accurately and smoothly feeding the photographic photosensitive material to record a clear and accurate image thereon.

Figure 3:
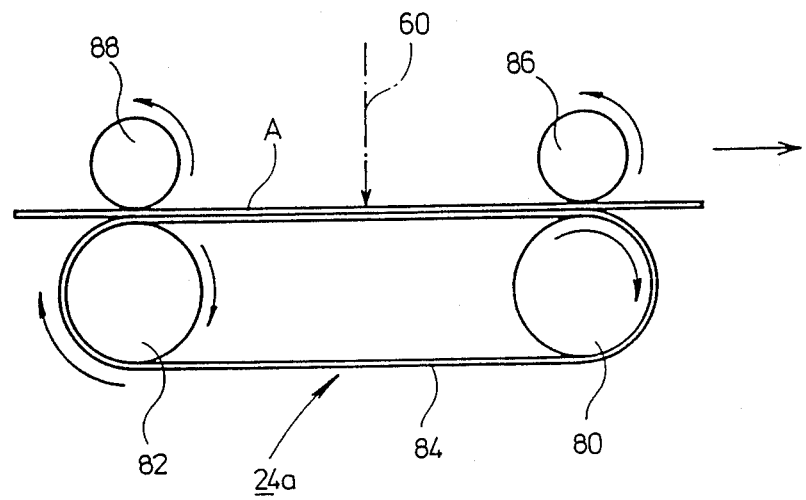
FIGS. 3 and 4 are side elevational views of sheet feed mechanisms according to other embodiments of the present invention.
Figure 4:
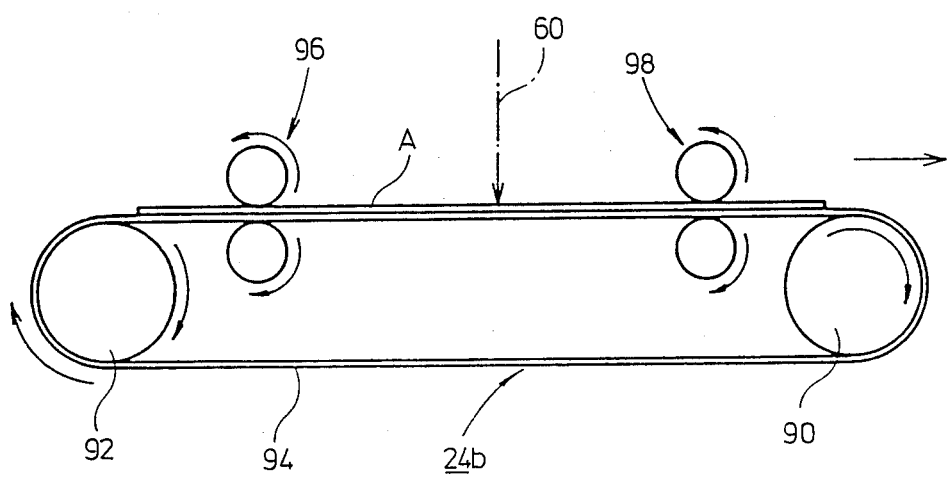

Sheet feed mechanisms according to other embodiments of the present invention ar shown in FIGS. 3 and 4. FIG. 3 illustrates a second embodiment in which a roller 80 of a sheet feed mechanism 24a is coupled to a rotative drive source (not shown), and an endless belt 84 is trained around the roller 30 and another roller 82 having the same diameter as that of the roller 80. The rollers 80, 82 are spaced from each other by a distance smaller than the length of the stimulable phosphor sheet A in the direction of travel thereof through the sheet feed mechanism 24a. A smaller-diameter roller 86 is disposed above the roller 80, and a smaller-diameter roller 88 is disposed above the roller 82. Therefore, when the non-illustrated rotative drive source is actuated to rotate the roller 80 in the direction of the arrow, the roller 82 is also rotated in synchronism through the belt 84. The stimulable phosphor sheet A, upon arrival at a position between the rollers 82, 88, is fed in the direction of the arrow by the belt 84 and the roller 88, and then the leading end of the sheet A is gripped between the belt 84 and the roller 86, which then feed the sheet A. At this time, the rollers 80, 82 are synchronously rotated to cause the stimulable phosphor sheet A to be fed smoothly through the sheet feed mechanism 24a. Between the rollers 88, 86, the stimulable phosphor sheet A is placed on the belt 84 which functions in the same manner as the guide member 38 in the first embodiment.

According to a third embodiment shown in FIG. 4, a roller 90 of a sheet feed mechanism 24b is coupled to a rotative drive source (not shown), and a roller 92 equal in diameter to the roller 90 is operatively coupled to the roller 90 through a belt 94 for synchronous rotation. Two roller pairs 96, 98 are disposed between the rollers 90, 92 in sandwiching relation to an upper run of the belt 94. The distance between the rollers 96, 98 is also smaller than the length of the stimulable phosphor sheet A in the direction of feed thereof.

By rotating the roller 90, the roller 92 and the roller pairs 96, 98 are rotated through the belt 94. The stimulable phosphor sheet A as it reaches the sheet feed mechanism 24b is first gripped, at its leading end, by the roller pair 96, and fed with the belt 94 in the direction of the arrow by the roller pair 96. Then, with the leading end of the stimulable phosphor sheet A being gripped by the roller pair 96, the sheet A is gripped and fed by the roller pair 98 in the direction of the arrow. Since the roller pairs 96, 98 are rotated in synchronism with each other, the stimulable phosphor sheet A can smoothly and accurately be fed along.

FIGS. 5 and 6 illustrate a sheet feed mechanism according to another embodiment of the present invention. In the embodiment shown in FIG. 2, the rollers 30, 34 are synchronously rotated by the belt trained around their pulleys. According to the embodiment shown in FIGS. 5 and 6, however, a larger-diameter idler pulley 100 is disposed between he rollers 30, 34 in rolling contact with the circumferential surfaces of the rollers 30, 34, the roller 34 being coupled to a rotative drive source 102 comprising a motor.

The idler pulley 100 may be of such dimensions as to be held in rolling contact with the rollers 30, 34 over their entire circumferential width, or may alternatively be held in rolling contact with pulleys mounted on axial ends of the rollers 30, 34. The nip roller 36 contacting the roller 24 may be of the same material as that of the nip roller 32, e.g., synthetic rubber or the like having a large coefficient of friction. Preferably, the nip roller 36 comprises, as shown in FIG. 6, a cylindrical body 35b made of a foamed resilient material is fitted over a shaft 36a of metal on which the roller 36 is rotatably supported.

When the rotative drive source 102 is energized, the roller 34 is rotated to rotate the roller 36 and the idler pulley 100, which then rotates the roller 30. Therefore, the nip roller 32 is also rotated in the same direction as that of rotation of the nip roller 36. At the moment the leading end of the stimulable phosphor sheet A is gripped by the roller pair 26, at the moment the leading end of the sheet A is gripped by the roller pair 28, at the moment the trailing end of the sheet A is released from the roller pair 26, or at the moment the sheet A is released from the roller pair 28, any of load variations imposed on the roller pair 26 or 28 is transmitted to the motor 102, which can therefore be controlled in a feedback loop to enable the roller pairs 26, 28 to feed the sheet A smoothly in the direction of the arrow B irrespective of such load variations. Since the nip roller 36 of the roller pair 28 includes the cylindrical body 36b of a foamed resilient material, a load variation on the roller pair 28 at the time the leading end of the stimulable phosphor sheet A is gripped by the roller pair 28 can be absorbed by elastic deformation of the cylindrical body 36b. Therefore, such a load variation which is produced when the stimulable phosphor sheet A is gripped or released can be eliminated by elastic deformation of the cylindrical body 36b, for thereby allowing the sheet A to be fed smoothly by the roller pairs 26, 28 in the direction of the arrow B, without causing changes in the rate of travel.

In the illustrated embodiment, only the nip roller 36 of the downstream roller pair 28 is composed of a foamed resilient cylindrical body. However, the nip roller 32 of the roller pair 26 may also comprise such a foamed resilient cylindrical body for absorbing load variations produced at the moment the trailing end of the sheet A is released from the upstream roller pair 26.

When the sheet A is fed along by a pair of rollers, a shock may be caused by a surface irregularity on the sheet A as it is gripped by the rollers, resulting in an image readout or recording irregularity. More specifically, a label bearing a bar code that represents identification data such as a sheet number is sometimes applied to the reverse side of a stimulable phosphor sheet which is opposite to the surface exposed to the stimulating laser beam. The bar code is optically read and recorded in a system controller in association with patient information or imaging information of the radiation image recorded on the sheet A. Since the label with the bar code thereon has a certain thickness, the reverse side of the sheet A has a step of different thickness where the label is applied. When the stimulable phosphor sheet is fed by the rollers in the subscanning direction, therefore, the step hits one of the rollers and imposes a shock thereon. The stimulable phosphor sheet is vibrated by such a shock, with the result that the stimulating laser beam is not applied properly to the sheet.

The label is normally applied to the stimulable phosphor sheet closely to a side thereof. Therefore, the sheet has different thicknesses in the main scanning direction. Since the roller engages the sheet in an oblique fashion because of such different thicknesses, the sheet may not be fed accurately in the subscanning direction. As a result, the radiation image reproduced from the stimulable phosphor sheet may be unclear.

Figure 7:
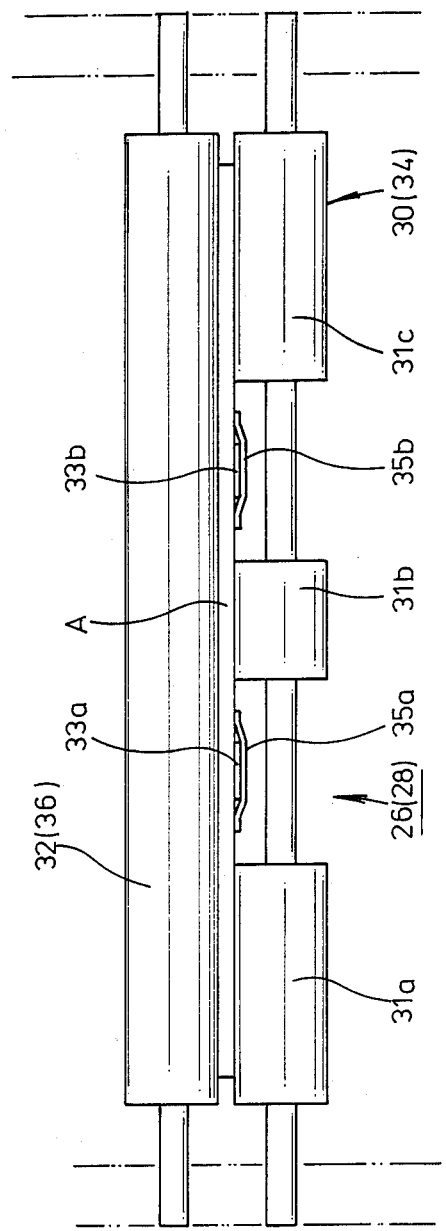
FIG. 7 is a side elevational view of a roller for feeding, without shocks, a stimulable phosphor sheet with bar code data thereon.

FIG. 7 shows a sheet feed mechanism according to still another embodiment for eliminating the aforesaid drawback. As shown in FIG. 7, each of the rollers 30, 34 of the roller pairs 26, 28 comprises rollers 31a, 31b, 31c which are axially spaced from each other. Labels 33a, 33b bearing identification symbols are applied at a spaced interval by adhesive tapes 35a, 35b, respectively, to one surface (lower surface in FIG. 7) of a stimulable phosphor sheet A.

When the stimulable phosphor sheet A is fed into the image readout unit, the label 33a enters the gap between the rollers 31a, 31b, whereas the label 33b enters the gap between the rollers 31b, 31c. Therefore, the labels 33a, 33b do not hit the rollers 31a, 31b, 31c and hence do not impose shocks which would otherwise produce readout irregularities while the stimulable phosphor sheet A is being fed along.

Various other structures are proposed according to the present invention for eliminating readout irregularities which would otherwise result from a nip roller engaging the stimulable phosphor sheet A at the time the image recorded on the sheet is read.

Figure 8:
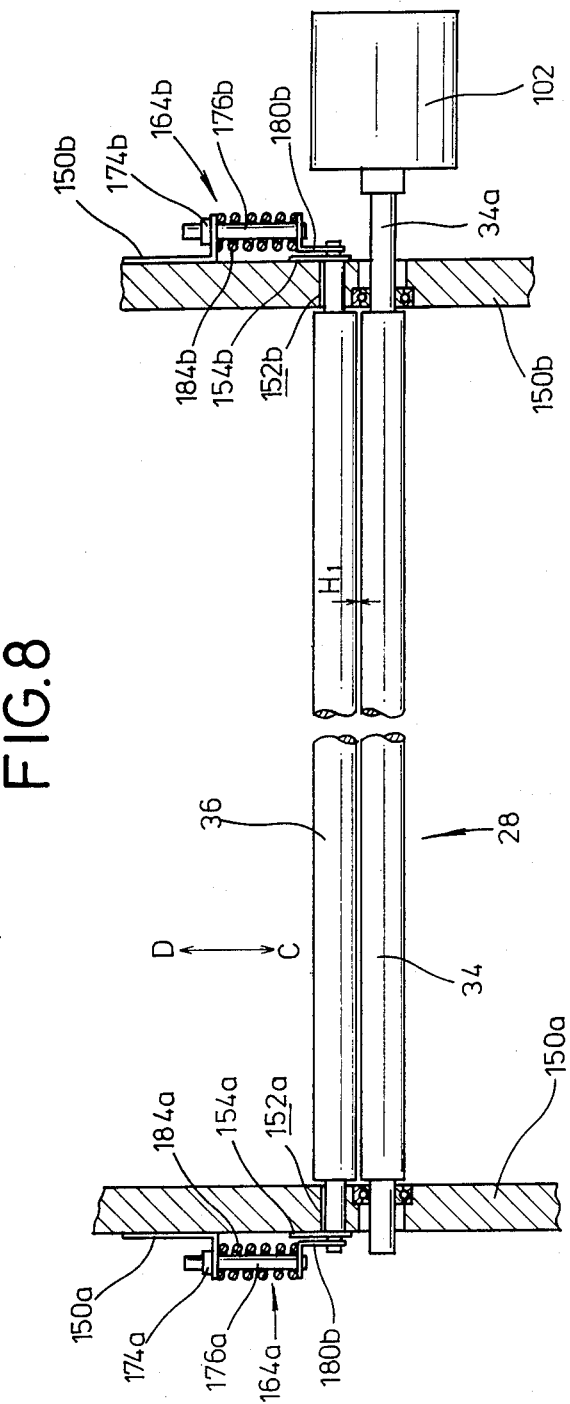
FIG. 8 is a front elevational view, partly in cross section, of a sheet feed mechanism according to a still further embodiment of the present invention.
Figure 9:
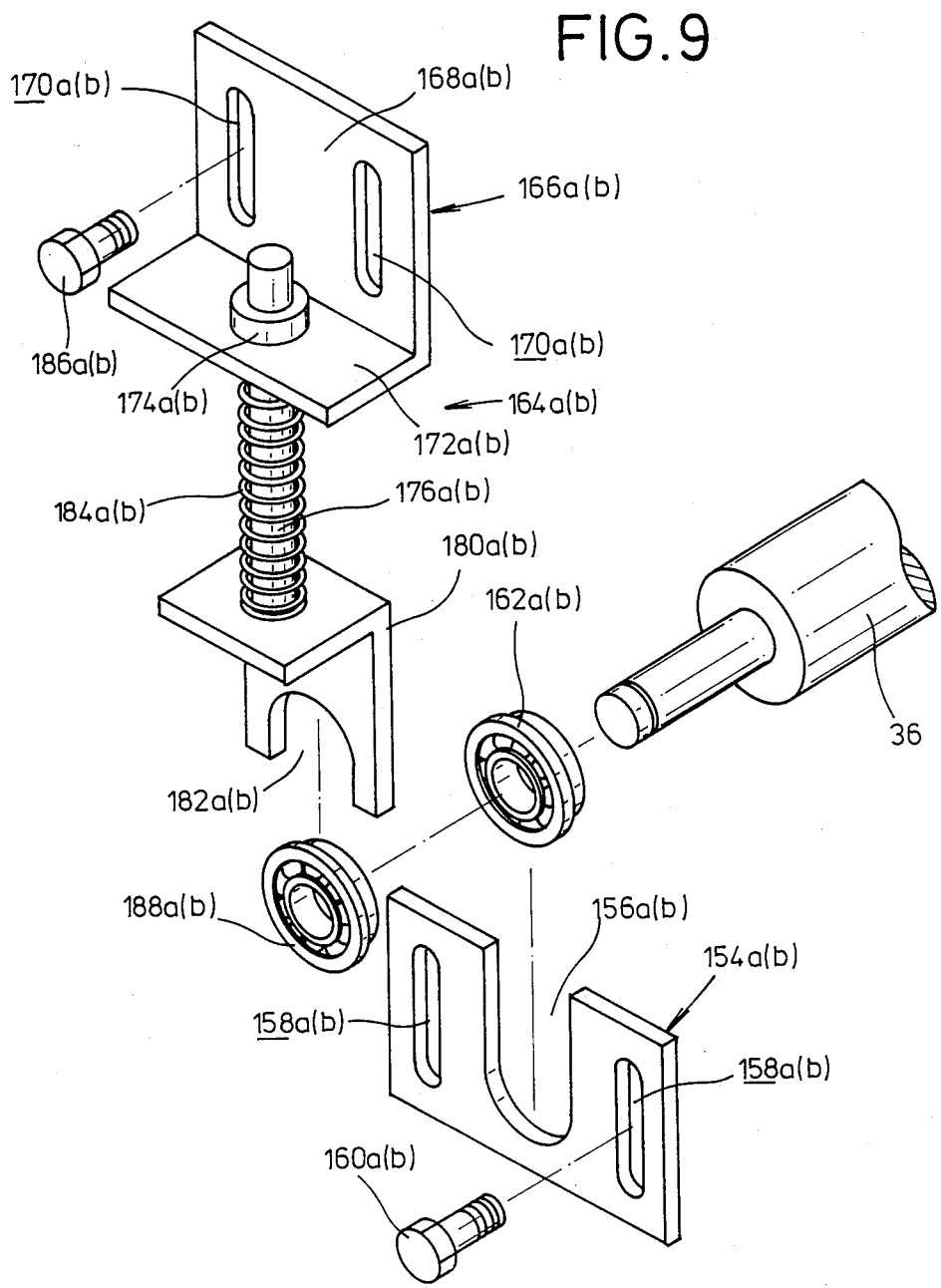
FIG. 9 is an exploded perspective view of a means for pressing a nip roller in the sheet feed mechanism illustrated in FIG. 8.
Figure 10:
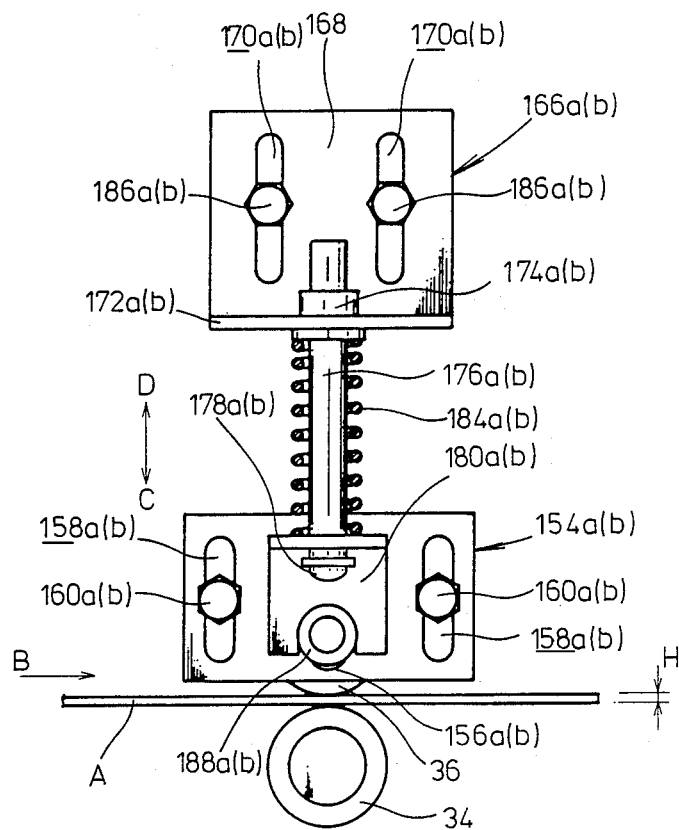
FIG. 10 is a front elevational view of the pressing means shown in FIG. 9.

An embodiment directed to one such structure is illustrated in FIGS. 8 through 10. According to this embodiment, the downstream roller pair 28 is arranged as follows: As illustrated in FIG. 8, the roller 34 of the roller pair 28 is rotatably supported by a pair of support plates 150a, 150b erected in the image readout device 10, and has a shaft 34a coupled to the drive shaft of the rotative drive source 102.

The nip roller 36 has opposite ends fitted in slots 152a, 152b, respectively, defined in the support plates 150a, 150b, and supported by stoppers 154a, 154b, respectively. As shown in FIG. 9, the stoppers 154a, 154b have central openings 156a, 156b which open upwardly and have lower ends defined by semicircular edges. The stoppers 154a, 154b also have vertical slots 158a, 158b defined in opposite ends, respectively, thereof.

The stoppers 154a, 154b are positioned on and secured to the support plates 150a, 150b, respectively, by bolts 160a, 160b, and bearings 162a, 162b mounted respectively on the opposite ends of the roller 36 are fitted respectively in the openings 156a, 156b. Pressing means 164a, 164b are mounted respectively on the support plates 150a, 150b. The pressing means 164a, 164b include L-shaped brackets 166a, 166b, respectively, having first vertical plates 168a, 168b with a pair of vertical slots 170a, 170b defined therein.

The L-shaped brackets 166a, 166b also include second horizontal plates 172a, 172b to which rods 176a, 176b are secured, respectively, by retainers 174a, 174b. The rods 176a, 176b have on their lower ends flanges 178a, 178b (FIG. 10), and are fitted in holes (not shown) defined in pressers 180a, 180b, respectively, which are retained by the flanges 178a, 178b. The pressers 180a, 180b are of an L shape including vertical members with semicircular elongate openings 182a, 182b defined in the lower ends thereof. Compression coil springs 184a, 184b are disposed around the rods 176a, 176b, respectively, between the pressers 180a, 180b and the brackets 166a, 166b.

The pressing means 164a, 164b are fixedly mounted on the support plates 150a, 150b, respectively, by bolts 186a, 186b extending through the slots 170a, 170b threadedly into threaded holes defined in the support plates 150a, 150b. Bearings 188a, 188b mounted on the opposite ends of the roller 36 are fitted respectively in the openings 182a, 182b of the pressing means 180a, 180b.

The roller pair 28 is essentially constructed as described above. Although not shown, the roller pair 26 may also be constructed in the same design.

The roller pair 28 operates as follows: When the device is assembled, the distance H1 between the rollers 34, 36 of the roller pair 28 is adjusted to a preset distance. More specifically, the stoppers 154a, 154b are displaced through their slots 158a, 158b over the bolts 160a, 160b in the direction of the arrow C or D (FIG. 8) to adjust the distance H1 between the rollers 34, 36. Thereafter, the stoppers 154a, 154b are fixed to the support plates 150a, 150b by tightening the bolts 160a, 160b. In practice, the stimulable phosphor sheet A has a thickness H (FIG. 1) ranging from about 0.5 mm to 0.7 mm. It is preferable to select the distance H1 in the range of from about 0.3 to 0.4 mm. The distance H1 between the rollers 34, 36 can easily be adjusted and hence the roller 36 can easily be positioned with respect to the roller 34 by using a clearance gage.

Then, the pressing means 164a, 164b are positioned by displacing the brackets 166a, 166b in the direction of the arrow C or D to adjust the forces with which the roller 36 is pressed toward the roller 34 by the pressers 180a, 180b under the resiliency of the springs 184a, 184b, and then tightening the bolts 186a, 186b to secure the brackets 166a, 166b to the support plates 150a, 150b.

The stimulable phosphor sheet A fed from the supply magazine 14 is gripped by the roller pair 26, i.e., the rollers 30, 32, and delivered thereby in the direction of the arrow B. At this time, the image readout unit 56 is energized to apply the laser beam to the sheet A, and light emitted from the sheet A is photoelectrically converted by the photomultiplier 70 into an electric signal for reading the recorded image, in the same manner as described above.

While the recorded image is being thus read out, the stimulable phosphor sheet A starts to be gripped by the roller pair 28. Since the distance or clearance H1 of the roller pair 28 is smaller than the thickness H of the stimulable phosphor sheet A, the stimulable phosphor sheet A can smoothly be fed along through the image readout device. More specifically, the stimulable phosphor sheet A is first gripped by the roller pair 26, i.e., it is displaced in the direction of the arrow B to cause its leading end to be introduced into the roller pair 26. Inasmuch as the clearence H1 is defined between the rollers 34, 36, the stimulable phosphor sheet A can easily enter between the rollers 34, 36 through the clearance H1. With the clearance H1 slightly smaller than the thickness H of the stimulable phosphor sheet A, the roller 36 is displaced in the direction of the arrow D (FIG. 10) against the resiliency of the springs 180a, 180b as the sheet A enters the roller pair 28. The roller 36 is pressed against the upper surface of the sheet A under the resiliency of the springs 184a, 184b, and the sheet A is gripped between the roller 36 and the roller 34 which is rotated by the motor 102, and fed by the rollers 36, 34 in the direction of the arrow B.

The clearance H1 between the rollers 34, 36 allows the stimulable phosphor sheet A to be gripped by the rollers 34, 36 more smoothly and easily and with a less shock than would be if the roller 36 were displaced out of contact with the roller 34 by the sheet A. Accordingly, unwanted displacement or vibration of the laser beam on the sheet A due to such a shock can be avoided. For reading a radiation image from the stimulable phosphor sheet A over its entire surface in the image readout unit, the roller 26 may be of the same structure as that of the roller 28 to eliminate shocks when the stimulable phosphor sheet A enters the roller pair 26 and is released from the roller pair 28. Therefore, the radiation image recorded on the entire surface of the stimulable phosphor sheet A can smoothly and accurately be read out.

The clearance H1 between the rollers of the roller pairs 26, 28 is also advantageous for the reason that where the rollers 32, 36 are made of a soft material such as polyurethane rubber to avoid scratches on the stimulable phosphor sheet A, they are prevented from being deformed since they are not pressed against each other. As a consequence, the roller pairs 26, 28 can feed the sheet A accurately in the subscanning direction.

Because the stimulable phosphor sheet A is fed by being gripped by the roller pairs 26, 28, the portions of the conveyor belts 18, 44 which are close to the roller pairs 26, 28 are not required to extend horizontally, and hence the image readout device 10 can be reduced in size.

In the embodiment shown in FIGS. 8 through 10, shocks produced when the stimulable phosphor sheet A enters or leaves the image readout unit are mechanically dampened. Such shocks can also be avoided by a combination of a mechanical arrangement and an electric control system.

Figure 11:
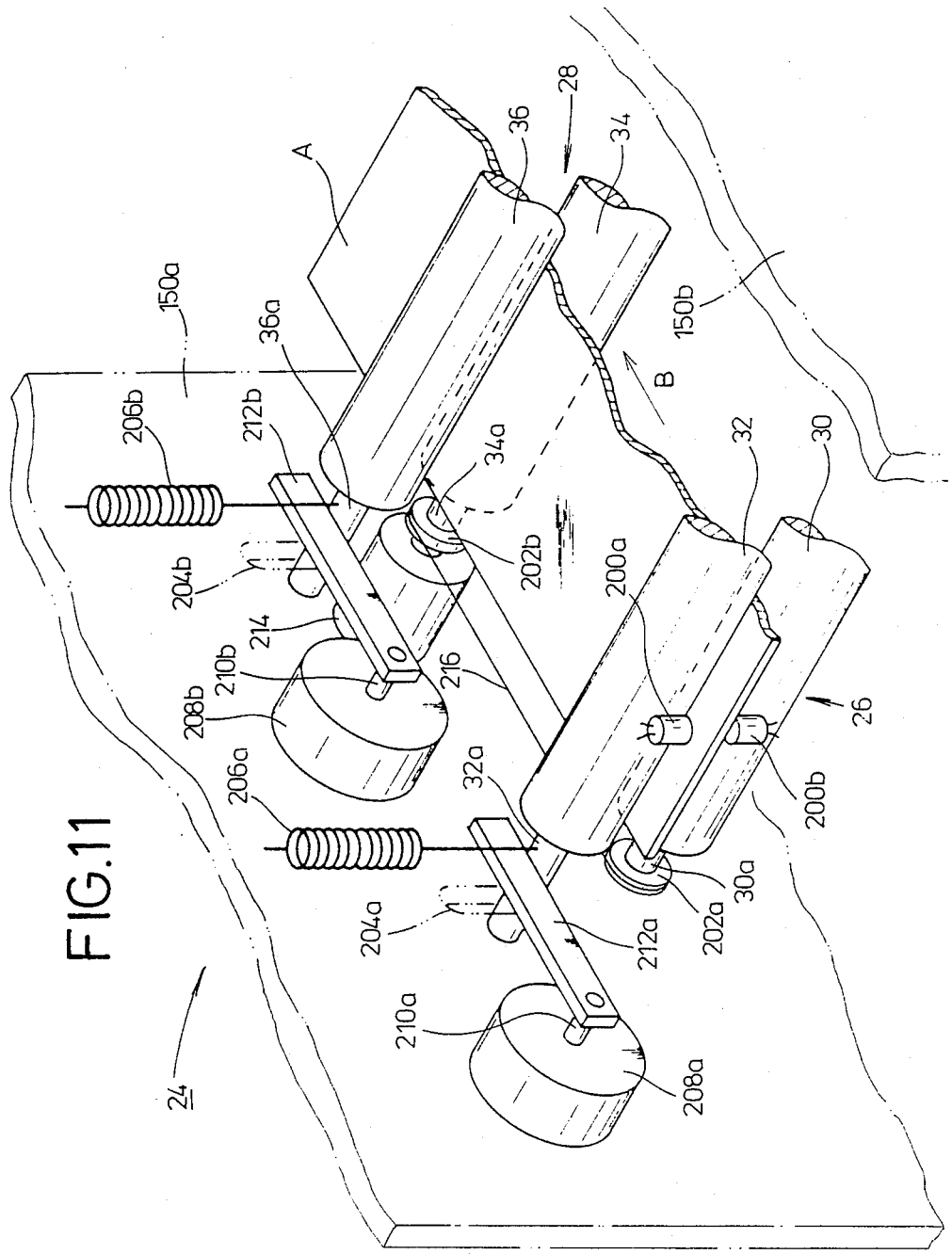
FIG. 11 is a fragmentary perspective view of a sheet feed mechanism in accordance with a yet still further embodiment of the present invention.
Figure 13B:
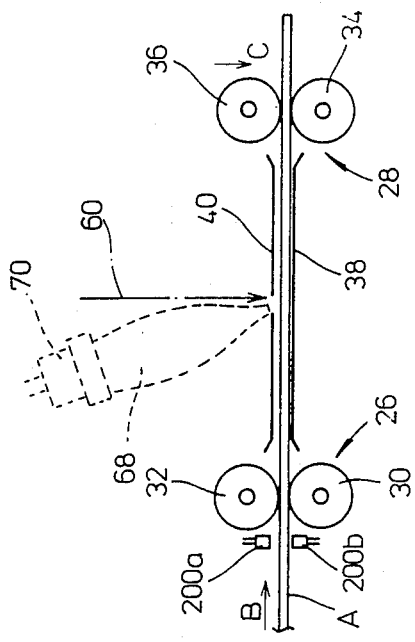
FIGS. 13(a) through, 13(d) are schematic views showing the manner in which rollers of the sheet feed mechanism of FIG. 11 operate.
Figure 13D:
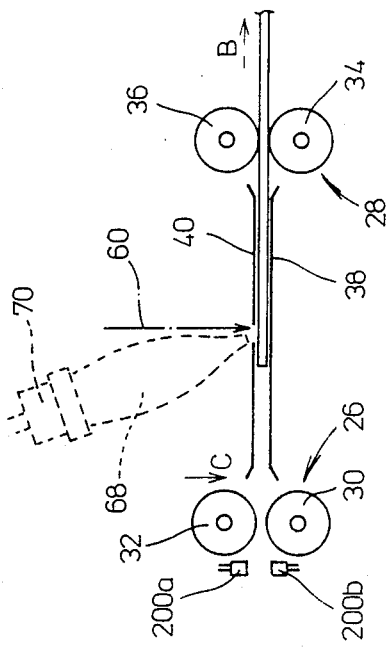
Figure 13A:
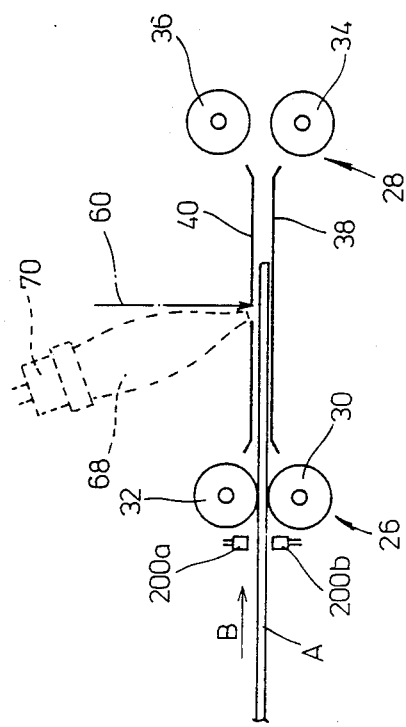
Figure 13C:
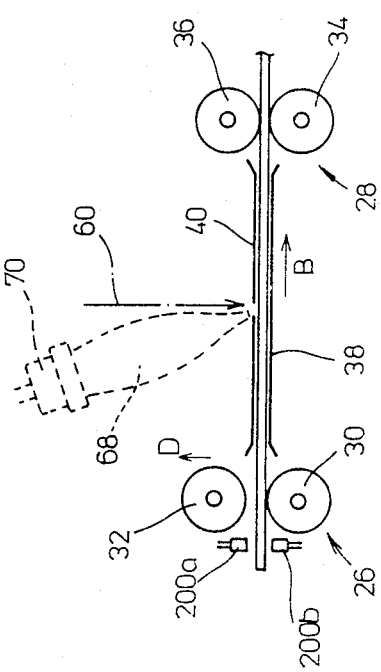
Figure 14:
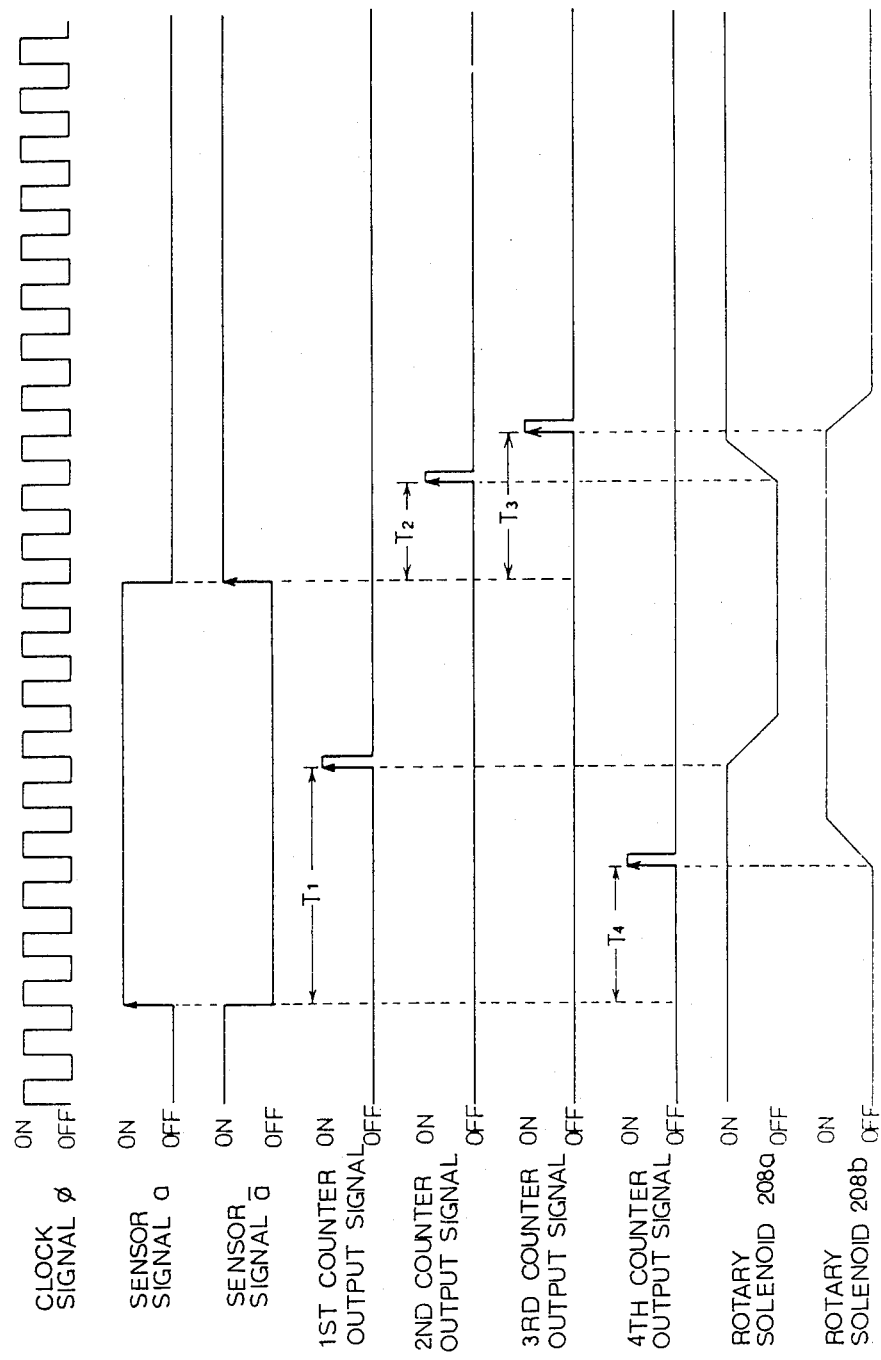
FIG. 14 is a timing chart showing the correlation between the rotary solenoids, sensor signals, and counter output signals in the sheet feed mechanism of FIG. 11.

A sheet feed mechanism according to a still further embodiment shown in FIGS. 11 through 14 includes such an electromechanical arrangement for avoiding unwanted shocks from the stimulable phosphor sheet A. As shown in FIG. 11, the sheet feed mechanism 24 includes an upstream roller pair 26 and a downstream roller pair 28 between which the guide members (not shown) for guiding the stimulable phosphor sheet A is disposed. A pair of sensors 200a, 200b is disposed just upstream of the roller pair 26 for detecting the stimulable phosphor sheet A as it is fed.

Preferably, a light beam of such an wavelength or energy level which will not erase the image information recorded on the stimulable phosphor sheet A is emitted from one of the sensors 200a, 200b to the other sensor. The stimulable phosphor sheet A can therefore be detected when the light beam is cut off by the sheet A. The roller pairs 26, 28 are controlled by a control mechanism shown in FIG. 12. The opposite ends of the roller 30 are rotatably supported by the support plates 150a, 150b, respectively, erected in the image readout device 10, in the same manner as described with reference to the embodiment of FIG. 6. The roller 30 has a shaft 30a on which a pulley 202a is mounted. The roller 32 has a shaft 32a having an end fitted in a vertical slot 204a defined in the support plate 150a. The roller 32 is normally urged to move in a direction away from the roller 30 by a coil spring 206a coupled to the shaft 32a. The other end of the roller shaft 32a is rotatably supported by the support plate 150b. An arm member 212a which is angularly movable by the rotatable shaft 210a of a rotary solenoid 208a is held in abutment against the shaft 32a. The rotary solenoid 208a is secured to the support plate 150a and can operate under the control of an electric control system or circuit (described later) for turning the arm member 212a against the resiliency of the coil spring 206a to displace the roller 32 toward the roller 30.

The roller 34 of the roller pair 28 has a shaft 34a with a pulley 202b mounted thereon. The pulley 202b is operatively coupled to the pulley 202a by an endless belt 216 trained around the pulleys 202a, 202b. The control mechanism associated with the roller pair 28 is the same as the control mechanism associated with the roller pair 26, and its components are denoted by corresponding reference numerals with a suffix b and will not be described in detail.

The rotary solenoids 208a, 208b are controlled by an electric control system or circuit as follows: As shown in FIG. 12, the control circuit includes first through fourth counters 220a, 220b, 220c, 220d for counting a clock signal $\phi$ up to T1, T2, T3, T4, respectively, from the time when a reset signal is applied, a driver 230a for energizing the rotary solenoid 208a in response to output signals from the first and second counters 220a, 220b, and a driver 230b for energizing the rotary solenoid 208b in response to output signals from the third and fourth counters 220c, 220d. The first and fourth counters 220a, 220d are supplied with a reset signal which is a sensor signal a from the sensors 200a, 200b, and the second and third counters 220b, 220c are supplied with a reset signal which is an inverted signal $\bar{a}$ of the sensor signal a applied from an inverter 240.

Before the stimulable phosphor sheet A reaches the roller pair 26, the downstream rotary solenoid 208b remains de-energized. Therefore, the arm member 212b secured to the rotatable shaft 210b of the rotary solenoid 208b does not press the shaft 36a of the nip roller 36 toward the roller 34. The roller 36 remains displaced upwardly along the slot 204b under the force of the coil spring 206b, keeping a prescribed gap between the rollers 34, 36. The rotary solenoid 208a is energized before the stimulable phosphor sheet A reaches the roller pair 26. Thus, the arm member 212a is pressed by the rotary solenoid 208a against the shaft 32a against the resiliency of the coil spring 206a to position the roller 32 closely to the roller 30.

When the stimulable phosphor sheet A is conveyed by the belt conveyor 18 until its leading end reaches a position between the sensors 200a, 200b in front of the roller pair 26, the sensors 200a, 200b issue a sensor signal a which is applied as a reset signal to the first and fourth counters 220a, 220d, which are triggered by the positive-going edge of the reset signal to start counting the clock signal $\phi$. Then, the leading end of the stimulable phosphor sheet A enters between the rollers 30, 32 to feed the sheet A in the subscanning direction of the arrow B, whereupon the image recorded on the sheet A starts to be read out by the image readout unit 56 (FIG. 13(a)).

When the fourth counter 220d counts the clock signal $\phi$ for a time period T4, it energizes the driver 230b to supply a driving current to the rotary solenoid 208b, the driving current increasing with time for an initial interval. The rotary solenoid 208b is now energized to cause the shaft 210b to rotate in the direction to turn the arm member 212b to press the roller shaft 36a toward the roller 34 against the resiliency of the coil spring 206b. As a result, the shaft 36a is moved downwardly along the slot 204b to displace the roller 36 gradually toward the roller 34 at a constant speed. The leading end of the stimulable phosphor sheet A has already been introduced over the roller 34, and is now smoothly gripped between the rollers 34, 36 to impose a stress on the sheet A (FIG. 13(b)).

Therefore, the stimulable phosphor sheet A is gripped, without shocks, between the rollers 34, 36, and fed thereby in the direction of the arrow B. As the sheet A is thus fed along, the recorded image is read from the sheet A by the image readout unit 56.

When the first counter 220a counts the clock signal $\phi$ for a time period T1 (T1>T4) from the positive-going edge of the reset signal, the first counter 220a applies a stop signal to the driver 230a to stop supplying the driving current to the rotary solenoid 208a. Therefore, the arm member 212a is angularly displaced away from the shaft 30a under the resiliency of the coil spring 206a to move the roller 32 away from the roller 30 (FIG. 13(c)). Since, at this time, the leading end of the stimulable phosphor sheet A is firmly gripped by the rollers 34, 36, the sheet A is continuously fed in the subscanning direction without being shocked by the roller 32 as it is moved away from the roller 30.

Thereafter, the trailing edge of the stimulable phosphor sheet A moves past the sensors 200a, 200b. An inverted sensor signal $\bar{a}$ from the inverter 240 is now applied as a reset signal to the second and third counters 220b, 220c, which then start counting the clock signal $\phi$ from the positive-oing edge of the sensor signal a.

When the second counter 220b counts the clock signal $\phi$ for a time period T2, it energizes the driver 230a to supply a driving current, increasing with time for an initial interval, to the rotary solenoid 208a. The rotary solenoid 208a is energized to angularly displace the arm member 212a against the resiliency of the coil spring 206a for thereby moving the roller 32 toward the roller 30 at a constant rate. The stimulable phosphor sheet A is not gripped between the rollers 30, 32 as it has already been moved past the rollers 30, 32 (FIG. 13(d)).

When the third counter 220c counts the clock signal $\phi$ for a time period T3 (T3 $\geq$ T2) from the positive-going edge of the reset signal $\bar{a}$, the third counter 220c applies a stop signal to the driver 230b to stop supplying the driving current to the rotary solenoid 208b. The arm member 212b is now angularly moved away from the shaft 34a under the resiliency of the coil spring 206b to move the roller 36 from the roller 34.

When the recorded image is read from the stimulable phosphor sheet A, the sheet A is firmly gripped by one of the roller pairs at all times. The recorded image can be read from the sheet A over its entire surface. This is advantageous in that as much image information as possible can be recorded on the sheet A. The count T2 of the second counter 220b may be the same as the count T3 of the third counter 220c. In this case, the roller pairs 26, 8 operate in a manner different from that shown in FIG. 13(d), i.e., their rollers are moved toward and away from each other at the same time.

Figure 15:
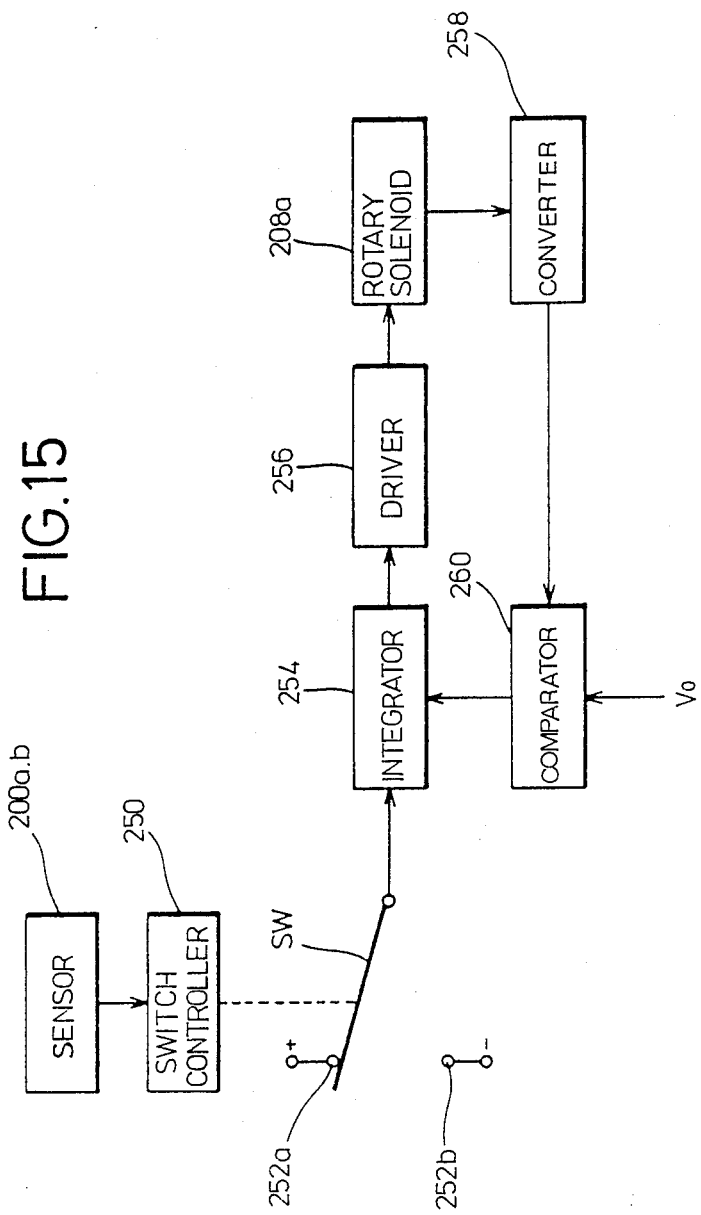
FIG. 15 is a block diagram of a control system according to another embodiment of the present invention.
Figure 16:
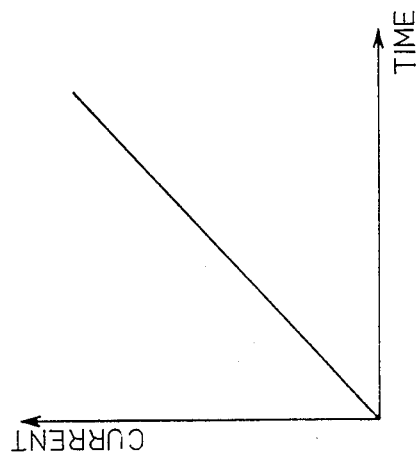
FIG. 16 is a graph showing the correlation between time and a current flowing through a rotary solenoid in the control system of FIG. 15.
Figure 17:
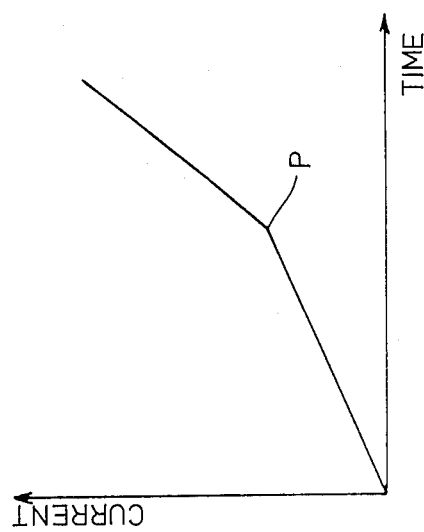
FIG. 17 is a graph showing the correlation between time and a current flowing through the rotary solenoid of FIG. 15, the current being increased after a certain time.

FIGS. 15 through 17 illustrate a yet still further embodiment of the present invention. In this embodiment, after a nip roller has engaged a stimulable phopshor sheet, the roller is pressed against the sheet as quickly as possible to cause the sheet to be gripped under desired pressure conditions in a short period of time without imposing shocks to the sheet, so that the sheet can be fed along efficiently.

According to this embodiment, each of the drivers 230a, 230b for the rotary solenoids 208a, 208b shown in FIG. 12 is arranged as follows:

As shown in FIG. 15, a control circuit includes a switch controller 250 for actuating a polarity changing switch SW based on a sensor signal from the sensors 200a, 200b disposed near the roller pair 26, an integrator 254 for integrating a voltage applied from a positive terminal 252a or a negative terminal 252b of a power supply through the switch SW based on a prescribed time constant, and a driver 256 for converting the integrated voltage into a current to energize the rotary solenoid 208a. The current which energizes the rotary solenoid 208a is converted by a converter 258 to a voltage, which is then applied to a comparator 260.

The comparator 260 is also supplied with a reference voltage Vo. The comparator 260 compares the voltage applied by the converter 258 with the reference voltage Vo to control the time constant of the integrator 254.

Another sensor pair identical to the sensors 200a, 200b may be provided in the vicinity of the roller pair 28 and coupled to another control circuit identical to that shown in FIG. 15, so that the roller pair 28 may be controlled in the same manner as that in which the roller pair 26 is controlled.

In operation, the stimulable phosphor sheet A is fed in the direction of the arrow B (FIG. 11). When the leading end of the sheet A reaches the sensors 200a, 200b, they detect the arrival of the sheet A and apply a signal to the switch controller 250 to connect the switch SW to the positive terminal 252a of the power supply. The voltage applied from the power supply via the switch SW is integrated by the integrator 254 and a current corresponding to the integrated voltage is supplied from the driver 256 to the rotary solenoid 208a. The current supplied to the rotary solenoid 208a increases with time as shown in FIG. 16. As the current having a constant rate of increase is supplied to the rotary solenoid 208a, the shaft 212a of the rotary solenoid 208a is turned at a prescribed speed against the resiliency of the coil spring 206a to cause the arm member 212a to push the roller shaft 32a downwardly. The shaft 32a descends along the slot 204a to move the roller 32 toward the roller 30. Since the leading end of the stimulable phosphor sheet A has already been introduced over the roller 30, the sheet A is smoothly gripped by the rollers 30, 32 and subjected to a gradual stress thereby.

When the roller 32 is displaced toward the roller 30 at a rate determined by the current curve shown in FIG. 16, it takes a certain period of time for the stimulable phosphor sheet A to be gripped by the roller pair 26 under a desired stress. This mode of operation may cause trouble if the sheet A is to be scanned at a high speed.

Such a problem can be solved as follows: The current supplied to the rotary solenoid 208a is converted by the converter 258 to a voltage based on which the time constant of the integrator 254 is changed. In this manner, a current as shown in FIG. 17 can be supplied to the rotary solenoid 208a to enable the rollers to grip the stimulable phosphor sheet A quickly. More specifically, the voltage from the converter 258 is compared with the reference voltage Vo by the comparator 260. When the voltage reaches the reference voltage Vo, the comparator 260 applies a signal to change the time constant of the integrator 254. The reference voltage Vo is preset on the basis of the relationship between the driving current for the rotary solenoid 208a and the displacement of the roller 32. At the time the roller 32 engages the sheet A and hence has been displaced a certain interval, i.e., at a point P where the rate of increase of the current is varied, the time constant of the integrator 254 is changed to a greater value to supply a current with a larger rate of increase to the rotary solenoid 208a.

Therefore, after the roller 32 has engaged the stimulable phosphor sheet A and been displaced a prescribed interval, the rotary solenoid 208a displaces the arm member 212a at a high speed to depress the roller 32 rapidly toward the roller 30, whereupon the rollers 32, 30 grip the sheet A under a desired stress. As a consequence, the sheet A is gripped by the roller pair 26 within a short period of time and can hence be fed highly efficiently in the subscanning direction for high-speed scanning.

The stimulable phosphor sheet A is gripped, without any appreciable shocks, between the rollers 30, 32, and can be fed in the direction of the arrow B quite smoothly and continuously. Accordingly, the image recorded on the sheet A can be read quite well by the image readout unit 56.

The stimulable phosphor sheet A that has reached the sensors (not shown) at the second roller pair 28 can also be gripped quickly by the roller pair 28 during the image readout operation. The gripping or nipping action on the sheet A by the roller pair 26 may be released at the time the trailing end of the sheet A passes the roller pair 26, so that no shock is imposed on the sheet A as it leaves the roller pair 26, thereby to allow a better image readout process.

Figure 18:
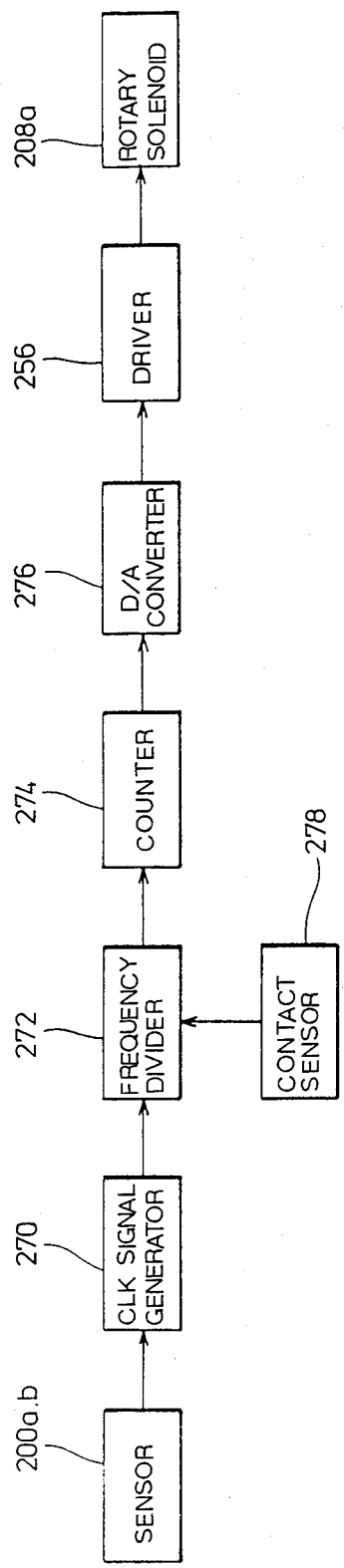
FIG. 18 is a block diagram of a control system according to still another embodiment of the present invention.

Instead of setting the point P with the reference voltage Vo applied to the comparator 260, the condition in which the roller 32 and the stimulable phosphor sheet A contact each other may be detected by a contact sensor or the like, and a signal from such a contact sensor may be applied to the integrator 254 for changing its time constant. FIG. 18 shows such a modified embodiment. As shown in FIG. 18, the sensors 200a, 200b detect the arrival of the leading end of the stimulable phosphor sheet A and apply a signal indicative of such arrival to a clock signal generator 270. In response to the sensor signal, the clock signal generator 270 supplies a clock signal to a frequency divider 272, which converts the supplied clock signal to a pulse signal of a prescribed period and supplies the pulse signal to a counter 274. The counter 274 issues an output signal which is converted by a D/A converter 276 to an analog signal that is supplied to the driver 256. The driver 256 then energizes the rotary solenoid 208a. The rotary solenoid 208a angularly moves the arm member 212a based on a current that varies in a step-like pattern to move the roller 32 gradually toward the roller 30.

The roller 32 has a contact sensor 278 which applies a contact signal to the frequency divider 272 when the roller 32 contacts the stimulable phosphor sheet A. The contact signal applied to the frequency divider 272 changes the frequency-dividing ratio of the frequency divider 272 to reduce the period of the pulse signal issued by the frequency divider 272. As a result, the frequency of the signal applied to the counter 274 is increased to increase the rate at which the output voltage from the D/A converter 276 increases. Thus, the output current from the driver 256 is also increased more quickly. The rotary solenoid 208a now angularly moves the arm member 212a based on a current which varies at a higher rate than before the roller 32 contacts the stimulable phosphor sheet A, for thereby pressing the roller 32 against the roller 30. The sheet A is gripped by the rollers 30, 32 quickly without shocks and can smoothly be fed along thereby.

Figure 19:
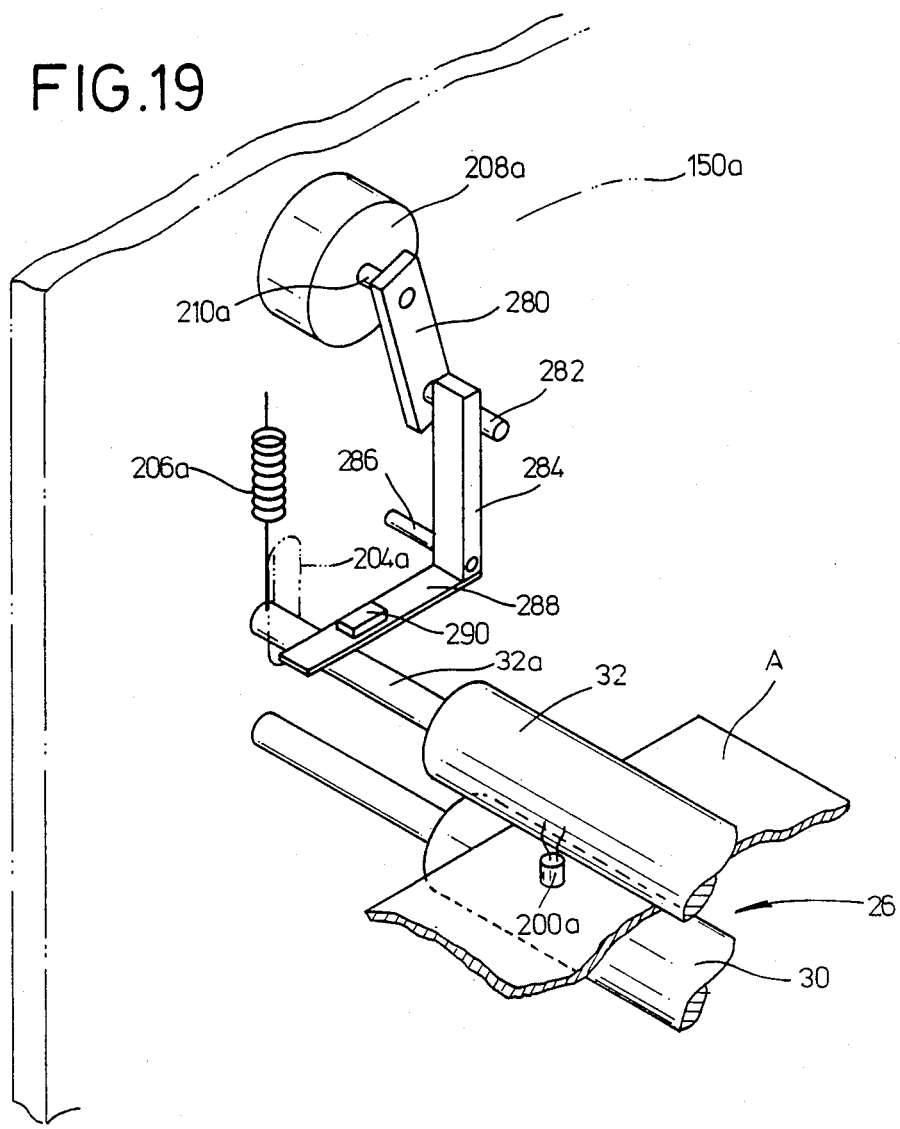
FIG. 19 a fragmentary perspective view of a sheet feed mechanism according to a still further embodiment, employing a strain gage.

A sheet feed mechanism according to another embodiment is illustrated in FIG. 19. An arm member 280 has one end fixed to the rotatable shaft 210a of the rotary solenoid 208a. A pin 282 has one end embedded in the other end of the arm member 280 and is held in abutment against one end of a link 284. The other end of the link 284 is angularly movably supported by a shaft 286 on the support plate 150a and attached to one end of a leaf spring 288 with its opposite end engaging the shaft 32a of the roller 32. A strain gage 290 is bonded to an intermediate portion of the leaf spring 288. The rollers 30, 32, the sensors 200a, 200b, and the coil spring 206a are of the same construction as shown in FIG. 11, and will not be described in detail.

Figure 20:
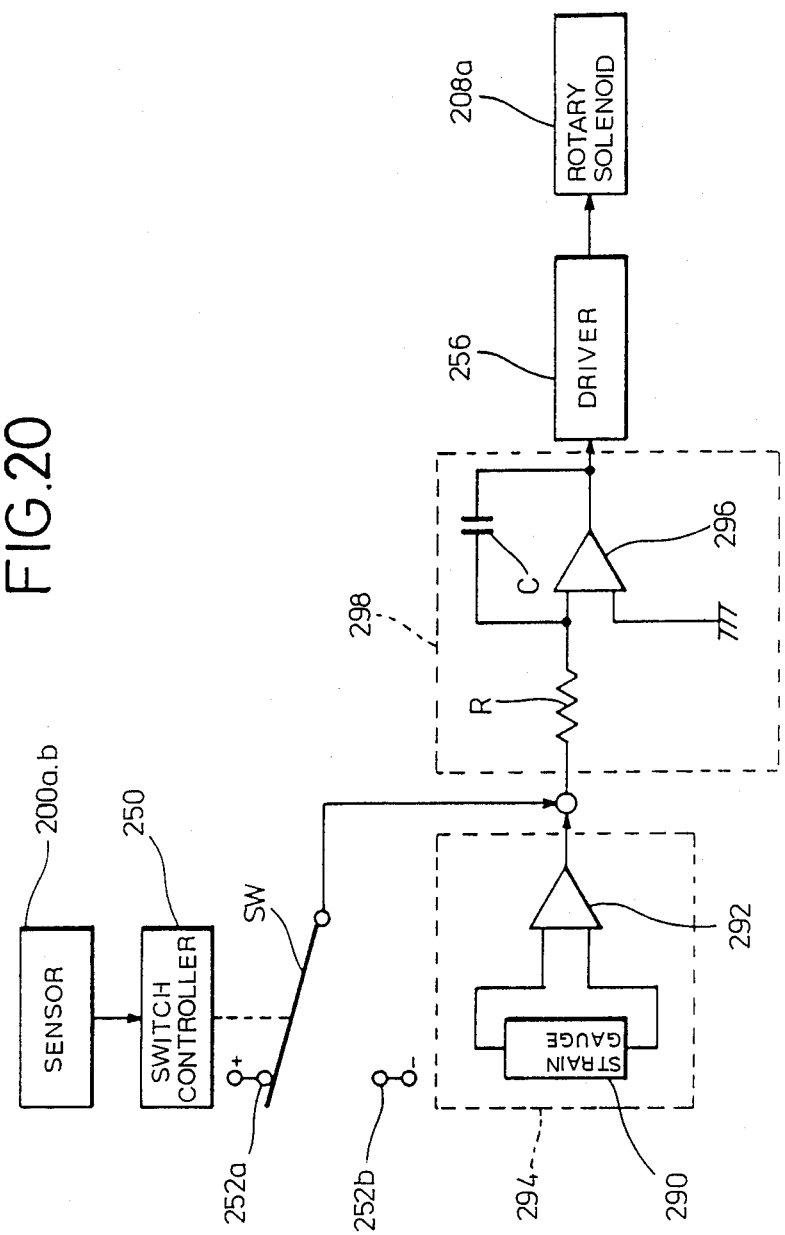
FIG. 20 is a block diagram of a control system for controlling the sheet feed mechanism shown in FIG. 19.

A control system or circuit for the rotary solenoid 208a is shown in FIG. 20. The control circuit includes a pressure sensor 294 composed of the strain gage 290 and an amplifier 292, an integrator 298 composed of an amplifier 296, a resistor R and a capacitor C which establish a time constant, and a driver 256 for converting a voltage to a current to energize the rotary solenoid 208a. When the sensors 200a, 200b disposed near the roller pair 26 detect the leading end of the stimulable phosphor sheet A, the sensors 200a, 200b apply a signal to the switch controller 250. The switch controller 250 connects the polarity changing switch SW to the positive terminal 252a of the power supply to apply a predetermined voltage to the integrator 298. The integrator 298 then integrates the applied voltage based on the time constant determined by the resistor R and the capacitor C. An output signal from the integrator 298 is converted by the driver 108 to a current which is supplied to the rotary solenoid 208a. The rotary solenoid 208a then rotates the shaft 210a to turn the arm member 280 and hence the pin 282 thereon for angularly moving the link 284 about the shaft 286. Since one end of the leaf spring 288 is joined to the link 284, the roller shaft 32a engaging the other end of the leaf spring 288 is depressed by the rotary solenoid 208a against the resiliency of the coil spring 206a to move the roller 32 gradually toward the roller 30. At this time, the strain gage 290 mounted centrally on the leaf spring 288 detects the amount of distortion to which the leaf spring 288 is subjected. The detected distortion is converted by the amplifier 292 to a voltage, which is applied to the integrator 298. Therefore, the integrator 298 is supplied with the constant voltage supplied from the power supply via the switch SW and also the voltage from the pressure sensor 294 which increases with the displacement of the roller 32.

Figure 21:
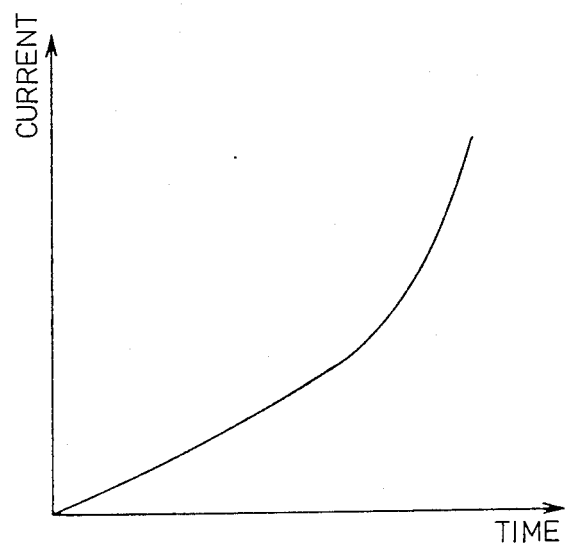
FIG. 21 is a graph showing the correlation between time and a current flowing through a rotary solenoid in the control system of FIG. 20.

The output signal from the integrator 298 is supplied to the driver 256 and converted thereby to a current that is supplied to the rotary solenoid 208a. As shown in FIG. 21, the current supplied to the rotary solenoid 208a gradually increases with time. The roller 32 is displaced initially under a relatively small force toward the roller 30. Then, the force acting on the roller 32 to displace the same toward the roller 30 becomes increasingly greater to enable the rollers 32, 30 to grip the stimulable phosphor sheet A quickly under a prescribed stress. The roller pair 26 therefore grips the stimulable phosphor sheet A quickly without any appreciable shocks thereon, and feeds the sheet A quickly in the direction of the arrow B. For moving the roller 32 away from the roller 30, the polarity changing switch SW is actuated by the switch controller 250 to supply the rotary solenoid 208a with a current having a characteristic curve in symmetric relation to the current curve shown in FIG. 21. The roller 32 is now displaced by the rotary solenoid 208a in a direction away from the roller 30 in a manner that is the reversal of the process described above. The roller pair 28 operates in the same way as described above with reference to the roller pair 26.

With the above embodiment, after the roller has engaged the sheet, the rate at which the force on the sheet to depress the same varies is increased to enable the roller pair to grip the sheet within a short period of time. Thus, the sheet can quickly start being fed, and the cycle time for reading or recording an image can be reduced.

Figure 22:
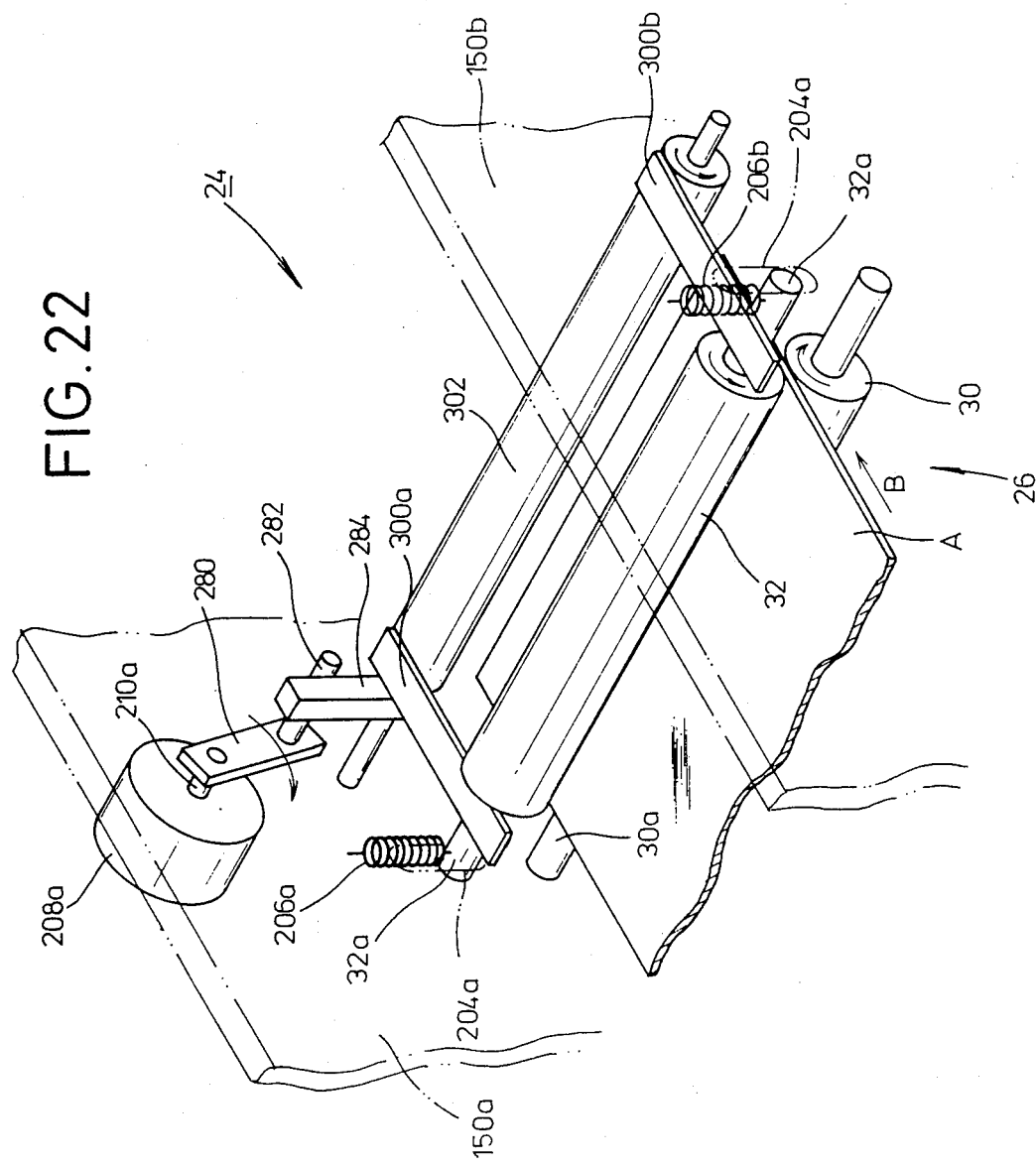
FIG. 22 is a fragmentary perspective view of a sheet feed mechanism according to another embodiment of the present invention.
Figure 23:
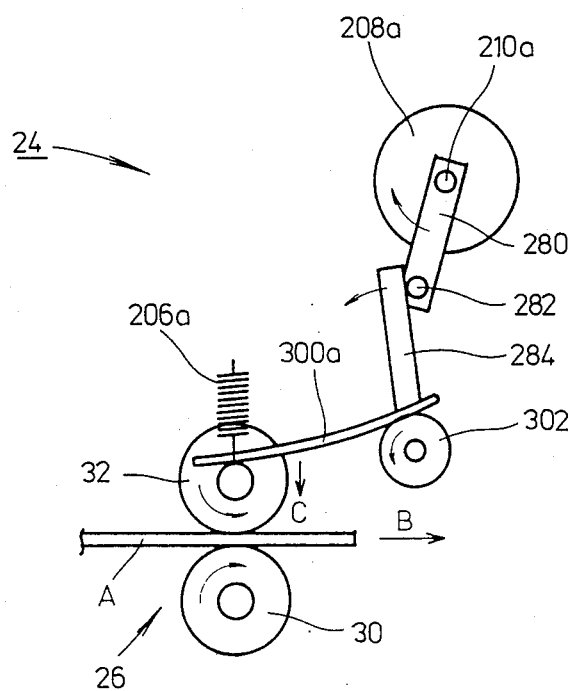
FIG. 23 is a side elevational view illustrative of the manner in which the sheet feed mechanism of FIG. 22 operates.

FIGS. 22 and 23 show a sheet feed mechanism according to still another embodiment of the present invention. This embodiment differs from the embodiment of FIG. 19 primarily in that a shaft is rotatably supported between the support plates, and each leaf spring has one end fixed to this shaft with the other end engaging the shaft of the nip roller. More specifically, two leaf springs 300a, 300b have ends engaging the opposite ends of the shaft 32a of the roller 32 which is vertically movably supported by the support plates 150a, 150b. The other ends of the leaf springs 300a, 300b are fixed to the opposite ends of a rotatable shaft 302 which is rotatably supported by the support shafts 150a, 150b and extends parallel to the roller 32. The rotatable shaft 302 is angularly movable by the rotary solenoid 208a supported on the support plate 150a.

The rotatable shaft 210a of the rotary solenoid 208a is secured to one end of the arm member 280 which supports on the other end the pin 282 held in engagement with one end of the link 284 with its other end fixed to the rotatable shaft 302. The rotary solenoid 208a, when energized, causes the arm member 280 and the link 284 to turn the shaft 302 against the resiliency of the coil springs 206a, 206b for displacing the roller 32 toward the roller 30. The downstream roller pair 28 is also associated with an identical structure.

In operation, the rotary solenoid 208a is energized before the stimulable phosphor sheet A reaches the roller pair 26. The shaft 210a of the rotary solenoid 208a is turned to enable the arm member 280, the pin 282, and the link 284 to turn the shaft 302 about its own axis in the direction of the arrow (FIG. 23). Since the leaf springs 300a, 300b are fixed endwise to the shaft 302, the distal ends of the leaf springs 300a, 300b are caused by the turning movement of the shaft 302 to press the roller shaft 32a against the resilient forces of the coil springs 206a, 206b. As a result, the roller 32 is displaced along the slot 204a toward the roller 30.

The stimulable phosphor sheet A is transferred by the conveyor belt to introduce its leading end between the rollers 30, 32 of the roller pair 26. The leading end of the sheet A is gripped between the rollers 30, 32 as the roller 32 is lowered. Then, the roller 30 is rotated to feed the sheet A in the direction of the arrow B toward the downstream roller pair 28. The leaf springs 300a, 300b have substantially the same coefficients of elasticity, and are caused by the common rigid shaft 302 to press the roller 32 toward the roller 30. Therefore, the stimulable phosphor sheet A can be gripped under uniform forces at both marginal sides along the support plates 150a, 150b. The sheet A is thus prevented from being undulated due to different forces with which it is gripped, and can accurately be fed toward the roller pair 28, during which time the recorded image can well be read from the sheet A. The stimulable phosphor sheet A is also gripped and fed accurately by the roller pair 28 in the same manner as described above.

Before the trailing end of the stimulable phosphor sheet A reaches the roller pair 26, the driving current supplied to the rotary solenoid 208a is cut off. The shaft 32 is now released from the depressing forces of the leaf springs 300a, 300b, and the roller 32 is allowed to ascend away from the roller 30 under the bias of the coil springs 206a, 206b.

Since the nip rollers 32, 36 are pressed against the stimulable phosphor sheet A under uniform forces in a direction normal to the direction of feed of the sheet A, the sheet A is prevented from being undulated or wavy between the roller pairs, with the result that the recorded image information can be read well and efficiently from the sheet A.

Figure 24:
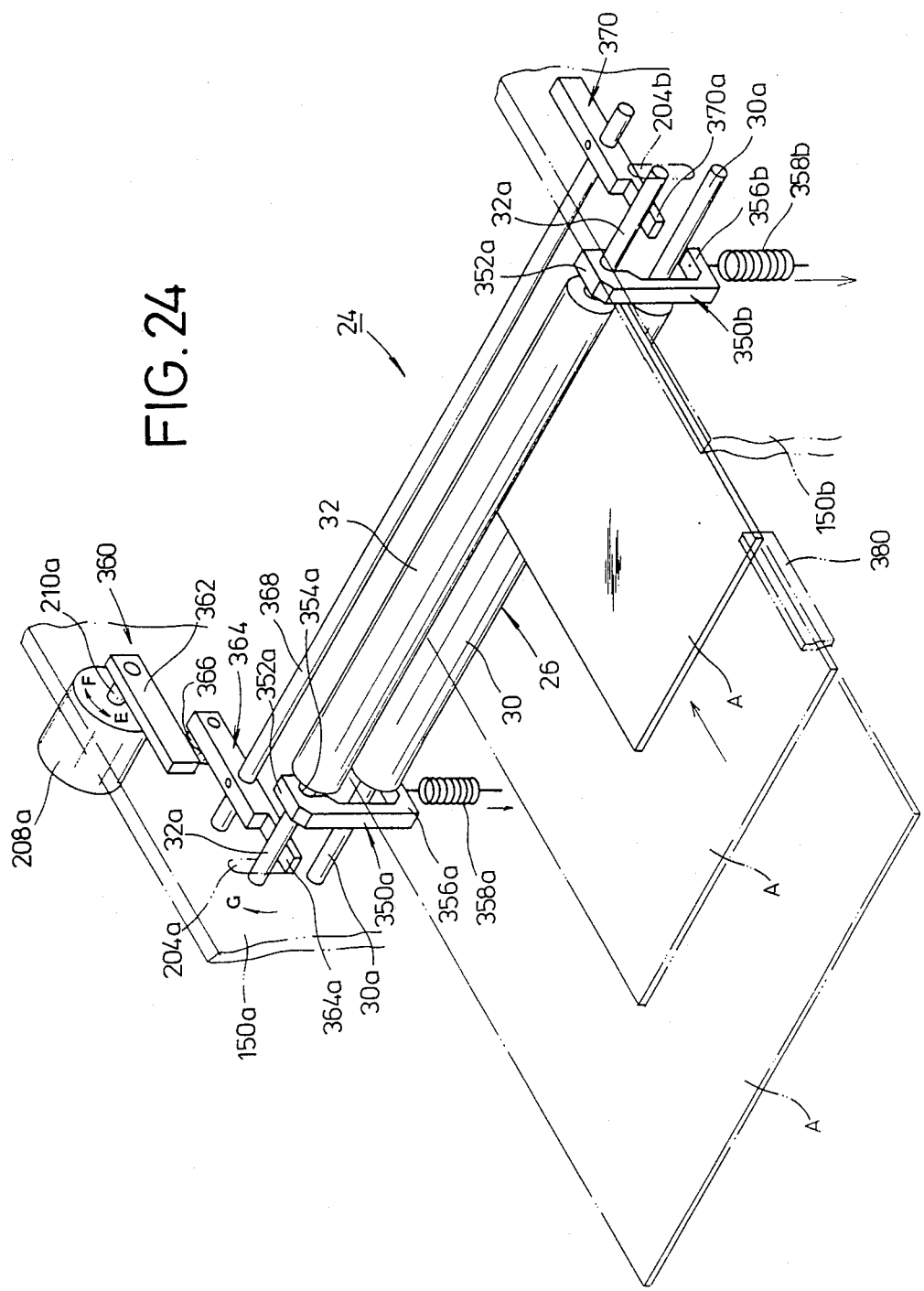
FIG. 24 is a perspective view of a sheet feed mechanism according to still another embodiment of the present invention.
Figure 25:
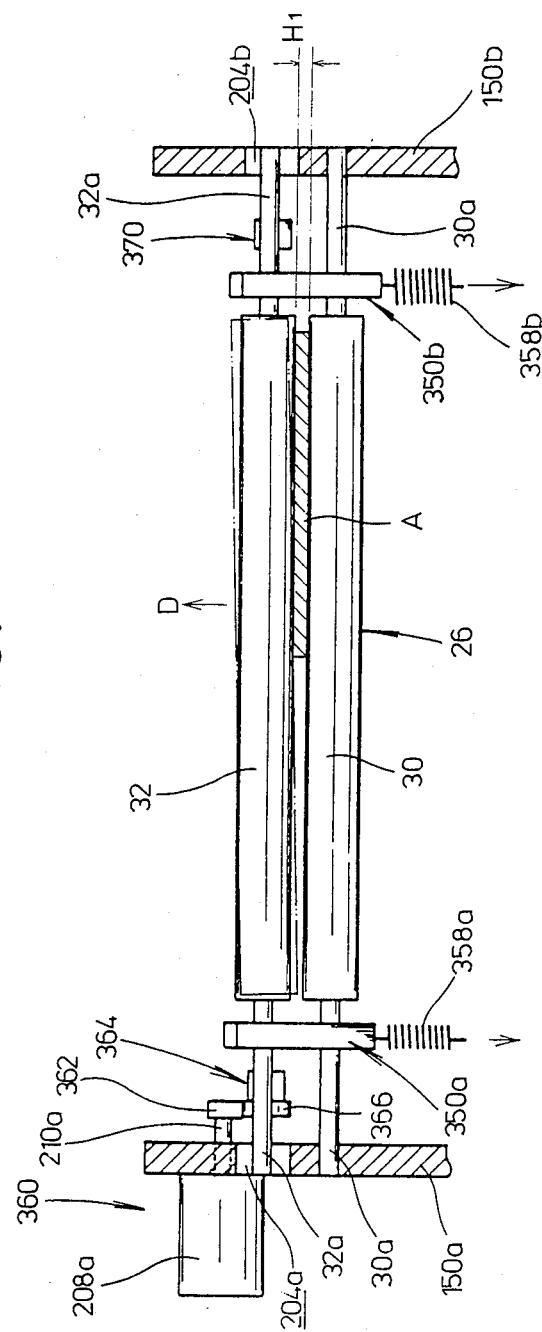
FIG. 25 is a front elevational view of the sheet feed mechanism shown in FIG. 24.

FIGS. 24 through 26 illustrate a sheet feed mechanism according to a still further embodiment of the present invention. As shown in FIGS. 24 and 25, the shaft 30a of the roller 30 is rotatably supported by the support plates 150a, 150b extending vertically in the image readout device 10. The shaft 32a of the roller 32 is fitted at its opposite ends in the slots 204a, 204b in the support plates 150a, 150b. When the roller 32 is in the lowermost position thereof, there is a gap or clearance H1 (FIG. 25) created between the rollers 32, 30, the clearance H1 being the same as the clearance H1 shown in FIG. 8.

Presser members 350a, 350b are held in engagement with the roller shaft 32a at its opposite ends. As illustrated in FIG. 24, the presser member 350a is substantially C-shaped and includes an upper horizontal portion 352a with a groove 354a defined in a lower surface thereof, the shaft 32a being fitted in the groove 354a. The presser member 350a has a lower horizontal portion 356a engaging one end of a coil spring 358a. The other end of the coil spring 358a is fixed within the image readout device 10. The presser member 350a is thus normally biased by the coil spring 358a to move in a downward direction. The presser member 350b is of the same construction as that of the presser member 350a, and its components are denoted by identical reference numerals with a suffix b and will not be described in detail.

The roller 32 is held in engagement with a displacing means 360 for moving the roller 32 vertically upwardly along the slots 204a, 204b. The displacing means 360 comprises the rotary solenoid 208a with its rotatable shaft 210a fixed to one end of an arm 362. The other end of the arm 362 engages a bearing 366 on one end of an arm 364 near the support plate 150a. A rotatable shaft 368 which is rotatably supported at its opposite ends by the support plates 150a, 150b is fitted substantially centrally in the arm 364 and secured thereto. The other end of the arm 364 has a stepped portion including an engaging tongue 364a on which one end of the shaft 32a of the roller 32 is placed. Similarly, an arm 370 is secured to the rotatable shaft 368 near the support plate 150b and has a stepped portion including an engaging tongue 370a on which the other end of the shaft 32a is placed.

The stimulable phosphor sheet A is fed by the belt conveyor toward the image readout unit 56. The displacing means 360 is now actuated. More specifically, the rotary solenoid 208a i energized to rotate the shaft 210a in the direction of the arrow E (FIG. 24). The arm 362 fixed to the shaft 210a is also angularly moved in the direction of the arrow E to push the bearing 366 also in the direction of the arrow E. When the bearing 366 mounted on the arm 364 is pushed in the direction of the arrow E, the arm 364 swings with the shaft 368 to cause the engaging tongue 364a to swing in the direction of the arrow G. The engaging tongue 370a of the arm 370 on the shaft 368 is also swung in the direction of the arrow G. Therefore, the shaft 32a engaging the engaging tongues 364a, 370a is guided by the slots 204a, 204b so as to be displaced therealong in the upward direction against the resilient forces of the coil springs 358a, 358b.

Thus, the roller 32 is moved away from the roller 30 by an amount larger than the thickness of the stimulable phosphor sheet A coming into the roller pair 26 (FIG. 26(a)). When the stimulable phosphor sheet A is introduced between the rollers 30, 32, the rotary solenoid 208a of the displacing means 360 is energized again. The shaft 210a of the rotary solenoid 208a is turned in the direction of the arrow F, opposite to the direction E, and so is the arm 362 fixed to the shaft 210a. Consequently, the shaft 32a is released from the lifting forces from the arms 364, 370 and displaced downwardly by the presser members 350a, 350b biased by the coil springs 358a, 358b, respectively, to cause the roller pair 26 to grip the stimulable phosphor sheet A. Because the clearance H1 between the rollers 30, 32 is selected to be smaller than the thickness of the stimulable phosphor sheet A, when the stimulable phosphor sheet A is gripped by the rollers 30, 32, the shaft 32a is biased by the coil springs 358a, 358b through the presser members 350a, 350b. As a consequence, the stimulable phosphor sheet A is appropriately gripped by the roller pair 26 under the bias of the coil springs 358a, 358b. By energizing the non-illustrated rotative drive source to rotate the roller 30, the stimulable phosphor sheet A is fed toward the downstream roller pair 28.

At the same time that the stimulable phosphor sheet A is fed in the subscanning direction, i.e., in the direction of the arrow B, the image readout unit 56 is energized for reading the recorded image from the sheet A. Then, the leading end of the sheet A reaches the roller pair 28 (FIG. 26(b)). With the roller pair 28 being associated with the same structure as that shown in FIG. 24 for the roller pair 26, the stimulable phosphor sheet A as it is scanned in the image readout process can be smoothly gripped also by the roller pair 28 without imposing shocks on the roller pair 28. The image readout process can therefore be effected highly accurately and smoothly.

Continued delivery of the stimulable phosphor sheet A causes the trailing end thereof to disengage from the roller pair 26. At this time, the displacing means 360 is actuated to displace the roller 32 upwardly away from the roller 30 to avoid undesired shocks which would otherwise be produced upon departure of the trailing end of the sheet A from the roller pair 26. The image readout process can thus be carried out accurately by the image readout unit 56 (FIG. 26(c)).

In the above embodiment, the stimulable phosphor sheet A is released from gripping action of the roller pair 26 when the sheet A leaves the roller pair 26. However, the roller pair 26 may be actuated to release the sheet A when the leading end of the sheet A is gripped by the roller pair 28, and the sheet A may thereafter be fed only by the roller pair 28 in the subscanning direction.

The sheet can accurately be fed in the subscanning direction by the roller pairs since the rollers are not subject to deformation because they are spaced from each other by a prescribed distance. Such accurate feeding operation allows an image to be read from or recorded on the sheet highly accurately. The rollers in a roller pair are relatively displaced a distance which is greater than the thickness of the sheet when the sheet enters or leaves the roller pair. Accordingly, no shock is applied to the sheet when it enters or leaves the roller pair, resulting in high accuracy for the image readout or recording process.

As shown in FIG. 24, stimulable phosphor sheets of different sizes may successively be fed through the image readout unit. A stimulable phosphor sheet A of a considerably small size has one marginal edge guided by a register plate 380 to move between the rollers 30, 32 near the support plate 150b. As a result, the distance between the rollers 30, 32 becomes larger near the support plate 150b than near the support plate 150a. The roller 32 is now liable to be tilted about the side edge of the sheet A by the presser member 350a under the bias of the coil spring 358a as indicated by the dot-and-dash-lines in FIG. 25.

Such a problem can easily be obviated by selecting the spring contact of the coil spring 358b coupled to the presser member 350b to be larger than the spring constant of the coil spring 358a coupled to the presser member 350a. Even when a stimulable phosphor sheet A of a relatively small width is gripped by the roller pair 26 closely to one end thereof, as shown in FIG. 25, the roller 32 is not tilted on account of the greater resiliency of the coil spring 358b. The narrow stimulable phosphor sheet A can therefore be fed accurately in the direction of the arrow B (subscanning direction) by being gripped between the rollers 30, 32. The embodiment of FIGS. 24 and 25 is effective in accurately feeding stimulable phosphor sheets A of different sizes in the subscanning direction irrespective of such different sheet sizes. The recorded image on the sheet A can thus be read out highly accurately at all times by the image readout unit 56.

Rather than selecting a larger spring constant for the coil spring 358b than for the coil spring 358a, the coil springs 358a, 358b may be of the same spring constant, and the length to which the coil spring 358b can be extended may be larger than the length to which coil spring 358a can be extended.

Figure 27A:
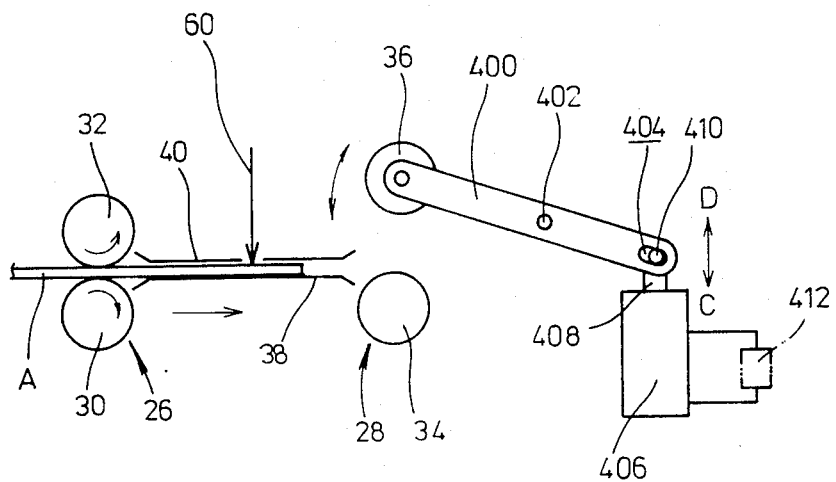
FIGS. 27(a) and 27(b) are side elevational views of a sheet feed mechanism according to a still further embodiment of the present invention.
Figure 27B:
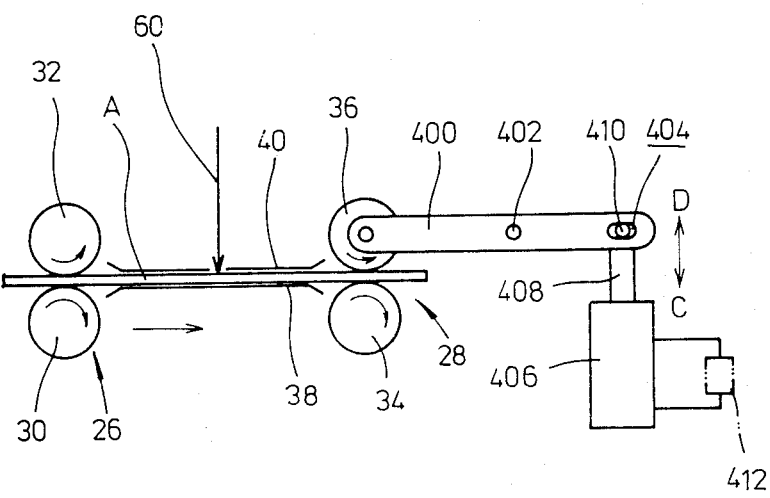

FIGS. 27(a) and 27(b) show a sheet feed mechanism according to another embodiment of the present invention. In this embodiment, only the downstream roller pair 28 is selectively opened to grip the sheet A, without shocks, which is fed from the upstream roller pair 26. In FIGS. 27(a) and 27(b), the roller 36 has its opposite ends rotatably supported on one end of a swing member 400 which is angularly movably mounted on a support bar 402 disposed at a substantially intermediate portion of the swing member 400. The swing member 400 has a slot 404 defined in the other end thereof and operatively coupled to an actuator 406 such as a solenoid 406. More specifically, the solenoid 406 has a plunger 408 having on its distal end a pin 410 loosely fitted in the slot 404. When the solenoid 406 is energized, the swing member 400 is angularly moved about the support bar 402 to swing the roller 36 in the direction of the arrow. The solenoid 406 is energized under the control of a counter 412. When the image readout unit 56 is operated, the counter 412 starts counting a clock signal. The counter 412 generates a signal for energizing the solenoid 406 upon elapse of a predetermined period of time. The time period for the counter 412 to produce such a signal is preferably selected such that when the leading end of the stimulable phosphor sheet A reaches a position over the roller 34, the roller 36 presses the upper surface of the stimulable phosphor sheet A. Preferably, the solenoid 406 is of the type having a damper mechanism (so-called a solenoid-operated actuator). The solenoid 406 may however be replaced with a cylinder having a cushioning mechanism or a cam mechanism.

Before the image readout unit 56 is operated, the roller 36 of the second roller pair 28 is normally positioned above the roller 34, as shown in FIG. 27(a). When the stimulable phosphor sheet A is fed by the first roller pair 26 into the image readout unit 56, the sheet A is detected by a sensor (not shown) which then energizes the image readout unit 56 and enables the counter 412 to start its counting cycle. When the given period of time elapses, the solenoid 406 is energized to move the plunger 408 in the direction of the arrow D to cause the swing member 400 to swing the roller 36 downwardly in the direction of the arrow toward the roller 34. Therefore, upon arrival of the leading end of the stimulable phosphor sheet A at the roller 34, the roller 36 presses the upper surface of the sheet A, which is gripped between the rollers 34, 36 and fed in the direction of the arrow B. Prior to movement of the trailing end of the stimulable phosphor sheet A past the second roller pair 28, the solenoid 406 is energized to retract the plunger 408 in the direction of the arrow C. The roller 36 is now swung upwardly away from the roller 34 to release the stimulable phosphor sheet A from the gripping action of the rollers 34, 36.

In this embodiment, when the stimulable phosphor sheet A fed toward the second roller pair 28 enters the space between the rollers 34, 36, the roller 36 is displaced toward the roller 34 by the solenoid 406 to cause the second roller pair 28 to grip the sheet A, which is then fed in the direction of the arrow B. Therefore, the stimulable phosphor sheet A can be fed smoothly from the first roller pair 26 to the second roller pair 28. Since the solenoid 406 has a damper mechanism, the roller 36 is prevented thereby from abruptly hitting the upper surface of the sheet A and hence from imposing shocks on the sheet A. Because the stimulable phosphor sheet A is always gripped by one of the roller pairs 26, 28, there is no danger of the sheet A being displaced out of the proper direction of feed. The stimulable phosphor sheet A can therefore be fed smoothly and accurately through the image readout unit 56 without undesired positional displacement, so that the radiation image recorded on the sheet A can well be read by the image readout unit 56.

Figure 28:
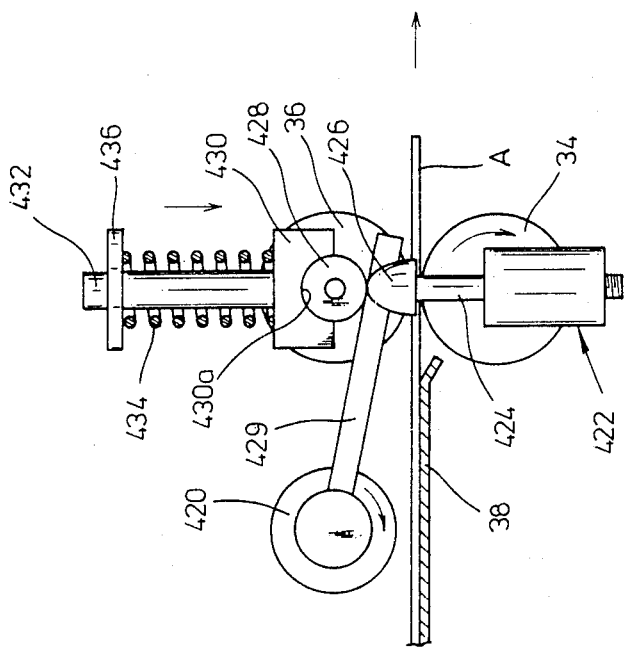

According to still another embodiment illustrated in FIG. 28, a rotary actuator 420 is operatively associated with a presser member 430 normally urged downwardly by a coil spring 434 and a shock absorber 422. The shock absorber 422 is disposed closely to the roller 34 and has an upwardly extending rod 424 with a damper member 426 as of rubber mounted on the upper end thereof. The damper member 426 is disposed underneath a roller 428 fixed coaxially to the roller 36.

The rotary actuator 420 has an arm 429 normally pressed against the roller 428 to displace the same upwardly. The presser member 430 is held in sliding contact with the upper surface of the roller 428. Specifically, the presser member 430 has a semicircular recess 430a in which the roller 428 is partly fitted, the presser member 430 being mounted on the lower distal end of a rod 432. A coil spring 434 is disposed around the rod 432 and has one end engaging a flange 346 on the upper end of the rod 432 and the other end pressed against the upper surface of the presser member 430.

The rotary actuator 420 normally causes the arm 429 to be pressed against the roller 428 to displace the same upwardly, thus keeping the coil spring 434 under compression.

As the stimulable phosphor sheet A is guided by the guide member 38 and reaches a prescribed position, it is detected and a signal indicative of the arrival of the sheet A is applied to operate the rotary actuator 420 to displace the arm 429 in the direction of the arrow away from the roller 428. The coil spring 434 now resiliently presses the presser member 430 downwardly. After the presser member 430 has been displaced a certain downward interval, the damper member 426 on the rod 424 engages the peripheral surface of the roller 428 thereby to dampen the resilient forces from the coil spring 434.

When the stimulable phosphor sheet A has reached the prescribed position, therefore, the sheet A is gripped, without shocks, by the driver roller 34 and the nip roller 36, and is then fed thereby in the direction of the arrow.

Figure 29:
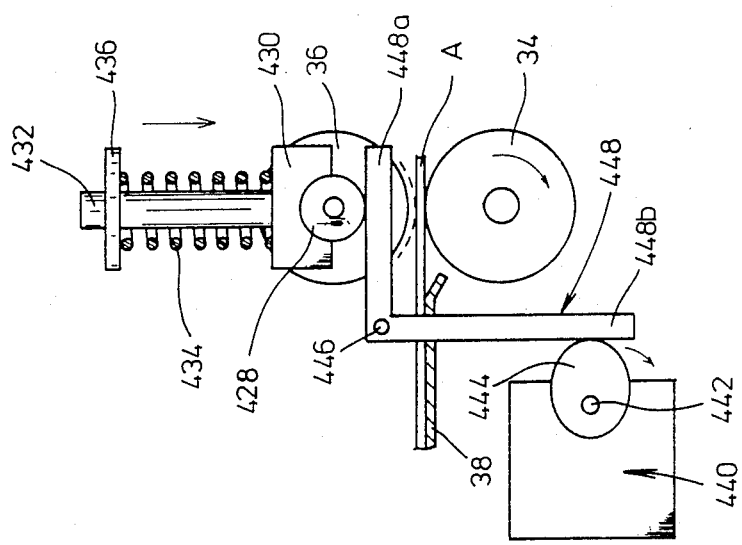
FIGS. 28 and 29 are side elevational views of sheet feed mechanisms according to yet still further embodiments of the present invention.

A sheet feed mechanism according to a still further embodiment of the present invention is illustrated in FIG. 29. This embodiment differs from the preceding embodiment in that the rotary actuator 420 is replaced with a cam mechanism combined with an angle member for limiting vertical displacement of the nip roller 36.

An eccentric cam 444 is attached to a rotatable shaft 422 projecting from a motor 440 through a gear train (not shown), and a second arm 448b of an angle member 448 pivotally mounted on a shaft 446 is held in sliding contact with the eccentric cam 444. The angle member 448 has a first arm 448a held against the roller 428.

The cam 444 is normally held in the illustrated position by the motor 440. With the second arm 448b slidingly contacting the cam 444, the first arm 448a is held by the shaft 446 to maintain the roller 428 in the illustrated position. In this position, the rollers 34, 36 are spaced from each other. Since the roller 428 is now in the elevated position, the presser member 430 is depressed downwardly by the coil spring 434, but such downward displacement is limited by the first arm 448a.

Upon arrival of the stimulable phosphor sheet A at a prescribed position on the guide member 38, a signal is applied to energize the motor 440 to cause the shaft 442 to rotate the cam 444, which allows the second arm 448b to turn about the shaft 446 toward the motor 440. The first arm 448a is lowered to permit the coil spring 434 to displace the presser member 430 resiliently downwardly until the roller 428 reaches the position indicated by the broken line in FIG. 29. The rollers 34, 36 thus jointly grip the stimulable phosphor sheet A therebetween and feed the sheet A in the subscanning direction. The driver roller 34 and the nip roller 36 can grip and feed the sheet A without imposing any appreciable shocks on the sheet A, as with the preceding embodiment.

Figure 30B:
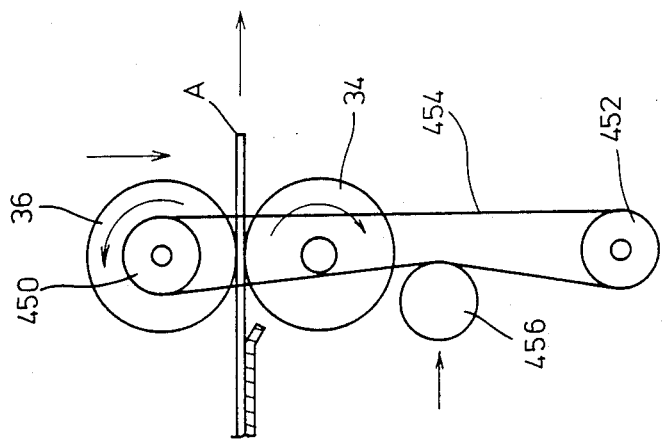
FIGS. 30(a) and 30(b) are side elevational views of a sheet feed mechanism according to another embodiment of the present invention.
Figure 30A:
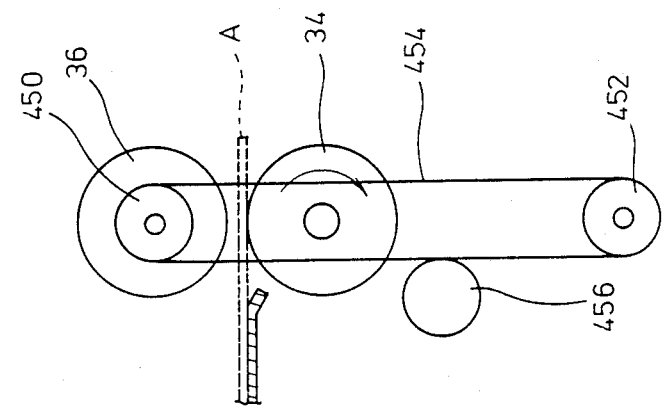

FIGS. 30(a) and 30(b) show a subscanning sheet feed mechanism according to a still further embodiment of the present invention. In this embodiment, a first pulley 450 is fixed coaxially to the nip roller 36, and a second pulley 452 coupled to a rotative drive source (not shown) is disposed below the driver roller 34. A belt 454 is vertically trained around the first and second pulleys 450, 452, and a roller 456 is held in rolling contact with the belt 450. The nip roller 36 is vertically movable.

Before the stimulable phosphor sheet A reaches the guide member 38, the nip roller 36 and the driver roller 34 are spaced from each other as shown in FIG. 30(a). When the sheet A reaches a prescribed position on the guide member 38, a signal is applied to move the roller 456 in the direction of the arrow as shown in FIG. 30(b). This displacement of the roller 456 shortens the vertical extent of the belt 454 to lower the pulley 450 and hence the nip roller 36 into contact with the sheet A, which is now gripped between the rollers 34, 36 and fed along in the direction of the arrow. According to this embodiment, the driver roller 34 and the nip roller 36 can grip and feed the stimulable phosphor sheet A without imposing shocks thereon.

Figure 31:
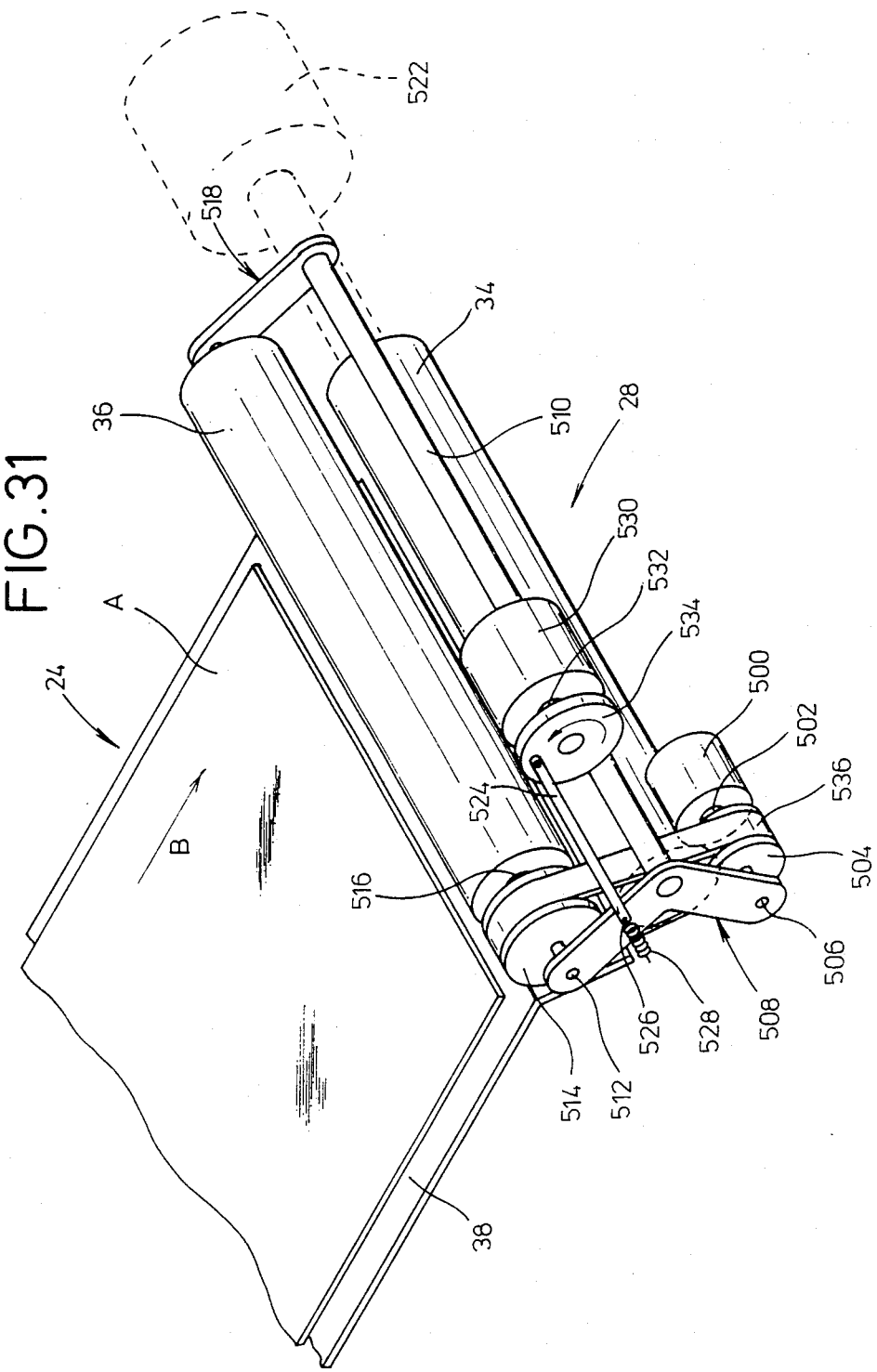
FIG. 31 is a perspective view of a sheet feed mechanism according to still another embodiment for a light beam scanning apparatus.
Figure 32:
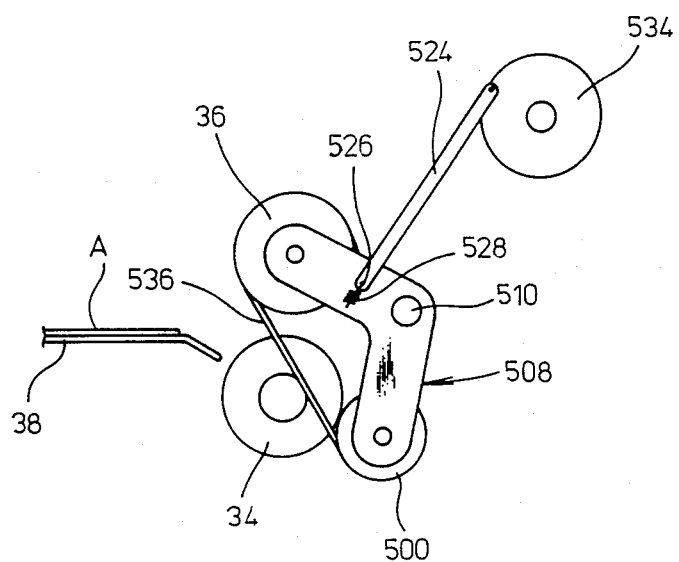
FIG. 32 is a side elevational view of the sheet feed mechanism shown in FIG. 31.
Figure 33:
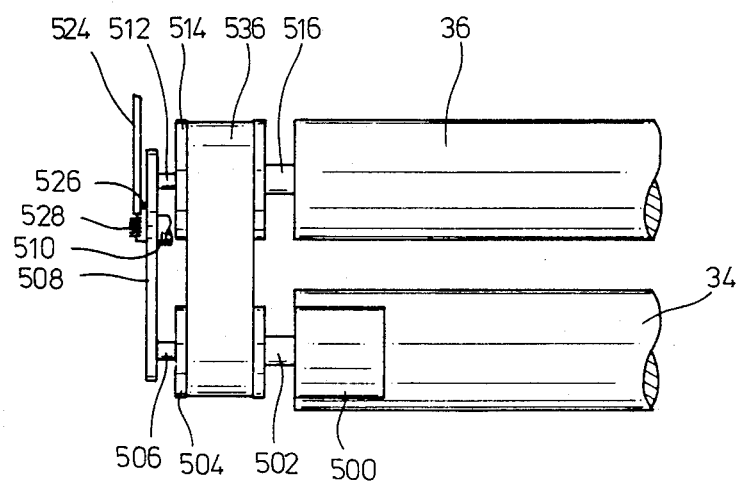
FIG. 33 is a fragmentary front elevational view of a rotative power transmission mechanism for transmitting the rotative power of a driver roller to a nip roller.

FIGS. 31 through 34 show a sheet feed mechanism according to another embodiment of the present invention, in which a downstream nip roller is displaceable and rotated in advance to grip and feed the sheet A without applying shocks. As shown in FIG. 31, a relatively short transmission roller 500 is held in frictional contact with the driver roller 34 of the roller pair 28. The transmission roller 500 has a shaft 502 on which a first pulley 504 is mounted. The shaft 502 has a distal end portion projecting out of the pulley 504 and serving as a smaller-diameter shaft 506. A bent arm 508 which is angularly movably mounted at its center on one end of a shaft 510 has a lower end attached to the shaft 506 and an upper end attached to a shaft 512. The shaft 512 supports thereon a second pulley 514 and includes a larger-diameter shaft 516 extending beyond the second pulley 514 and supporting the nip roller 36 thereon. The arm 508 thus extends upwardly from one side of the driver roller 34, and the nip roller 36 is positioned above the driver roller 34. A second arm 518 is angularly movably mounted on the shaft 510 on the axially opposite side of the nip roller 36 remote from the arm 508.

The downstream driver roller 34 is coupled to the rotatable shaft of a motor 522. The rotative power of the motor 522 is also transmitted via a power transmission means (not shown) to the upstream driver roller 30. A swing rod 524 has one end coupled to the arm 508 at a position intermediate between the shafts 510, 512. Specifically, a pin 526 is embedded in one end of the swing rod 524 and pushes a coil spring 528 with one end thereof secured to the arm 508. The pressure imposed by the nip roller 36 on the stimulable phosphor sheet A is dampened by the arm 508 under the resiliency of the coil spring 528. The other end of the swing rod 524 is pivotally coupled to a peripheral edge portion of a circular cam plate 534 supported on a rotatable shaft 532 of a motor 530. A belt 536 is trained around the first and second pulleys 504, 514.

The stimulable phosphor sheet A is fed while being guided by the guide members 38, 40 and reaches the driver roller 34. At this time, the shaft 502 is rotated by the transmission roller 500 held in rolling contact with the driver roller 34 which is being driven by the motor 522, and therefore the pulley 504 is rotated by the shaft 502. The rotation of the pulley 504 is transmitted via the belt 536 to the pulley 514, which then rotates the nip roller 36 in a direction opposite to the direction of rotation of the driver roller 34. Thus, when the driver roller 34 is rotated in one direction, the nip roller 36 is rotated in synchronism with the driver roller 34, but in the opposite direction.

Figure 34:
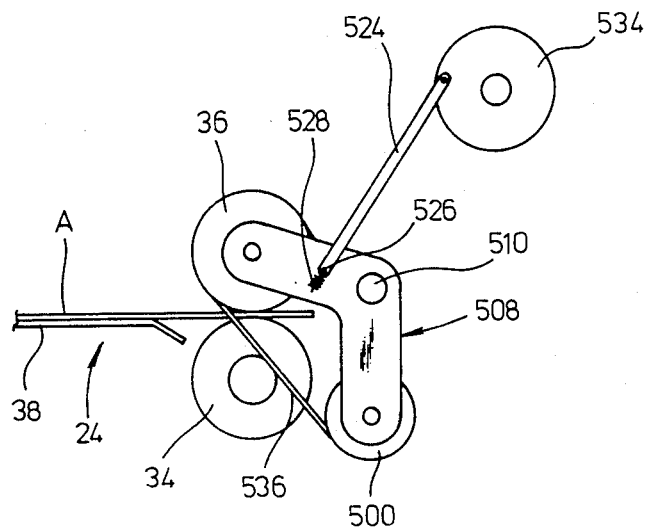
FIG. 34 is a side elevational view showing the manner in which one roller is moved toward another roller for rolling contact therewith.

As the stimulable phosphor sheet A is delivered into the image readout unit 56, i.e., when the leading end of the stimulable phosphor sheet A fed by the roller pair 26 reaches a prescribed position, it is detected by a sensor (not shown) which issues a signal to rotate the motor 530 at a slow speed. The rotation of the motor 530 is transmitted through the shaft 532 to the cam plate 534 which is also rotated slowly in the direction of the arrow (FIG. 31). The swing rod 324 now lowers the arm 508 toward the driver roller 34 through angular movement about the shaft 510. When the leading end of the stimulable phosphor sheet A reaches the driver roller 34, the nip roller 36 rotatably supported on the arm 508 catches the leading end of the sheet A while rotating at the same speed as the driver roller 34, and presses the sheet A against the upper surface of the driver roller 34 through damping action by the coil spring 528 (FIG. 34). Since the nip roller 36 and the driver roller 34 rotate at the same speed, no shock is applied to the stimulable phosphor sheet A when it is gripped by the rollers 36, 34, and the stimulable phosphor sheet is smoothly delivered to the erase unit 72.

As described above, when the stimulable phosphor sheet A being fed by the roller pair 26 is delivered a prescribed distance, the arm 508 is displaced by the motor 530 to press the nip roller 36 against the leading end of the stimulable phosphor sheet A. Even while the stimulable phosphor sheet A is being scanned by a laser beam, the sheet A can thus be positioned and fed easily and reliably without being subjected to shocks. Due to the fact that the nip roller 36 is rotated in advance, the sheet A can be smoothly brought into the feed mode with any shocks reduced by the damping action of the coil spring 528 when the leading end of the sheet A engages the surface of the nip roller 36. The stimulable phosphor sheet A is prevented from abruptly hitting the downstream roller pair and hence from being shocked undesirably. The stimulable phosphor sheet A is fed while it is being firmly gripped at its leading and trailing ends by the roller pair 26 and the driver roller 34 and the nip roller 36, so that the sheet A is not displaced out of the direction of travel. The stimulable phosphor sheet A as it is not positionally displaced is scanned in both the main and subscanning directions for reading the recorded radiation image highly accurately from the sheet A in the image readout unit 56.

Figure 35:
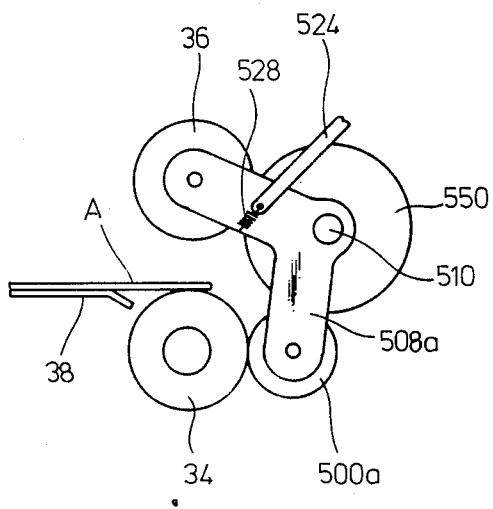
FIG. 35 is a side elevational view of a sheet feed mechanism according to another embodiment of the present invention for a light beam scanning apparatus.
Figure 36:
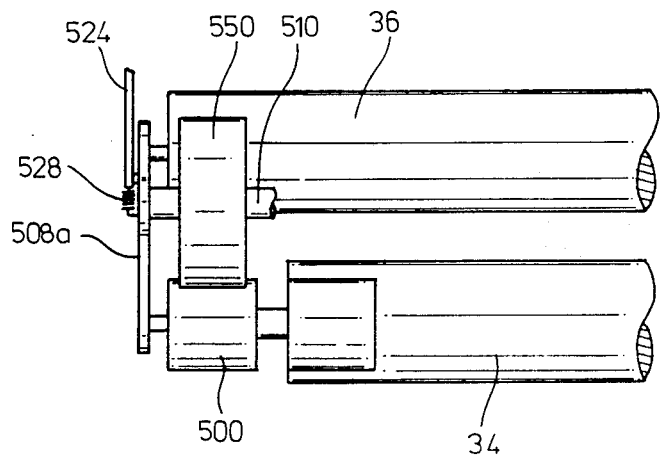
FIG. 36 is a fragmentary front elevational view of the sheet feed mechanism of FIG. 35.

FIGS. 35 and 36 show a sheet feed mechanism in accordance with another embodiment of the present invention. The sheet feed mechanism shown in FIGS. 35 and 36 is similar to the sheet feed mechanism of FIGS. 31 through 34, except as follows: An arm 508 is of a Y-shaped configuration with a transmission roller 500a and the nip roller 36 rotatably mounted on the opposite ends of the arm 508. A larger-diameter transmission roller 550 is also rotatably mounted on the arm 508 between the rollers 36, 500a in rolling contact therewith.

The rotative power of the transmission roller 500a held in rolling contact with the driver roller 34 is transmitted through the larger-diameter transmission roller 550 to the nip roller 36, which is therefore rotated at the same speed as the driver roller 34. The swing rod 526 is coupled through the coil spring 528 to the arm 508a. The swing rod 526 is angularly moved by the motor 530 to turn the arm 508a about the shaft 510, for thereby moving the nip roller 36 toward or away from the driver roller 34.

FIG. 37 shows a sheet feed mechanism according to still another embodiment of the present invention. A transmission roller 573 positioned directly above the nip roller 3 which is disposed directly above the driver roller 34. A first pulley 560 is fixed coaxially to the driver roller 34, and a second pulley 562 is disposed in spaced relation to the first pulley 560. A first belt 564 is trained around the first and second pulleys 560, 562. A third pulley 566 is disposed upwardly of the second pulley 562, and a second belt 568 is trained around the second and third pulleys 562, 566. A third pulley 572 is trained around the third pulley 566 and a fourth pulley 570 fixed coaxially to the transmission roller 573. The nip roller 36 is vertically movable between a position in which it is held in rolling contact with the transmission roller 573 and a position in which it is held in rolling contact with the driver roller 34.

When the stimulable phosphor sheet A is fed by the roller pair 26 and reaches a prescribed position, a signal indicative of the position of the sheet A is applied to lower the nip roller 36 as it rotates into contact with the sheet A to feed the same continuously. More specifically, the driver roller 34 rotates the first pulley 560 which rotates the second pulley 562 through the first belt 564. The second pulley 562 then rotates the third pulley 566 through the second belt 568, and the third pulley 566 rotates the transmission roller 573 in the direction of the arrow through the third belt 572. Therefore, the nip roller 50 held in rolling contact with the transmission roller 573 is rotated in the direction opposite t the direction in which the transmission roller 573 is rotated.

Upon arrival of the stimulable phosphor sheet A at the prescribed position, as described above, the nip roller 36 is lowered out of rolling contact with the transmission roller 573 to the position shown by the broken line. At this time, the stimulable phosphor sheet A is caused by the roller pair 26 to reach a position just above the driver roller 34. The sheet A is therefore gripped by the driver roller 34 and the nip roller 36 which rotates at the same speed as the speed of travel of the sheet A, and is continuously fed by the rollers 34, 36.

With this embodiment, the rotative power of the driver roller 34 can reliably be transmitted to the nip roller 36 through a belt-and-pulley system which is simple in structure.

Figure 38:
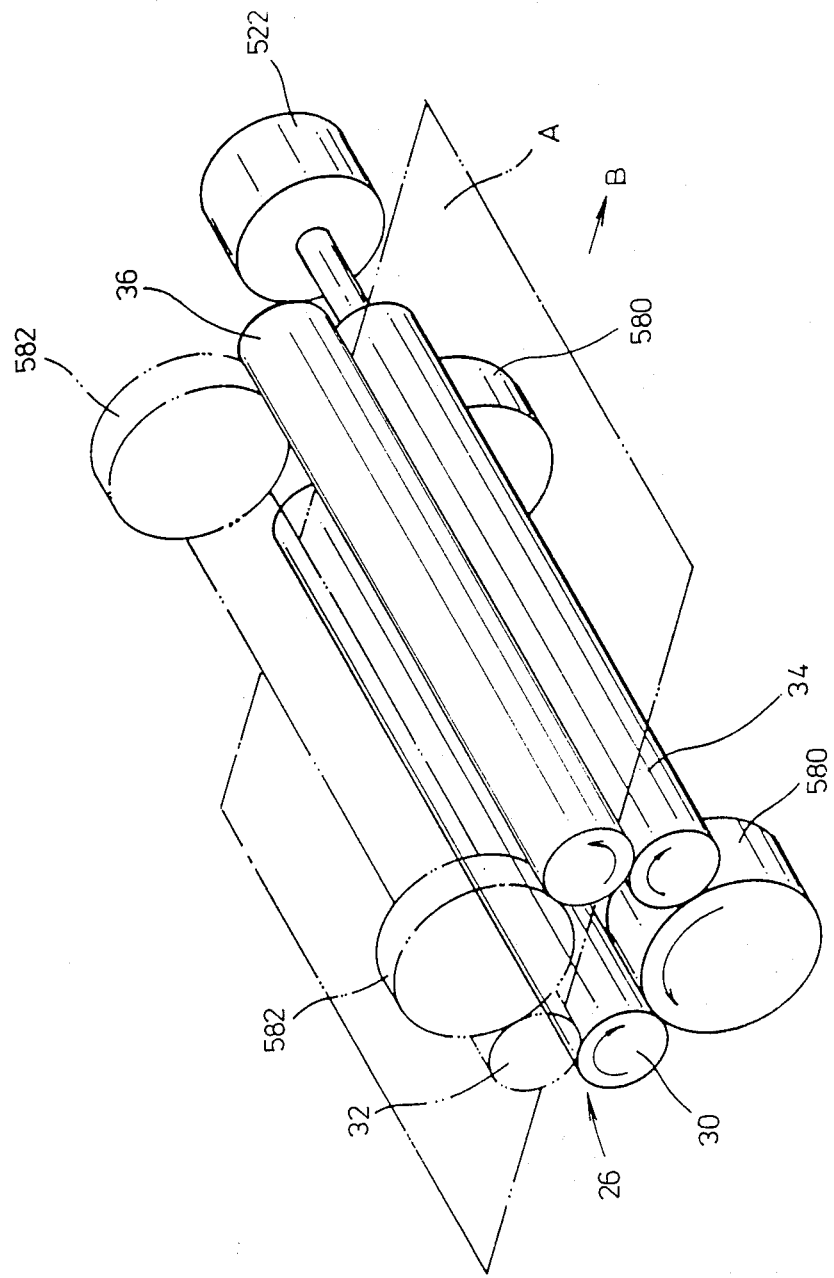
FIG. 38 is a perspective view of a sheet feed mechanism in accordance with a still further embodiment of the present invention.

A still further embodiment of the present invention is illustrated in FIGS. 38 and 39(a) through 39(c). As shown in FIG. 38, a first pair of transmission pulleys 580 is disposed between the driver roller 30 of the upstream roller pair and the driver roller 34 of the downstream roller pair in rolling contact therewith, and similarly a second pair of transmission pulleys 582 is disposed between the nip roller 32 of the upstream roller pair and the nip roller 36 of the downstream roller pair in rolling contact therewith. The rotative power of the driver pulley 36 coupled to the motor 522 is transmitted through the first transmission pulleys 580 to the driver roller 30. The nip roller 32 is positioned above the driver roller 30 and can be moved into rolling contact therewith. The nip roller 36 is positioned above the driver roller 34 and can be moved into rolling contact therewith.

First, the driver roller 30 and the nip roller 32 of the upstream roller pair are brought into rolling contact with each other, and the driver roller 34 and the nip roller 36 of the downstream roller pair are spaced from each other. The motor 522 is energized to rotate the driver roller 34, the transmission pulleys 580, and the driver roller 30. Since the driver roller 30 and the nip roller 32 are held in rolling contact with each other at this time, the nip roller 32 is also rotated. The rotation of the nip roller 32 is transmitted via the transmission pulleys 582 to the nip roller 36. When the stimulable phosphor sheet A reaches a position between the driver roller 30 and the nip roller 32, the sheet A is gripped between the driver roller 30 and the nip roller 32 as they are rotated and is fed in the subscanning direction (FIG. 39(a)).

The stimulable phosphor sheet A is continuously fed along until its leading end reaches the downstream roller pair, whereupon the nip roller 36 is lowered against the sheet A. Therefore, the stimulable phosphor sheet A is gripped between the rollers 30, 32 and also between the rollers 34, 36 (FIG. 36(b)).

As the stimulable phosphor sheet A is gripped by the driver roller 34 and the nip roller 36 of the downstream roller pair, the nip roller 32 is lifted away from the driver roller 30 to release the stimulable phosphor sheet A, which is thereafter fed by the rollers 34, 36 (FIG. 36(c)).

The rotative power of the motor 522 is transmitted through the driver roller 34, the transmission pulleys 580, the driver roller 30, the nip roller 32, and the transmission pulleys 582 to the nip roller 36. Therefore, the nip roller 36 is rotated before the sheet A is gripped by the nip roller 36 and the driver roller 34. As a result, the stimulable phosphor sheet A can smoothly be fed by the simple sheet feed mechanism.

The sheet feed mechanisms according to the foregoing embodiments have been described as being incorporated in the image readout devices. A sheet feed mechanism according to the present invention can also be used in an image recording device for recording an image on a suitable recording medium such as a photographic photosensitive material.

Figure 40:
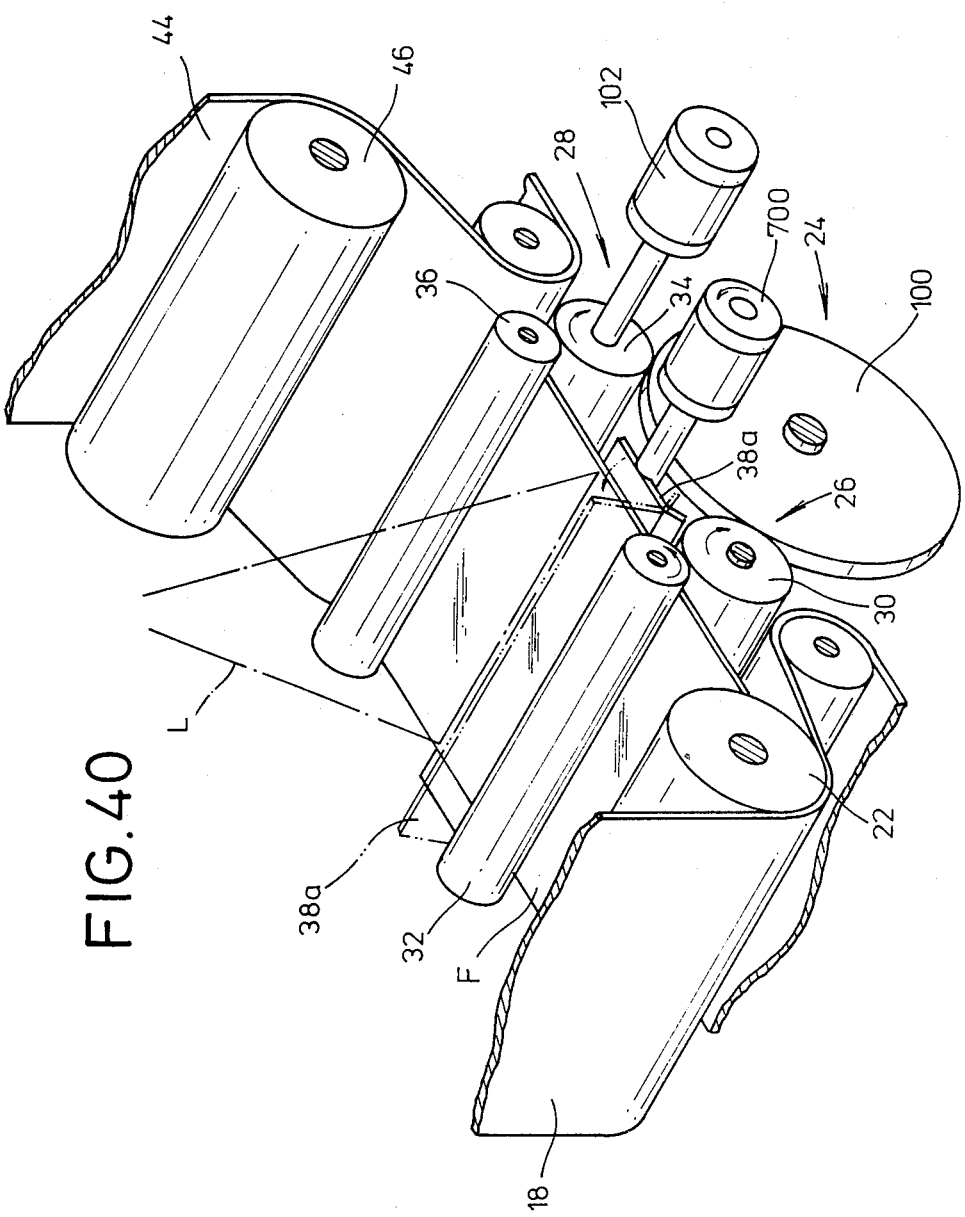
FIG. 40 is a perspective view of a sheet feed mechanism in accordance with another embodiment of the present invention.

One such embodiment is illustrated in FIG. 40. As shown in FIG. 40, a guide plate 38a is relatively short, and a motor or a rotary solenoid 700 has its rotatable shaft engaging an end of the guide plate 38a. There is no other guide plate in confronting relation to the guide plate 38a. A laser beam source (not shown) is disposed directly above the guide plate 38a. A laser beam L emitted from the laser beam source is modulated by image information to be recorded and is deflected by a light deflector (not shown) in a main scanning direction. The other structural details are similar to those of the embodiment shown in FIG. 5.

A photographic photosensitive material such as a film F is delivered by the belt conveyor 18. When the film F is detected by the sensors 200a, 200b, a signal is produced by the sensors to energize the rotary solenoid 700 for erecting the guide plate 38a between the roller pairs 26, 28. As a consequence, the film F is prevented by the guide plate 38a from being advanced, and hence is positioned by the guide plate 38a. After the film F has been positioned by the guide plate 38a, the rotary solenoid 700 is energized again to return the guide plate 38a to its original horizontal position. The time required for the film F to travel from the position established by the guide plate 38a toward the position in which the film F is to be scanned by the laser beam L can be determined in advance by the distance between those two positions and the speed at which the film F is fed by the first roller pair 26. Therefore, by applying the laser beam L to the film F when the predetermined time (referred to above) elapses, any desired image can be recorded from the leading end of the film F, namely, a black edge or frame may be produced on the leading end of the film F. The guide plate 38a may be positioned such that the position in which the film F is located by the guide plate 38a may be the same as the position in which the film F is scanned by the laser beam L. This allows the film F to be scanned immediately after the guide plate 38a is turned from the erected position to the horizontal position. It is also possible to start recording an image on the film F somewhere between its leading and trailing ends, leaving a blank margin of desired width on the leading end of the film F. Because the film F is supported in the scanning position by the guide plate 38a, the film F can stably be fed only by the roller pair 26.

When the leading end of the film F reaches the roller pair 28 while the film F is being scanned by the laser beam L, the nip roller 36 of the roller pair 28 is lowered to grip the film F between the rollers 34, 36. Even after the trailing end of the film F has left the roller pair 26, the film F is supported on the guide plate 38a and fed reliably by the roller pair 28 until the image is recorded by the laser beam L on the film F down to the trailing end thereof.

According to the previous embodiments, the stimulable phosphor sheet A or the film F is gripped and released, without shocks, by vertical movement of the nip rollers 32, 34. However, the stimulable phosphor sheet A or the film F may be gripped and released by vertically moving a roller below the sheet A or the film F.

Figure 41:
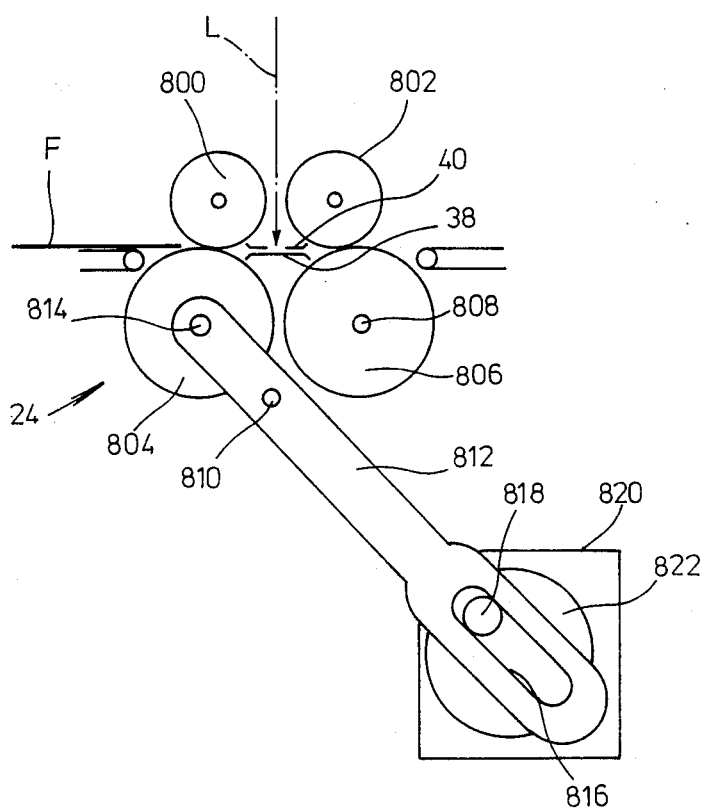
FIG. 41 is a side elevational view of a sheet feed mechanism in accordance with still another embodiment of the present invention.

FIG. 41 shows a sheet feed mechanism according to such an embodiment. Nip rollers 804, 806 are held in rolling contact with driver rollers 800, 802, respectively. The driver rollers 800, 802 are rotated at the same speed and in the same direction by a suitable means such as a belt. The driver rollers 800, 802 are smaller in diameter than the nip rollers 804, 806.

The nip roller 806 is rotatably supported on a fixed shaft 808 and pressed against the driver roller 802 under a constant force. The nip roller 804 is rotatably supported by a pin 814 on an end of a rod 812 which is pivotally mounted on a fixed pin 810. The rod 812 has a longitudinal slot 816 defined in the opposite end thereof, with a slide pin 818 slidably disposed in the slot 816. The slide pin 818 is mounted eccentrically on a disc 822 fixed to the rotatable shaft (not shown) of a rotary solenoid 820.

In operation, the film F is fed by the rollers 800, 804 to reach the rollers 802, 806. When the film F has reached the rollers 802, 806, a signal indicative of arrival of the film F is applied to energize the rotary solenoid 820. More specifically, when the film F is gripped by the driver roller 802 and the nip roller 806, the rotary solenoid 802 is energized. As a result, the disc 822 is turned to angularly move the rod 812 counterclockwise about the fixed pin 810, thus lowering the nip roller 804 away from the driver roller 800. The film F is thus fed along only by the rollers 802, 806. The film F is always gripped by at least one of the roller pairs and hence is prevented from being displaced while it is being fed along. Accordingly, an image can be recorded highly accurately o the film F and can also be recorded over its entire surface. Since the driver rollers are of a small diameter and can be rotated at a high speed, the speed of feeding movement can be controlled through an inexpensive mechanism.

Figure 42:
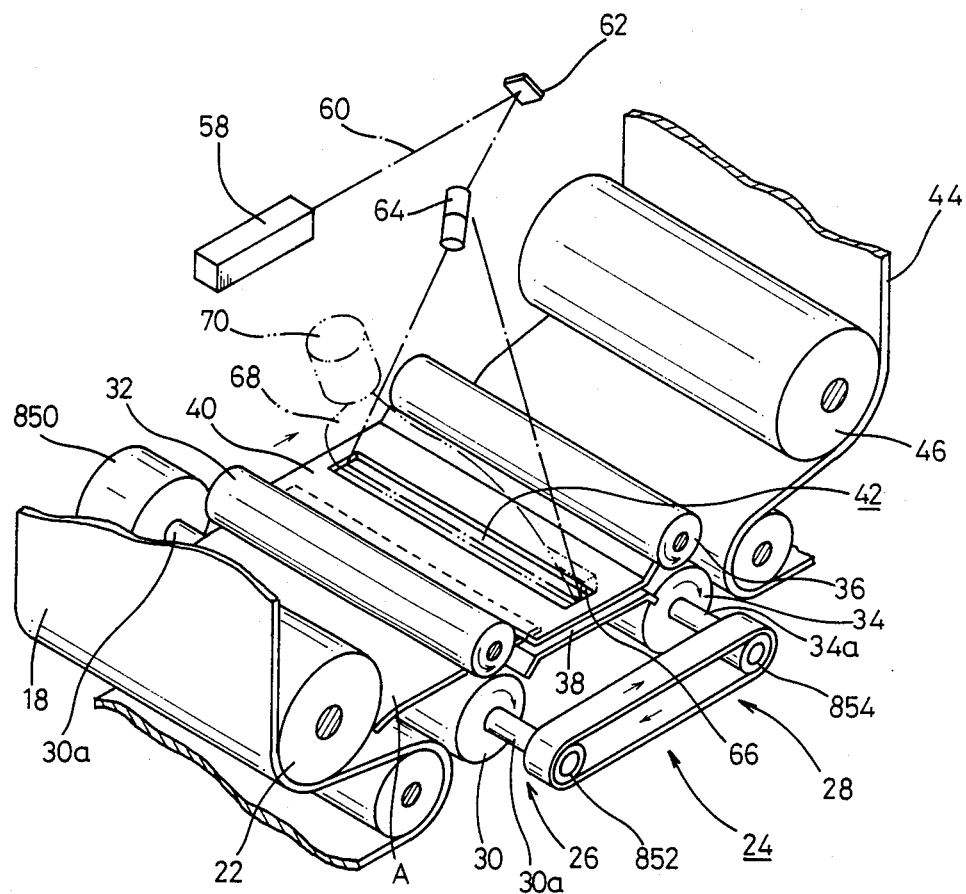
FIG. 42 is a perspective view of a sheet feed mechanism according to still another embodiment of the present invention.

Other embodiments of the present invention are illustrated in FIGS. 42 through 47. In the embodiment of FIG. 42, a power transmission belt in the form of a metal belt is employed for synchronously rotating first and second roller pairs. Those parts which are identical to those of the previous embodiments are denoted by identical reference numerals, and will not be described in detail.

As shown in FIG. 42, a drive motor 850 is coupled to one end of the driver shaft 30a of the roller 30 of the first roller pair 26, and a belt pulley 852 is coupled to the other end of the driver shaft 30a. A belt pulley 854 is connected to an end of the driven shaft 34a of the roller 34 of the second roller pair 28. A metal belt 856 with parallel runs is trained around the pulleys 852, 854, so that the rollers 30, 34 can be rotated synchronously in response to energization of the motor 850.

In order that the stimulable phosphor sheet A can be fed with higher accuracy in the subscanning direction by the two roller pairs 26, 28 which are rotated in synchronism, any irregularity of synchronous rotation of these roller pairs 26, 28 should be as small as possible. Such rotational irregularity is generally expressed by following equation:

Rotational irregularity = $\Delta T/AE$ (Torque irregularity)

where
$\Delta T$: the difference between the tensioned and loosened runs of the belt between the belt pulleys;
A: the cross-sectional area of the belt (thickness (t) × width (w)); and
E: Young's modulus of the belt material.

For reliable transmission of the rotation from the driver shaft to the driven shaft, the belt material should be of high Young's modulus E in order to prevent rotational irregularity since the tension difference $\Delta T$ cannot be lowered below a certain limit and the thickness (t) and width (w) of the belt cannot be increased beyond certain limits.

It is preferable that the belt material to be used in the sheet feed mechanism of this embodiment have Young's modulus E of 10,000 (kg/mm$^2$) or greater for the reason that if Young's modulus were lower than 10,000 (kg/mm$^2$), the belt would tend to cause rotational irregularity that cannot be ignored in a low-speed range.

While the belt may be made of any material in respect of transport accuracy insofar as its Young's modulus is 10,000 (kg/mm$^2$) or greater, the belt material should preferably be metal for rigidity.

The metal belt 856 may comprise a specially machined steel belt, a specially machined stainless steel belt, or any other metal belt provided it has good flatness accuracy, high resiliency and rigidity, is less oxidizable, and can transmit rotation of the motor without rotational irregularity. However, a nickel-plated belt is particularly preferable.

The reasons for the preferred belt materials described above are as follows: Belts of leather, rubber, cotton, wool, and jute would be low in resiliency and rigidity. Ordinary steel belts and stainless steel belts would not have reduced inner peripheral lengths. Belts with seams would not have increased flatness accuracy. Those belts such as ordinary steel belts which would be oxidized and form an oxide on their surfaces in use would be liable to get damaged, tend to be broken due to stress concentration thereon, and would result in rotational speed variations and reduce the service life of the belt pulleys since the oxide on the belt surface would abrade the crowns of the belt pulleys.

Belts of synthetic resin would be low in cost, high in flatness, and might be of freely selectable lengths, but would be of smaller Young's modulus and resiliency than metal belts. Therefore, synthetic resin belts would be apt to produce rotational irregularity and subject to plastic deformation during long usage, resulting in the failure to transmit rotation of the driver shaft accurately to the driven shaft.

Figure 45:
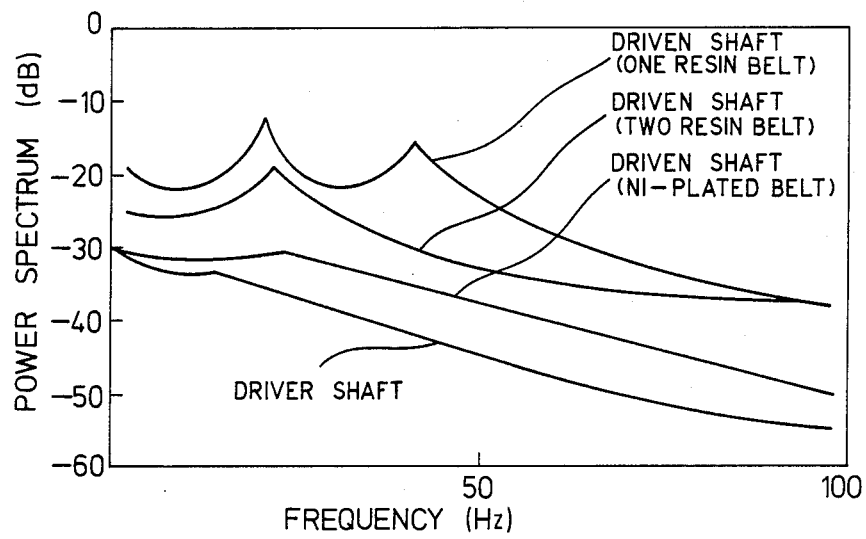
FIG. 45 is a graph showing the power spectrum of driver an driven shafts with synthetic resin and Ni-plated belts being trained therearound.

The inventors measured the power spectrum of the driver and driven shafts by rotating them synchronously with one and two Ni-plated and synthetic resin belts being trained around the pulleys on the driver and driven shafts. The results of the measurements are shown in FIG. 45. As shown in FIG. 45, the power spectrum of the driven shaft driven by the Ni-plated belt is more similar to that of the driver shaft than the driven shafts driven by the synthetic resin belts, so that the Ni-plated belt can transmit rotation of the driver shaft more accurately.

The subscanning sheet feed mechanism 24 of the present embodiment is basically constructed as shown in FIG. 42, as described above. While the drive motor 850 is directly coupled to the driver shaft 30a of the roller 30 of the first roller pair 26 which is located upstream in the sheet feeding direction, the embodiment is not limited to this arrangement. Rather, the drive motor 850 may be directly coupled to the driven shaft 34a of the roller 34 of the second roller pair 28 which is located downstream. Stated otherwise, the driver and driven shafts may be switched around in position. The motor 850 may be positioned on the same side of the stimulable phosphor sheet A as the belt pulleys 852, 854.

Figure 43:
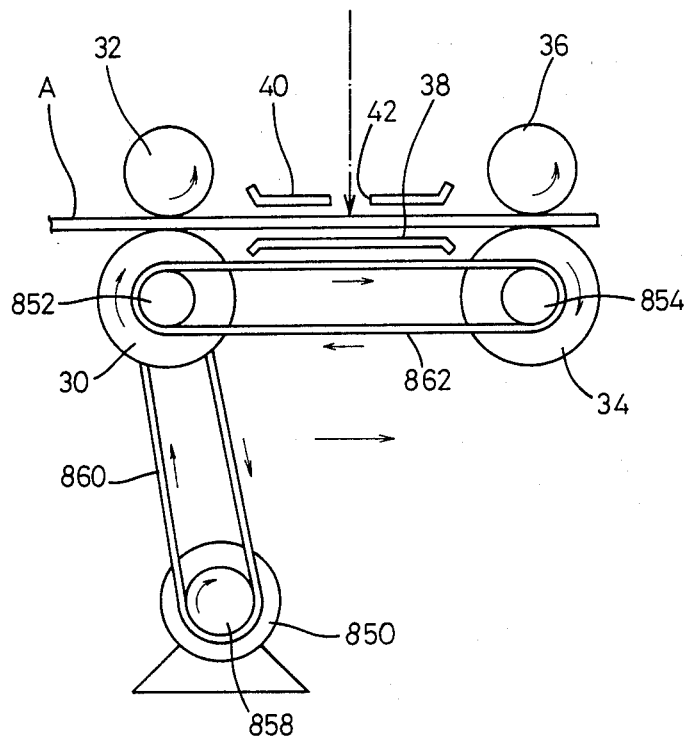
FIG. 43 is a cross-sectional view of a sheet feed mechanism according to yet another embodiment of the present invention.

FIG. 43 shows yet another embodiment of the present invention. In this embodiment, a motor 850 is disposed independently of the roller pairs 26, 28. Two belt pulleys 852 (one shown) are mounted on the driver shaft 30a of the roller 30 of the first roller pair 26, and a belt pulley 858 is mounted on the shaft of the motor 850. A metal belt 860 is trained around one of the two belt pulleys 852 and the belt pulley 858. Another metal belt 862 is trained around the other belt pulley 852 and a belt pulley 854 on the driven shaft 34a of the roller 34 of the second roller pair 28. The belt pulleys 852 may be disposed one on each side of the stimulable phosphor sheet A, or both of the belt pulleys 852 may be positioned on one side of the stimulable phosphor sheet A. In the latter case, the two belt pulleys 852 may be replaced with one belt pulley which has a width (rim-to-rim width) twice as large as the width of each of the belt pulleys 852 so that the two metal belts 860, 862 can be trained around such a single belt pulley. The metal belt 860 may be trained around the belt pulley 858 and a pulley on the driven shaft 34a of the roller 34 of the second roller pair 28.

Figure 44:
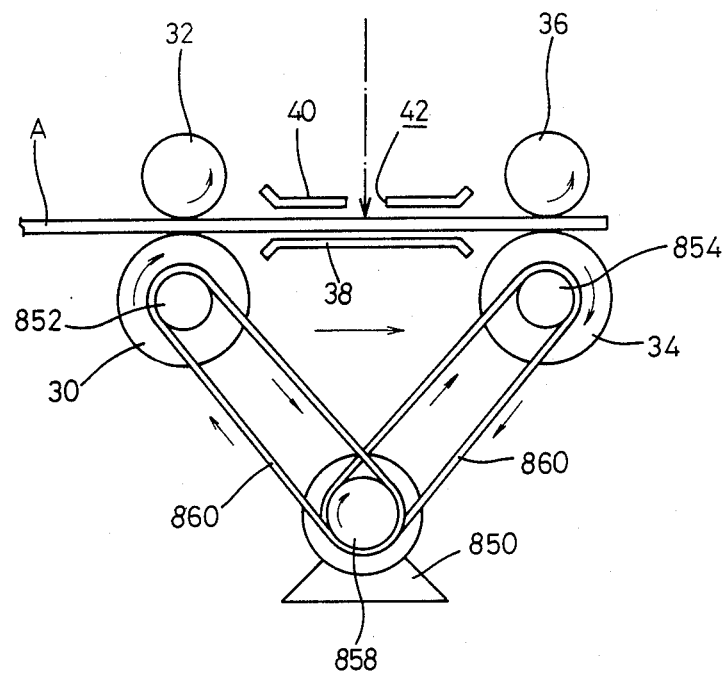
FIG. 44 is a cross-sectional view of a sheet feed mechanism according to yet still another embodiment of the present invention.

FIG. 44 shows yet another embodiment of the present invention. Two belt pulleys 858 or a single belt pulley having a rim-to-rim width twice as large as that of each of the two belt pulleys 858 is mounted on the shaft of a motor 850. A metal belt 860 is trained around one of the belt pulleys 858, or the single pulley, and a belt pulley 852 on the roller 30, and another metal belt 860 is trained around the other belt pulley 858, or the single pulley, and a belt pulley 854 on the roller 34.

Tension rollers may be provided for tensioning the metal belts.

As described above, the principles of the present invention cover metal belts trained directly or indirectly around the rollers of the two roller pairs which grip and feed the stimulable phosphor sheet in the subscanning direction.

In the embodiments shown in FIGS. 42 through 44, the guide members for guiding and holding the sheet-like medium being scanned are disposed separately between the rollers of the two roller pairs of the subscanning sheet feed mechanism. The guide members may however be arranged so as to be trained around the rollers which are rotated in synchronism, and may be of any construction insofar as they can guide and hold the sheet-like medium being scanned.

Operation of the subscanning sheet feed mechanism 24 of FIG. 42 will be described below. The motor 850 is energized to rotate the roller shaft 30a of the roller 30 of the first roller pair 26. The first and second roller pairs 26, 28 are synchronously rotated without rotational irregularity by the metal belt 856 trained around the belt pulley 852 on the roller shaft 30a and the belt pulley 854 on the roller shaft 34a of the roller 34 of the second roller pair 28. Since the two roller pairs 26, 28 are synchronously rotated at the same speed by the metal belt 856, the stimulable phosphor sheet A can smoothly be fed at a constant speed highly accurately in the subscanning direction.

The distance between the roller pairs 26, 28 is selected to be smaller than the length of the stimulable phosphor sheet A in the direction in which it is fed along, and the roller pairs 26, 28 are synchronously rotated by the metal belt 856, as described above. Therefore, the stimulable phosphor sheet A is first gripped by the first roller pair 26 and displaced in the direction of the arrow, and thereafter the trailing end of the sheet A is gripped and pushed by the first roller pair 26 to deliver the leading end of the sheet A smoothly toward the second roller pair 28. Inasmuch as the stimulable phosphor sheet A is always gripped and fed by at least one of the roller pairs 26, 28, the stimulable phosphor sheet A is prevented from being displaced out of the feeding direction. As a result, during the period of time after the leading end of the stimulable phosphor sheet A enters between the first roller pair 26 and until the trailing end of the stimulable phosphor sheet A, the stimulable phosphor sheet A can accurately and smoothly be conveyed at a constant speed without being positionally displaced, so that the radiation image recorded on the sheet A is well read by the reading unit 56.

With the above embodiments, as described above, for two-dimensionally reading or recording radiation image information from or on a medium such as a stimulable phosphor sheet or a photographic photosensitive material by applying a light beam to the medium in a radiation image information reading and/or recording apparatus, the medium is gripped and fed in a subscanning direction by two roller pairs which are synchronously rotated by a metal belt trained therearound while at the same time the medium is being scanned in a main scanning direction by the light beam which is one-dimensionally deflected. The belt is of increased durability, and minimizes any rotational irregularity. The accuracy of feeding the medium in the subscanning direction is much higher than that of feeding the medium in the conventional arrangements. Therefore, the radiation image information can accurately and smoothly be read from or recorded on the medium. Since the accuracy of feeding in the medium in the subscanning direction is increased by the use of the metal belt, the drive source or motor may be disposed independently of the two roller pairs which grip and feed the medium being scanned. As a consequence, the position in which the drive source is installed can be freely selected without limitations. The entire apparatus is prevented from being increased in size, and can be produced with a reduced cost.

Another embodiment of the present invention is shown in FIGS. 46 and 47. This embodiment is concerned with a method wherein, for reading an image from or recording an image on a sheet such as a stimulable phosphor sheet bearing radiation image information or an image recording film while gripping and feeding the sheet with nip rollers, the speed at which the sheet is gripped by the nip rollers, the speed at which the nip rollers are separated from the sheet, and the speed at which the sheet is fed by the nip rollers can automatically be set to desired speeds. With this method, the image can be read or recorded accurately in as short a period of time as possible, so that the image reading or recording apparatus can have an increased overall throughput.

An apparatus shown in FIG. 46 for carrying out such a method includes a main controller 900 for controlling various processes such as feeding of a stimulable phosphor sheet A, reading an image therefrom, developing an image, and the like, and a nip roller controller 902 electrically connected to the main controller 900 for controlling the speed at which first and second nip roller pairs 26, 28 grip the stimulable phosphor sheet A, the speed at which the first and second nip roller pairs 26, 28 are separated from the stimulable phosphor sheet A, and the speed at which the stimulable phosphor sheet A is fed by the first and second nip roller pairs 26, 28. The nip roller controller 902 is supplied, from the main controller 900, with input information indicating the dimensions of the stimulable phosphor sheet A, a main reading process, a preliminary reading process, and the like, and a drive start signal representing the speeds at which the nip rollers are to grip, be separated from, and feed the sheet A. The input information and the drive start signal are applied to an interface 904 in the nip roller controller 902. The input information is then applied via a decoder 906 to a speed selector 908, which supplies a speed selection signal to a first input terminal of a drive signal generator 910. The drive start signal is fed via the interface 904 to a second input terminal of the drive signal generator 910, which is applied via a power amplifier 912 to a solenoid 914 that controls the speed at which the nip roller pairs 26, 28 grip the stimulable phosphor sheet A and also the speed of rotation of the nip roller pairs 26, 28. The output signal from the drive signal generator 910 is also fed back to a third input terminal thereof through a speed control unit 916.

The output signal from the power amplifier 912 is also applied as a monitor signal to an error detector 918, from which the monitor signal is applied via the interface 904 to the main controller 900.

Designated in FIGS. 47a through 47m at 920a, 922a are light-emitting elements and at 920b, 922b light detector elements.

The apparatus for carrying out the method of controlling the sheet feed system is basically constructed as described above and shown in FIG. 46. Operation and advantages of the apparatus will be described below.

A supply magazine 14 is loaded in the chamber 12 (FIG. 1) of the image readout device 10. The supply magazine 14 stores a stack of stimulable phosphor sheets A on which radiation images of objects such as human bodies are recorded. The main controller 900 then issues information indicative of the dimensions of the stimulable phosphor sheets A, a preliminary reading process, a main reading process, and the like. The dimensions of the stimulable phosphor sheets A can be detected by reading a bar code attached as identification information to an end of each of the stimulable phosphor sheets A, with a bar code reader (not shown) disposed upstream of the image readout unit 56 (FIG. 1). The preliminary reading process is effected in advance of the main reading process in which the stimulable phosphor sheet A is scanned by stimulating light to read recorded radiation image information for reproducing a visible image for observation. In the preliminary reading process, stimulating light of a lower energy level than that applied in the main reading process is applied to the stimulable phosphor sheet A to roughly read the recorded radiation image information in order to establish suitable reading conditions and/or image processing conditions to be used in the main reading process.

The information from the main controller 900 is applied via the interface 904 and the decoder 906 to the speed selector 908 which selects the speed at which the stimulable phosphor sheet A is to be fed or the speed at which it is to be gripped by the nip roller pairs in the main and preliminary reading processes.

The stimulable phosphor sheets A are taken, one at a time, from the supply magazine 14 by the sheet feed mechanism including the suction cup 16. The stimulable phosphor sheet A is fed at a high speed to the subscanning sheet feed mechanism 24 through the feed belt 18, the rollers 20a through 20d, and the roller 22 disposed below the suction cup 16. When the stimulable phosphor sheet A enters between the photosensor elements 920a, 920b to cut off light from the light-emitting element 920a (FIG. 47a), the light detector element 920b applies an output signal to the main controller 900.

Figure 47A:
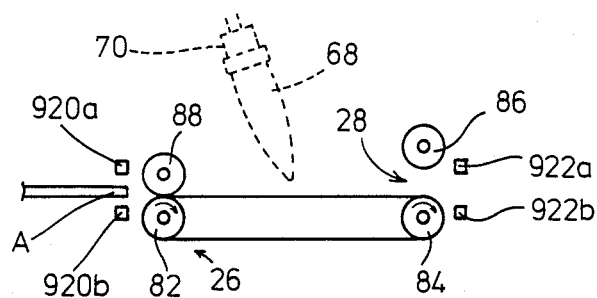
FIGS. 47a through 47m are schematic views showing operation of a sheet feed mechanism including nip rollers to be incorporated in an apparatus for carrying out the method of the present invention.
Figure 47B:
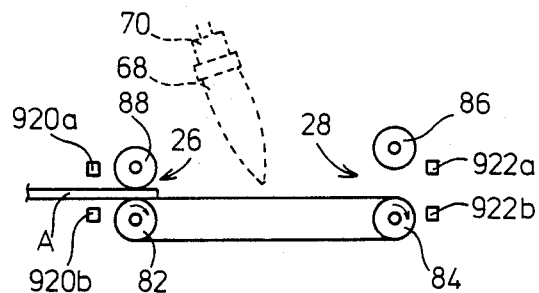
Figure 47C:
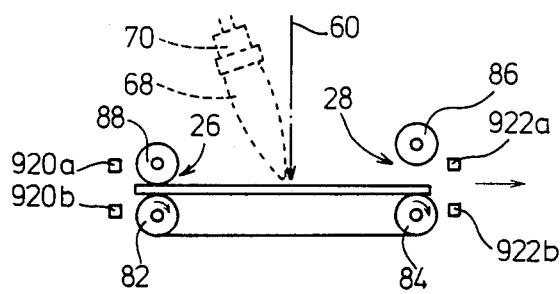

Then, the main controller 900 applies a drive start signal to the second input terminal of the drive signal generator 910 in the nip roller controller 902. Since a preliminary reading process signal has been applied to the drive signal generator 910 at this time, nip rollers 82, 84 are rotated at a high speed by a motor (not shown) through the power amplifier 912 and the solenoid 914 for introducing the stimulable phosphor sheet A into the readout unit 56 at the high speed as shown in FIG. 47b. Therefore, the image information carried by the stimulable phosphor sheet A can be read quickly in the preliminary reading process. In the preliminary reading process, since the stimulable phosphor sheet A may be roughly scanned, the spot diameter of the laser beam 60 from the laser beam source 58 is selected to be relatively large.

Figure 47D:
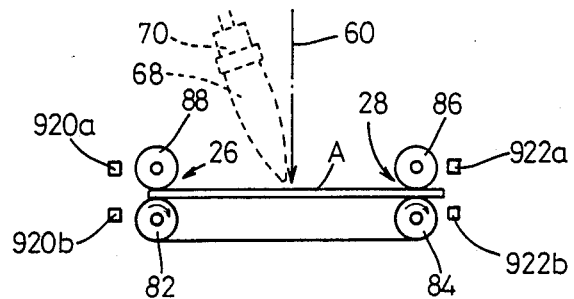

Information obtained in the preliminary reading process is introduced via the light guide 68 and the photomultiplier 70 into the main controller 900 in which optimum image processing conditions are established for exposure in a main reading process or an image recording process. When the stimulable phosphor sheet A is fed to the position shown in FIG. 47c during the preliminary reading process, the rollers of the nip roller pair 26 are moved relatively toward each other to grip and feed the stimulable phosphor sheet A in the direction of the arrow to continue the preliminary reading process (FIG. 47d).

Figure 47E:
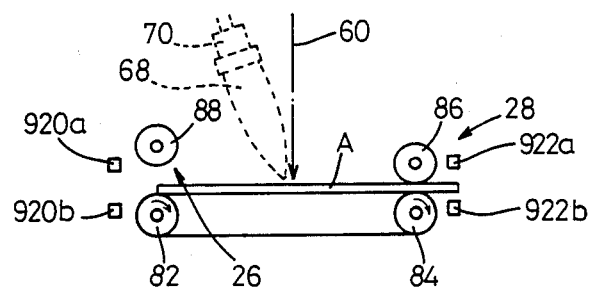
Figure 47F:
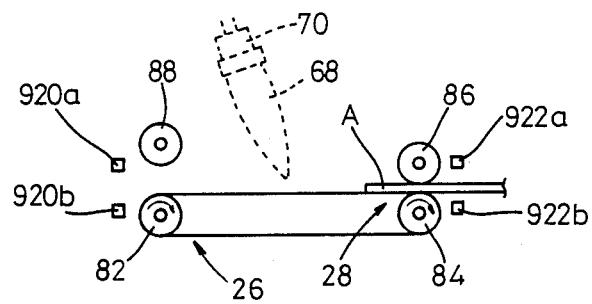
Figure 47G:
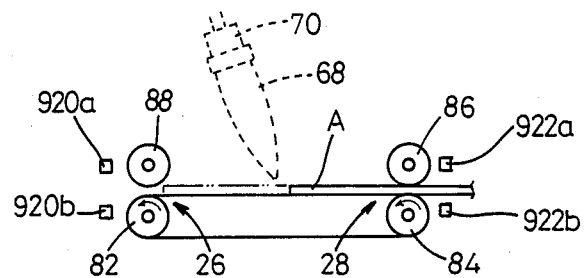
Figure 47H:
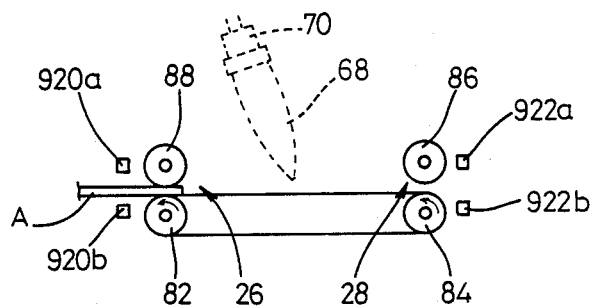
Figure 47I:
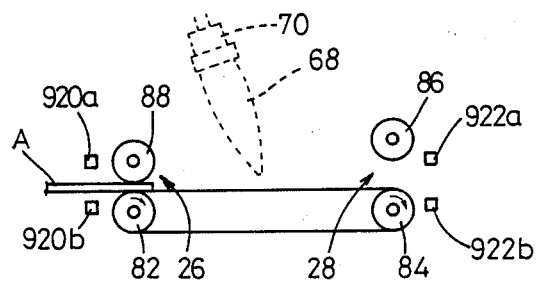
Figure 47J:
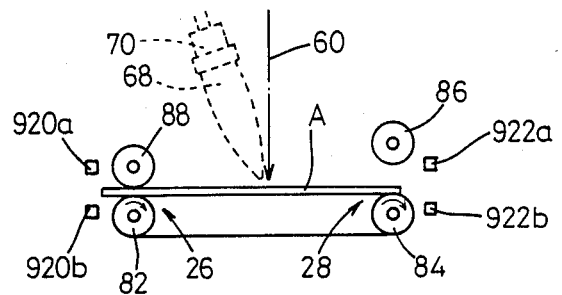
Figure 47K:
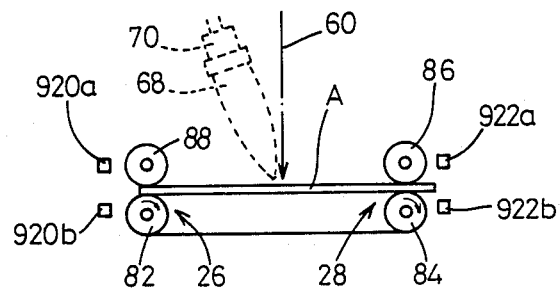

When the stimulable phosphor sheet A enters between the light-emitting element 922a and the light detector element 922b, the light detector element 922b issues an output signal to operate the main controller 900, the nip roller controller 902, and the drive signal generator 910 for applying a signal through the power amplifier 912 and the solenoid 914 to separate the first nip roller pair 26 from the stimulable phosphor sheet A (FIG. 47e). At this time, the speed at which the second nip roller pair 28 grips the stimulable phosphor sheet A, the speed at which the first nip roller pair 26 is separated from the stimulable phosphor sheet A, and the speed of rotation of the nip rollers 82, 84 may be high. This is because, in the preliminary reading process, slight positional displacement of the stimulable phosphor sheet A due to high-speed gripping of the sheet A by the nip roller pair 28, high-speed separation of the nip roller pair 26 from the sheet A, and high-speed delivery of the sheet A does not pose any practical problem since the information generated in the preliminary reading process is used only as data for determining image processing conditions and the like in the main reading process. When the preliminary reading process is completed as shown in FIG. 47f, the nip roller pairs 26, 28 are reversed as shown in FIG. 47g until the stimulable phosphor sheet A is fed back to a position upstream of the light guide 68 (see FIG. 47h). At this time, the rollers 82, 88 of the first nip roller 26 are spaced from each other by a distance slightly smaller than the thickness of the stimulable phosphor sheet A. When the feeding back of the sheet A is finished, the rollers, 84, 86 of the second nip roller pair 28 are moved relatively away from each other as shown in FIG. 47i.

Now, the main reading process is started. An output signal from the drive signal generator 910 is applied via the power amplifier 912 to the solenoid 914 to feed the stimulable phosphor sheet A at a low speed for reading the image information on the sheet A highly precisely. More specifically, the nip rollers 82, 84 of the subscanning sheet feed mechanism 24 are rotated at a low speed to deliver the stimulable phosphor sheet A at a low speed in the subscanning direction. The image readout unit 56 (FIG. 1) is energized again at this time. The laser beam 60 emitted from the laser beam source 58 is reflected by the mirror 62 to reach the galvanometer mirror 64, which is angularly moved to scan the sheet A with the laser beam 60. Light emitted from the stimulable phosphor sheet A by exposure to the laser beam 60 is introduced into the light guide 68 directly or via the reflecting mirror 68, and is then converted to an electric signal by the photomuplier 70. The electric signal is then supplied to the main controller 900.

Figure 47L:
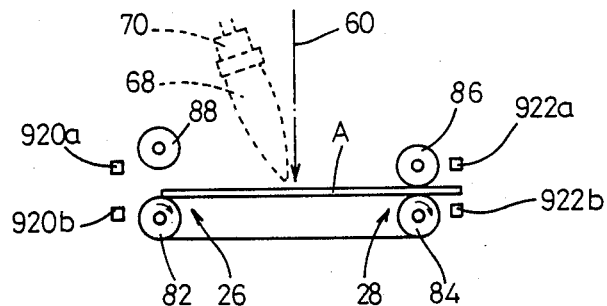
Figure 47M:
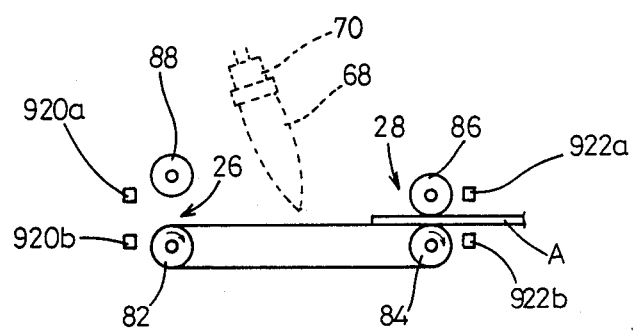

The main reading process is carried out in a sequential process as shown in FIGS. 47j through 47m. The rollers 84, 86 of the second nip roller pair 28 can be moved toward each other at a very high speed from the position of FIG. 47j to the position of FIG. 47k until the rollers 84, 86 grip the stimulable phosphor sheet A, by feedback operation of the speed control unit 916. More specifically, immediately after the nip roller pair 28 stars being operated, a large current is supplied to the solenoid 914 in a short period of time to move the rollers 84, 86 toward each other at a high speed. Then, immediately before the rollers 84, 86 grip the sheet A, the gradient of the supplied current is lessened to move the rollers 84, 86 at a lower speed into slow gripping engagement with the sheet A while preventing the stimulable phosphor sheet A from being deformed due to abrupt gripping engagement. After the rollers 84, 86 have gripped the stimulable phosphor sheet A, the gradient of the current is increased to produce prescribed gripping forces for thereby enabling the rollers 84, 86 to continuously grip the sheet A. With this mode of control, the time period required to grip the sheet A can be shortened while preventing positional displacement thereof. Likewise, the speed of movement of the rollers 82, 88 of the first nip roller pair 26 from the position of FIG. 47k to the position of FIG. 47l is controlled such that the speed remains low until immediately after the rollers 82, 88 are separated from the stimulable phosphor sheet A after leaving the gripping position, and is increased to a higher level until the rollers 82, 88 return to their original separated position immediately after they have been separated from the sheet A. Therefore, any variations in the load on the motor (not shown) which rotate the nip roller pair 26 are reduced to a minimum. When the stimulable phosphor sheet A reaches the position of FIG. 47m, the rollers 84, 86 of the second nip roller 28 are disengaged from the stimulable phosphor sheet A, which is then fed to a next process by the feed belt. In the main or preliminary reading process, the error detector 918 in the nip roller controller 902 compares the monitor signal from the power amplifier 912 with a predetermined signal level to determine if there is a difference between the monitor signal and such a predetermined signal level. If there is a difference, then the error detector 918 applies a signal indicative of an operation fault of the solenoid 914 to the main controller 900, which then disable the nip roller pairs 26, 28 to stop the feeding operation.

In the above embodiment, the speeds at which the nip rollers grip and are separated from the stimulable phosphor sheet A are varied according to the feeding speed of the stimulable phosphor sheet A in the preliminary and main reading processes. However, the feeding speed may be controlled according to the detected dimensions of the stimulable phosphor sheet A for varying the speeds at which the nip rollers grip and are separated from the stimulable phosphor sheet A.

With the above embodiment, as described above, for reading an image from and recording an image on a sheet such as a stimulable phosphor sheet bearing radiation image information while gripping the sheet with nip rollers, the speed at which the nip rollers grip the sheet, the speed at which the nip rollers are separated from the sheet, and the speed at which the sheet is fed by the nip rollers are set to predetermined speeds based on reading conditions and/or image processing conditions. Therefore, the image can be read with desired accuracy, and can be processed in as short a period of time as possible. Therefore, the throughput of the apparatus can be increased to a large degree.

According to the present invention, as described above, two pairs of rollers for gripping and feeding a sheet-like medium such as a stimulable phosphor sheet or a photosensitive film in a subscanning direction are spaced from each other by a distance smaller than the length of the sheet-like medium in the direction of feed thereof, and the two pairs of rollers are rotated in synchronism with each other. Therefore, the sheet-like medium is always gripped by at least one pair of rollers and fed accurately thereby, and can smoothly be brought into engagement with the other pair of rollers. When applying stimulating light to the stimulable phosphor sheet to read out recorded radiation image information, or when applying a laser beam to the photosensitive film to record a visible image thereon, clear image information can be read out or recorded. Since the sheet feed mechanism or subscanning mechanism is simple in construction, it can be manufactured inexpensively and small in size. Where the sheet feed mechanism is incorporated in a light beam scanning apparatus, the light beam scanning apparatus can also be small or compact and hence takes up only a small installation space.

Although certain preferred embodiments have been shown and described, it should be understood that many changes and modifications may be made therein without departing from the scope of the appended claims.

What is claimed is:

1. A sheet feed mechanism for feeding a sheet-like medium in a subscanning direction transverse to a main scanning direction in which said sheet-like medium is scanned by a light beam applied thereto while being deflected one-dimensionally for thereby two-dimensionally scanning the sheet-like medium, said sheet feed mechanism comprising two pairs of rollers for gripping and feeding said sheet-like medium, said pairs of rollers being spaced from each other by a distance shorter than the sheet-like medium for allowing said light beam deflected one-dimensionally to be applied to the sheet-like medium to scan the sheet-like medium in the main scanning direction, a drive source for synchronously driving said pairs of rollers, and a metal belt trained around said two pairs of rollers and/or said drive source and said pairs of rollers for synchronously driving said pairs of rollers to feed the sheet-like medium in the subscanning direction.

2. A sheet feed mechanism according to claim 1, wherein said metal belt comprises a nickel-plated belt.

3. A sheet feed mechanism according to claim 1, further including a guide member disposed in a prescribed position between said pairs of rollers for guiding at least one surface of said sheet-like medium.

4. A sheet feed mechanism according to claim 1, wherein sheet-like medium comprises a stimulable phosphor sheet on which radiation image information is recorded, further including means for photoelectrically reading light bearing the recorded radiation image information, which is emitted from said stimulable phosphor sheet upon exposure to the light beam.

5. A sheet feed mechanism according to claim 1, wherein said sheet-like medium comprises a photographic photosensitive material, further including means for recording an image on said photographic photosensitive material by applying the light beam thereto.

6. A method of controlling a sheet feed system having a first roller pair and a second roller pair which are spaced from each other for gripping a sheet-like medium, one of said first and second roller pairs being drivable to feed the sheet-like medium gripped therebetween in a prescribed direction, said method comprising the steps of detecting movement of the sheet-like medium gripped and fed by said first roller pair toward said second roller pair to control the speed at which rollers of said second roller pair approach a position to grip said sheet-like medium dependent on the speed at which said sheet-like medium is fed, and/or detecting movement of a trailing end of the sheet-like medium toward said first roller pair to control the speed at which rollers of said first roller pair are separated from a position to grip said sheet-like medium dependent on the speed at which said sheet-like medium is fed.

7. A method according to claim 6, wherein the speed at which the rollers of said second roller pair approach the position to grip said sheet-like medium is selected to be a higher speed until the rollers of the second roller pair reach a prescribed range, and is selected to be a lower speed immediately before said rollers of the second roller pair grip said sheet-like medium.

8. A method according to claim 6 or 7, wherein the speed at which the rollers of said first roller pair are separated from said sheet-like medium and return to an original separated position is selected to be a lower speed until immediately after said rollers of the first roller pair are separated from the sheet-like medium after leaving the position to grip the sheet-like medium, and a higher speed until returning to said original separated position immediately after being separated from the sheet-like medium.

* * * * *